US007113934B2

(12) United States Patent
Lévesque et al.

(10) Patent No.: US 7,113,934 B2
(45) Date of Patent: Sep. 26, 2006

(54) ELEMENT MANAGEMENT SYSTEM WITH ADAPTIVE INTERFACING SELECTED BY LAST PREVIOUS FULL-QUALIFIED MANAGED LEVEL

(75) Inventors: Gilbert Lévesque, Mountain View, CA (US); Malais Wong, Sunnyvale, CA (US); Richard P. Steckler, San Jose, CA (US)

(73) Assignee: Fujitsu Limited, Kawasaki (JP)

( * ) Notice: Subject to any disclaimer, the term of this patent is extended or adjusted under 35 U.S.C. 154(b) by 204 days.

(21) Appl. No.: 10/383,461

(22) Filed: Mar. 6, 2003
(Under 37 CFR 1.47)

(65) Prior Publication Data

US 2004/0098422 A1   May 20, 2004

Related U.S. Application Data

(63) Continuation of application No. 10/205,969, filed on Jul. 26, 2002, now abandoned, which is a continuation of application No. 10/025,804, filed on Dec. 18, 2001, now abandoned, which is a continuation of application No. 09/580,730, filed on May 25, 2000, now abandoned.

(60) Provisional application No. 60/135,883, filed on May 26, 1999.

(51) Int. Cl.
*G06F 17/30* (2006.01)
*G06F 15/16* (2006.01)

(52) U.S. Cl. .......................................... 707/1; 709/224
(58) Field of Classification Search ........ 707/200–206; 709/315; 370/428, 429
See application file for complete search history.

(56) References Cited

U.S. PATENT DOCUMENTS

| 4,788,637 | A | * | 11/1988 | Tamaru ....................... 709/221 |
| 5,579,509 | A | * | 11/1996 | Furtney et al. ............... 703/27 |
| 5,726,979 | A |   | 3/1998  | Henderson et al. ......... 370/254 |
| 5,761,432 | A |   | 6/1998  | Bergholm et al. ..... 395/200.56 |
| 5,835,911 | A | * | 11/1998 | Nakagawa et al. ......... 707/203 |
| 5,892,950 | A |   | 4/1999  | Rigori et al. ............... 395/705 |
| 5,953,347 | A |   | 9/1999  | Wong et al. ................ 370/469 |
| 5,999,179 | A |   | 12/1999 | Kekic et al. ................ 345/734 |
| 6,012,152 | A | * | 1/2000  | Douik et al. .................. 714/26 |
| 6,735,766 | B1 | * | 5/2004  | Chamberlain et al. ...... 717/173 |
| 2002/0129352 | A1 | * | 9/2002 | Brodersen et al. .......... 717/174 |

OTHER PUBLICATIONS

Kawalek, Nadine & Myers, Phil, NOVADIGM: Announces general Availability of Release 3.1 of EDM; new SUN-based Management Serves and Client/Server Version management extend EDM's Automated Control of Distributed Software Across all Platforms, Jun. 20, 1995.*

* cited by examiner

*Primary Examiner*—Jeffrey Gaffin
*Assistant Examiner*—Neveen Abel-Jalil
(74) *Attorney, Agent, or Firm*—Baker Botts L.L.P.

(57) ABSTRACT

An element management system in which: a list of fully-qualified versions of network elements is maintained, and the interface to each network element is managed in accordance with the highest fully-qualified version which is no later than the network element's actual version date, EVEN IF there is also a fully-qualified later version. By specifying a "managed level" which is fully qualified and is guaranteed not to be later than the actual revision of the network element, the possibility of hidden incompatibility is reduced. (Network elements are expected to be backwards compatible, but the addition of features may introduce some hidden forward incompatibility.).

4 Claims, 44 Drawing Sheets

Figure 4

| | From | To | Rate | Redline | Bridge | Crossconnect Name | Crossconnect Type |
|---|---|---|---|---|---|---|---|
| 1 | 2-3-2-4 | 1-3-2-4 | VT1 | No | | | 1WAY |
| 2 | 1-3-1-1 | 2-3-1-1 | VT1 | No | | | 1WAY |
| 3 | 1-3-1-3 | 2-3-1-3 | VT1 | No | | | 1WAY |
| 4 | 1-3-2-4 | 2-3-2-4 | VT1 | No | | | 1WAY |
| 5 | 2-3-1-1 | 1-3-1-1 | VT1 | No | | | 1WAY |
| 6 | 2-3-1-3 | 1-3-1-3 | VT1 | No | | | 1WAY |
| 7 | 1-2 | 2-2 | STS1 | No | | | 1WAY |
| 8 | 2-2 | 1-2 | STS1 | No | | | 1WAY |

Figure 33

ELEMENT MANAGEMENT SYSTEM WITH ADAPTIVE INTERFACING SELECTED BY LAST PREVIOUS FULL-QUALIFIED MANAGED LEVEL

CROSS-REFERENCE TO OTHER APPLICATIONS

This application is a continuation of U.S. application Ser. No. 10/205,969 filed Jul. 26, 2002 now abandoned and entitled "Element Management System with Adaptive Interface Based on Autodiscovery From Element Identifier" which is a continuation of Ser. No. 10/025,804 filed Dec. 18, 2001 now abandoned and entitled "Element Management System with Adaptive Interface Based on Autodiscovery From Element Identifier" which is a continuation of U.S. application Ser. No. 09/580,730, filed May 25, 2000, now abandoned and entitled "Element Management System with Adaptive Interface Based on Autodiscovery From Element Identifier".

This application claims priority under 35 U.S.C. §119 of provisional application No. 60/135,883 filed May 26, 1999 entitled "Element Management System with Tree-Structured Representations".

BACKGROUND AND SUMMARY OF THE INVENTION

The present application relates to telecommunication systems, and particularly to element management systems which remotely manage telecommunications network elements.

Background: Telecommunications Network Structure

The advance of modern telecommunications technology, and the increasing use of data bandwidth by many businesses, has resulted in an increasing amount of traffic flowing to an increasing number of nodes. The data bandwidths which can be handled by fiber optic lines have made long-distance data transmission much cheaper, but have required complex electronics for combining substreams of data and routing each to its proper destination. The telecommunications infrastructure includes a wide variety of network elements, each of which may include a number of complex programmable subsystems. With the explosive growth in technological capabilities, many vendors have been making rapid improvements in their network element components.

Telecommunications networks are complex to design, build, and maintain. Ever increasing demands for improvements, greater bandwidth, ease of use, and interoperability add to this complexity and require increasingly capable network management. Service providers require network management systems that can accommodate equipment and components that comply with a variety of interface standards.

Background: Developments in Diversity of Network Elements

It should be noted that the terms "network element" and "element manager" are also sometimes used in reference to computer networks rather than telecommunications networks. However, the requirements for element management in such networks are vastly different from those relevant to telecommunications networks. First, telecommunications networks are normally have a far larger number of nodes. Second, data stream routing is the primary purpose of telecommunications networks, while in computing networks switching is performed merely when required to link resources demanded by a particular task. (Indeed a WAN will typically be implemented using data channels provided by a telecommunications network operator, so it can be seen that the telecommunications network, in such cases is regarded as a more "fundamental" level on which the connectivity of the WAN can be allowed to depend.) Third, the reliability requirements of telecommunications networks are extremely high, and can be much higher than those of some computer networks. Fourth, a telecommunications network typically includes far more nodes which are physically remote. Fifth, the ratio of processor operations to data bits transmitted is typically different by many orders of magnitude.

The network elements are each a complex system which includes many complex programmable subsystems. These programmable subsystems have local memories which store their programming and maintain a record of their operating history. The data in these many local memories is important for auditing system integrity and reliability.

Background: Element Management Systems (EMSs)

Element management systems are used by telecommunications system operators to monitor telecommunications network elements, and change signal switching and routing as required. Conventionally a single "network element" is considered to include a number of independently programmable switching cards (typically one or more shelves full, i.e. tens of cards). Since each card is itself a complex programmable system, the total programmability of a modern network element is very large.

Element management is not a trivial task, since each network element includes many complex programmable subsystems, and since very high reliability is required. Element management is rapidly becoming more difficult, since the number of possible programmed states in each network element is steadily increasing.

For example, a typical card might have four bidirectional OC-3 interfaces, for a total bandwidth of more than half a gigabaud in each direction. Each OC-3 data stream is resolved into three STS-1 data streams, which in turn are each resolved into 28 data streams at T1 rate (approximately 1.5 million bits per second each). Thus the card can redirect 84 different channels within each of its four data connections. Even without cross-connect options, the theoretically possible number of in/out switching states is 336 factorial (336×335×334× . . . ×3×2×1). The theoretically possible number of switching states for a network element which includes 30 such cards will be in the neighborhood of this number raised to the 30th power, which is a very large number (of the order of $10^{21138}$).

As the demand for bandwidth increases, hierarchical switching relations are appearing. For example, currently proposed WDM cards would handle routing of 168 OC-192 channels, each carrying about 10 gigabaud (ten billion bits per second). Each of those OC-192 data streams would then be further manipulated by an OC-192 switching card, which would divide the OC-192 data streams down into (for example) OC-3 data streams, for routing to an OC-3 switching card. (For comparison, ordinary voice connections require only about 56 kilobits per second each, which is much smaller than the smallest data channel of the OC-3 card mentioned above.)

An opposite trend, which also makes element management more difficult, is the larger size of networks. Telecommunications networks underwent a fundamental change in their locational economics in the last decades of the 20th century. This change began when microwave links replaced copper, but in recent years has been driven by the very high bandwidths provided by fiber optic trunk lines. In this new era of locational economics, the physical distance between signal origination and destination points became much less important than it had been previously; and a corollary of this was that economies of scale drove telecommunications networks to increasingly larger sizes (whether measured geographically, or by numbers of nodes, or by bandwidth switched).

The trend to larger networks has also been driven by the increasingly global span of telecommunications carriers. Large carriers have networks which extend over tens of thousands of miles, and they need reliable tools for monitoring and controlling these very large and very far-flung networks.

The larger sizes of networks, in turn, mean that a state-of-the-art network element management system must be able to cope with thousands of network elements, each containing tens of cards which each are programmable to switch hundreds of channels.

A further pressure on element management systems is applied by customer demand for fast response: a corporate user of bandwidth which requests additional capacity will be severely hampered if the response is not prompt.

The telecommunications network is never static, but is continually changing, in response to operator inputs as well as to equipment changes. Conventionally the operator inputs which command changes have been stored in a log file; but this results in a large text file which is extremely difficult to search. While in theory such a large text file can be searched for debugging or to ascertain the current state, in practice the present inventors have found that this is difficult.

Conventional element management systems (EMSs) have been vendor-specific, so that a network management system must interface to multiple different EMSs. (A model of this interface structure is shown in FIG. 1A.) However, this Background: Cross-Connect Management The number of links in a complex cross-connect cannot usefully be viewed at once, so an operator interface for cross-connect management must provide some way to reduce the number of links seen at once. This is typically done by using multiple windows to view different subsets of links in detail. However, the increasing number of windows means the operators have more difficulty in bringing up the appropriate display view to see the selected link in detail.

Background: Network, Services and Business Management:

TMN

The TMN architecture is a reference model for a hierarchical telecommunications management approach. Its purpose is to partition the functional areas of management into layers. See e.g. ITU-T Recommendation M.3010; Divakara K. Udupa, TMN: Telecommunications Management Network (1999).

The TMN architecture identifies five functional levels of telecommunications management: business management layer (BML), service management layer (SML), network management layer (NML), element management layer (EML), and the (increasingly intelligent) NEs in the network element layer (NEL). TMN segregates (or at least distinguishes) the management responsibilities based on these layers. This makes it possible to distribute these functions or applications over the multiple disciplines of a service provider and use different operating systems, different databases, and different programming languages. In the TMN architecture, the element management layer is the only low-level interface to the network elements, but needs to give the higher layers smooth access to information about the network elements.

Background: CORBA

One important component of the software architecture for modern telecommunications has been the object-oriented software relations defined by CORBA (Common Object Request Brokered Architecture). This standard is particularly useful in telecommunications, where it provides a basic framework for interfacing between element management functions and other functions (e.g. network management software and system management software functions).

Background: Optical Telecommunications Standards and Terminology

The role of telecommunications network management is changing due to new requirements for speed, increased bandwidth, and capacity to carry video, digital, and internet data. To provide the needed functions, protocols such as ATM, SONET, and SDH are emerging. Network management systems must accommodate these new technologies and standards.

The demand for bandwidth has driven many service providers to use optical communication systems. A typical set of standards for optical synchronization and interconnectivity is SONET (Synchronous Optical Network). SONET is a family of fiber-optic transmission rates designed to transport many digital signals with different capacities and to provide a design standard for manufacturers. These design standards provide an optical interface that allows interoperating of transmission products from different multiple vendors, supports new broadband services, and allows enhanced OAM&P (Operations, Administration, Maintenance, and Provisioning).

SONET has a base rate of 51.84 Mbps, with higher rates being multiples of the base rate. The architecture has four layers, these layers being topped by ATM (Asynchronous Transfer Mode) layers. The photonic layer is the physical layer and includes specifications for the fiber optics, transmitter characteristics (such as dispersion of the transmitter), and receiver characteristics (such as sensitivity). The section layer converts electric signals to photonic signals and creates SONET frames. The line layer performs functions such as synchronization, multiplexing of data to SONET frames, switching, etc. The path layer performs end to end transport of data.

Open Systems Interconnection (OSI) is an internationally accepted framework for communication standards between different systems made by different vendors. The OSI model is designed to create an open system networking environment where any vendor's computer system can freely share data with other systems on the network. The model organizes the communication process into seven different categories and places these categories in a layered sequence based on their relation to the user. Layers 7-4 deal with end to end communications, and layers 3-1 deal with network access.

Element Management System with Adaptive Interfacing Selected by Last Previous Fully-Qualified Managed Level A telecommunications network element manager can be regarded as a "supersystem," which must interface to many different smart systems (network elements). The network elements normally include many complex features, and these features differ from vendor to vendor. Moreover, all vendors tend to update their network elements repeatedly, and add or modify features from one version to another. (Typically the in-service lifetime of a network element will be several times longer than the time between version releases.) Thus a telecommunications element management system must not only interface to a variety of network elements with nonstandard features from different manufacturers, but may also have to interface to several different versions of any one type of network element. (This is one way in which telecommunications network element management differs radically from computer network management.)

The high reliability requirements of telecommunications networks make this particularly difficult, since users may insert new network elements (or new software updates) which are not fully qualified (i.e. fully tested and certified) for use with the element management system. The present application presents a new approach to maintaining stability and reliability in such an environment.

The present application discloses an element management system in which: a list of fully-qualified versions of network elements is maintained, and the interface to each network element is managed in accordance with the highest fully-qualified version which is no later than the network element's actual version date, EVEN IF there is also a fully-qualified later version. By specifying a "managed level" which is fully qualified and is guaranteed not to be later than the actual revision of the network element, the possibility of hidden incompatibility is reduced. (Network elements are expected to be backwards compatible, but the addition of features may introduce some hidden forward incompatibility.)

If there is no fully-qualified version which is not later than the element's actual version, than the element is managed in accordance with a "safe" standard specification, which may be manufacturer-dependent or manufacturer-independent.

It is contemplated that the disclosed concepts can also be adapted to other large supersystems—e.g. smart home, vehicle electronics, avionics, remote management of electric power systems, computers, computer networks. However, the disclosed concepts are most particularly advantageous for telecommunications networks, which uniquely exhibit the context of: very high reliability requirements; geographically extended supersystem; field upgrades of elements; nonstandard features from multiple manufacturers; and long in-service lifetime.

BRIEF DESCRIPTION OF THE DRAWINGS

The disclosed inventions will be described with reference to the accompanying drawings, which show important sample embodiments of the invention and which are incorporated in the specification hereof by reference, wherein:

FIG. 4 shows the filter dialog, a sample of NETSMART dialog elements.

FIG. 33 shows the crossconnect report dialog (by crossconnect type).

DETAILED DESCRIPTION OF THE PREFERRED EMBODIMENT

Figure 1:
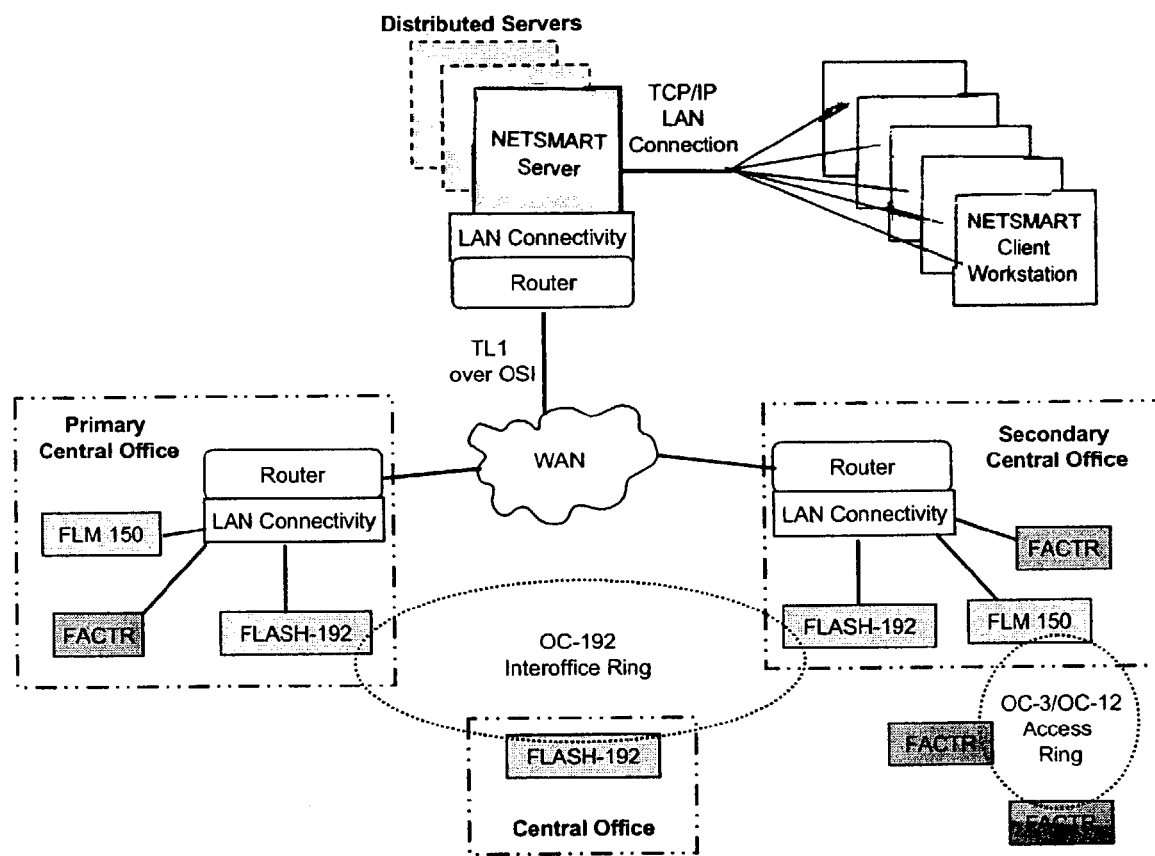
FIG. 1 shows NETSMART connectivity to NEs.
Figure 1A:
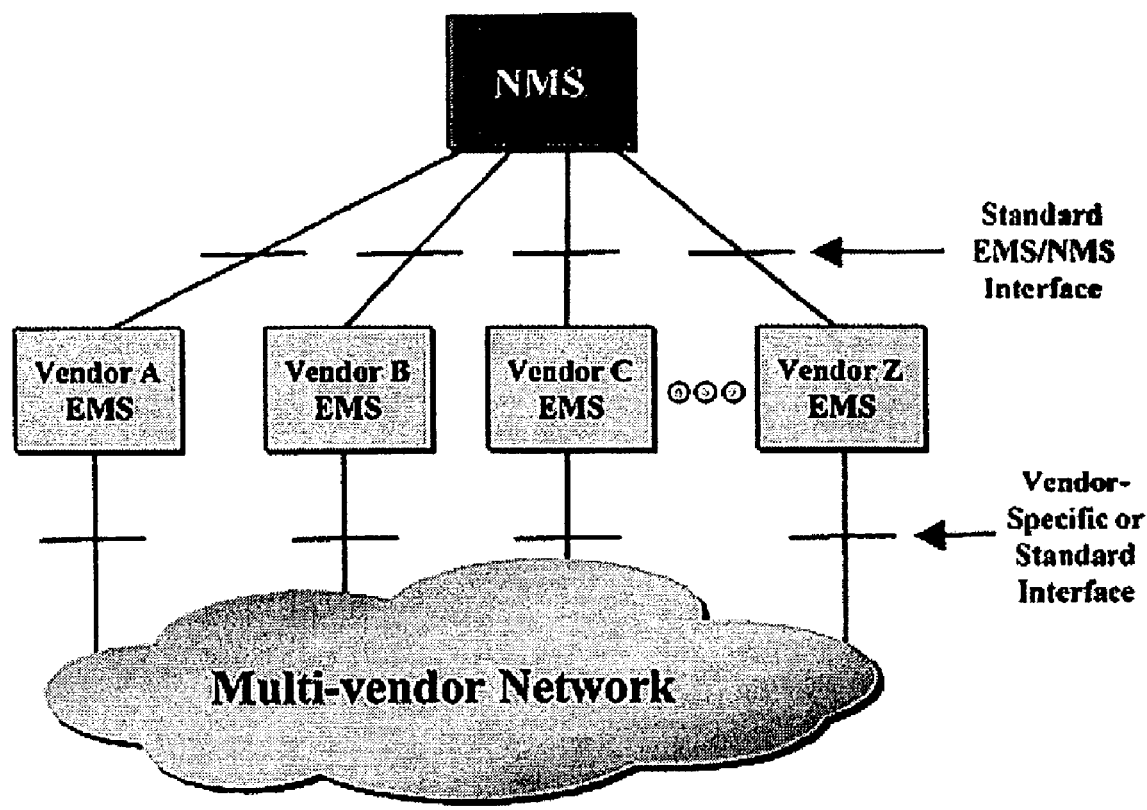
FIG. 1*a* shows a network management diagram with vendors using vendor specific or standard interfaces to communicate with a multi-vendor network.
Figure 1B:
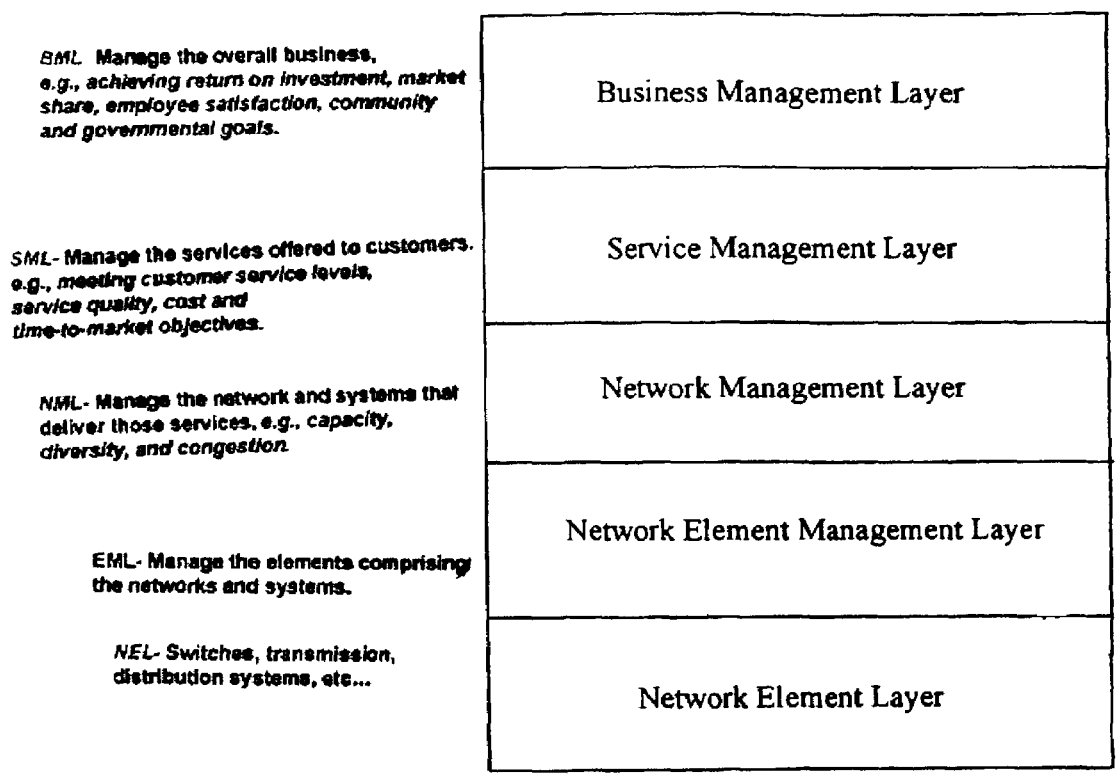
FIG. 1*b* shows the typical layer architecture for management of telecommunication networks.

The numerous innovative teachings of the present application will be described with particular reference to the presently preferred embodiment (by way of example, and not of limitation).

Overview of NETSMART®

NETSMART is a true carrier-class network management system capable of managing very large Fujitsu-based SONET deployments while simultaneously supporting many active users. NETSMART helps build a business by providing the tools to monitor, provision, and troubleshoot the network with unprecedented scalability, graphical interface simplicity, and reliability. As with other user-friendly network management software products, the NETSMART system has an easy-to-use, intuitive graphical user interface (GUI) that allows the user to display a hierarchical view of the network down to the shelf and card level. NETSMART will also permit the user to obtain graphical control over surveillance, provisioning, software download (SWDL), remote memory backup (RMBU), and remote memory restore (RMR). This feature-rich interface allows the user to perform operational tasks without entering data or TL1 commands. Point and click operations allow the user to accomplish the vast majority of all tasks without typing.

The NETSMART system runs on SUN® Enterprise servers sized to meet system requirements. It supports Fujitsu's FLM add/drop multiplexers, FACTR® universal transport and access platform (all the way down to DS0 level), FLASH™-192 lightwave add/drop multiplexers, and FLASHWAVE wavelength division multiplexer (WDM).

NE Support

NETSMART supports many earlier NE releases. For those NEs not directly supported by this version of NETSMART, NETSMART also provides backward and forward NE compatibility.

Backward compatibility allows NETSMART to manage an NE as if its software were at a higher release level than it actually is.

Forward compatibility allows NETSMART to manage an NE as if its software were at a lower release level than it actually is.

NETSMART also provides Fujitsu Generic Support (FGS) for unknown Fujitsu NEs. FGS includes:
Login/logoff
Receive, store, and display alarms
Display of generic NE icon on the Topology Display
Allow/inhibit alarm reports NETSMART Features NETSMART combines the functions of both the element management and network management layers of the Telecommunications Management Network model to provide comprehensive management capabilities to the users of Fujitsu networking products.

General Application Features

NETSMART provides the following general application features as part of a comprehensive and robust element and network management solution:
Management of up to 4000 NEs from a single server platform
Support for OSI DCN connectivity
TL1 command line and batch file support
Generic NE icon capability
Distributed and scalable architecture
Support for up to 50 simultaneous users
Support for IP DCN connectivity
TL1 console allows users to monitor TL1 communication between the NETSMART server and one or more managed NEs
Intelligent uninterrupted power supply (UPS) support for greatly decreased start-up times after power failure and for enhanced protection from file system corruption
Configuration Management
  NETSMART provides the following configuration management features to support easy and rapid provisioning and inventory management for both individual NEs and entire transport networks.
  Flexible Topology Management
Topological link and physical link views
User-defined groups of NEs with the ability to easily move NEs between groups
Tree-widget view of groups, similar to Windows® Explorer, allowing easy viewing and manipulation of managed NEs
Tabular view of network information
  Comprehensive Network Element Management
NE definition, profiles, and configuration autodiscovery
Add user-defined NE or group attributes
User-defined NE audit and reconciliation
  Select autonomous messages to be allowed upon NETSMART login
  Manual or automatic database reconciliation; option to update NE or NETSMART.
NE shelf display with visual indications of equipment states
GUI-based provisioning of attributes and services states for shelves, plug-in units, and facilities
GUI-based cross-connect management, providing comprehensive management tools, including redline, DS0, hairpinning, FASTLANE™, and transmux cross-connect management
  Toolbar shortcuts (1-way, 2-way, 2-way add/drop, 1-way drop and continue, 2-way drop and continue)
  Bulk cross-connect operations
  Ability to assign a name to cross-connects
DWDM wavelength management reports
  Network Element Software Management
Remote NE software upgrades via OSI DCN
Remote NE database backup and restoration via OSI DCN
  Ability to restore database to a different NE for rapid NE turn-up
Remote NE software upgrades via IP DCN (FLASH-192 Release 4.2 and FLM 2400 Release 14.2BS only)
Remote NE database backup and restoration via IP DCN (FLASH192 Release 4.2 and FLM 2400 Release 14.2BS only)
  Full-Featured Network Inventory Management
Network wide inventory of NEs, shown in FIG. 5: TID, NE type, release level, audit state, DCN type.
NE level inventory reports: CLEI code, part number, equipment service state, date of manufacture, etc.
Equipment find function: Network-wide search for CLEI code or part number
  Fault Management
  NETSMART provides the following network surveillance and troubleshooting features to allow fast and reliable tracking of network alarms and to provide network operators with tools to quickly and easily isolate network troubles.
  Network Surveillance
An alarm banner at the top of the Topology window containing summary alarm counts and one-click access to alarm reports An active alarm list containing current alarms, standing conditions, alarm acknowledgment information, and alarm record annotations An alarm history log showing cleared alarms and cleared standing conditions.

A transient condition log maintaining records of transient condition alarms (TCAs) received from managed NEs.

and transient conditions

Alarm-sensitive topology map and shelf views

Audible alarm indications

Customized alarm viewing options allowing user-defined sorting, filtering, column display/placement, and report layout One-click navigation from alarm record to Shelf view.

Network Troubleshooting

Protection switch operation and release

Facility loopback operation and release

STS path trace

DWDM section trace for the detection and isolation of errors between DWDM fiber facilities Performance Management NETSMART provides the following performance management (PM) features to support rapid and accurate detection, isolation, and correction of network performance problems:

Enabling and disabling performance measurement collection from the NETSMART GUI

Collection of both equipment- and facility-related measures with a 15-minute resolution Selection and display of PM information through customized NETSMART reports Printing and storage to external files through the NETSMART GUI Security Management NETSMART provides the following security management features, which allow quick and accurate administration of user privileges while ensuring robust operation within a secure network operations environment.

GUI-based functional user profile management allows the customizing of roles through the combination of individual application features.

Common user roles, such as server admin, client admin, crossconnect user, and alarms user are predefined and available out of the box.

GUI-based user account management, including the ability to enable and disable accounts either on an on-demand or scheduled basis, are provided.

Comprehensive security reporting, including reports listing defined users, users with active sessions, and historical user activity is provided.

Platform Requirements

The recommended platform configurations for NETSMART 1.2.2 are:

The server should be sized (CPU and memory) to meet application requirements (number of NEs, number of users) with an even number of CPUs and with 2 GB of memory for each pair of CPUs.

The disk size, tape and monitor can vary.

DETAILED DESCRIPTION OF NETSMART

NETSMART is the next-generation network element management software application for the Fujitsu FLM, FACTR®, and FLASH® product lines. In addition, Fujitsu network elements (NEs) that are not fully supported by NETSMART, but conform to a set of basic TL1 commands, are minimally supported for alarm and configuration purposes. The NETSMART client/server configuration supports up to 25 simultaneous users. Further details can be found in the NETSMART 1.2 Installation and Administration Guide (FJTU-320-940-150) and NETSMART 1.2 Users Guide (FJTU-320-940-100), both of which are hereby incorporated by reference.

The graphical user interface (GUI) allows:

Display and update of network topology

Creation of uniquely named NE nodes, groups of NEs, and links

Propagation of alarms to network topology icons

Management of NE configurations, including cross-connects

Monitoring of alarms

Performance of troubleshooting procedures

Execution of remote NE memory backup and software downloads

Management of user security

Retrieval of performance management reports

Wavelength management

NETSMART is designed to operate on a dedicated Sun® server/workstation. The application uses the TL1 Operational Support System (OSS) language over an Open Systems Interconnect (OSI) protocol stack to communicate with remote NEs. Management of NEs is accomplished over a combination of wide area networks (WANs), local area networks (LANs), and data communications channels (DCCs), as shown in the example configuration, FIG. 1.

Network Elements Supported

NETSMART software supports Fujitsu NE releases at three different levels:

Full Support: All NETSMART functions are available.

Forward-Compatible Support:

Download forward-compatible release level to the NE

Log on and maintain a session with the NE

Monitor alarms from the NE (new alarm types may not be recognized)

Display the shelf view of the NE

Provision the NE capabilities that were available in the previous release

Perform remote memory backup and restore (if the NE supports it)

Support other features previously supported

Backward-Compatible Support: NETSMART treats an earlier release of an NE as the immediate later major release and processes autonomous messages and command responses as if they were from the more recent version of the NE. Commands that cannot be carried out by the earlier release would be denied, but NETSMART would continue to function.

Using NETSMART

The following section describes:

The common desktop environment (CDE);

How to start the NETSMART™ application on a server and a client;

How to log on and off;

How to turn off the workstation.

Common Desktop Environment

The CDE is a basic component of the Sun UNIX platform and provides access to start and stop the desktop applications, one of which is NETSMART. The CDE toolbar is located at the bottom of the computer screen. The server CDE toolbar has the Heartbeat icon on the left that provides access to administration type functions. These functions are covered in the NETSMART Administration and Installation Guide. To learn about the various applications available through the toolbar, access the Help menu by clicking the books and question mark icon next to the trash can icon. Several topics display that explain the CDE and its applications.

NETSMART User Levels

Three levels of NETSMART users are defined:

System Administrator—is the top-level UNIX operator. The System Administrator is responsible for loading the NETSMART software onto the server and other related tasks.

NETSMART User Administrator—is the top-level NETSMART operator. The NETSMART User Administrator has all NETSMART privileges within the application, including the ability to create other NETSMART user accounts.

NETSMART User—is the operator-level user. The rights of these users are defined by a role description, which is classified by the NETSMART User Administrator. For example, an Alarms User is restricted to using only those commands related to responding to alarms. This user will not be allowed to perform cross-connects.

Starting the NETSMART Application

A central station called the server runs the NETSMART server application and, optionally, the client user interface(s). After NETSMART is started on the server, it can be started on the client(s). Each client can perform functions independently of the other clients. Running NETSMART on a client has the following effects:

Only the client initiating the request will receive a response.

Autonomous alarms sent from the NE will be received by all workstations.

Depending on the user security level, a user can configure NEs; however, only one user at a time can access the following functions: log on an NE, log off an NE, add NE, delete NE, software download, and NE security.

NETSMART automatically logs on the NEs defined as autologon before the user logs on NETSMART. As each NE is logged on, its alarm status is downloaded to NETSMART.

Exiting the NETSMART Application

Exiting NETSMART closes the NETSMART user interface software program. The network is not affected and the NETSMART server will continue to monitor the network. Normally NETSMART runs continuously on the Sun workstation. However, if it becomes necessary to turn off the server, shutdown procedures are included in the System Administration and Installation Guide.

The NETSMART™ user interface allows quick identification of and response to alarm conditions in a monitored network. The system uses windows and a mouse to minimize keyboard use and training requirements for users.

NETSMART Window Layout

Figure 2:
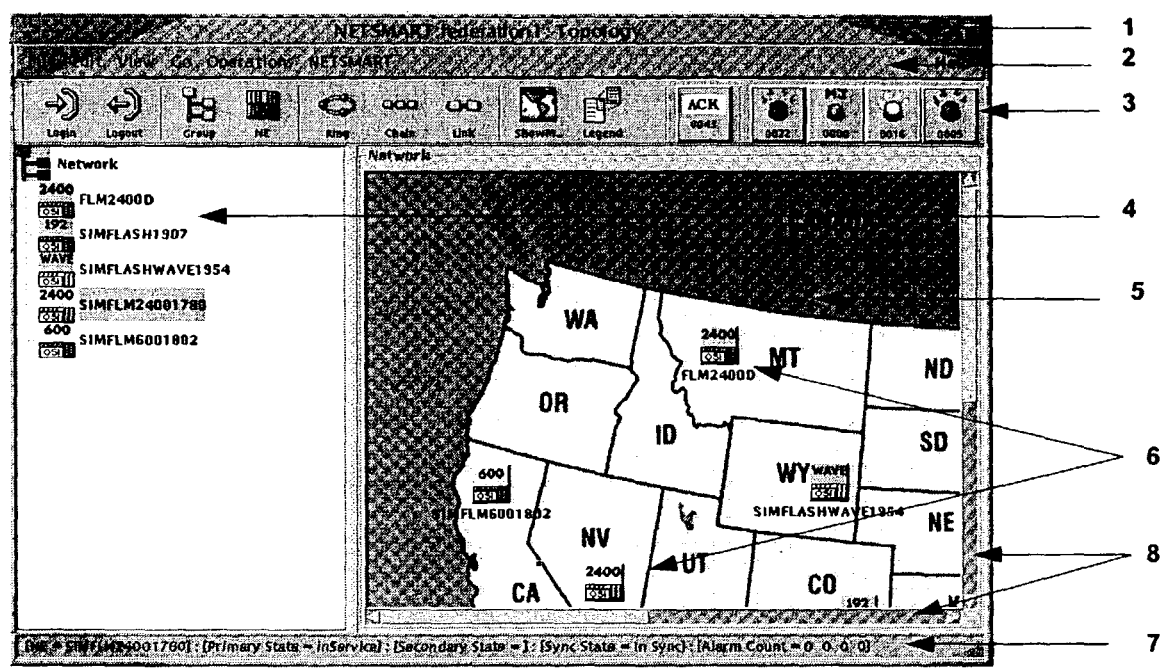
FIG. 2 shows NETSMART window layout.

The Topology window (FIG. 2) displays after the user has logged on the NETSMART application. As additional operations are started up, additional windows can be opened, including multiple occurrences of the same window. Windows can be resized and moved to allow multiple views of the network. For example, a shelf that is in an alarmed state can be displayed in one window and a listing of related alarms can be displayed in another. FIG. 2 is an example of different element positions in the major NETSMART windows. The NETSMART window elements are:

Title bar—The title in the title bar can reflect the top-level element, the component, and the federation being viewed or the type of report or operation being performed. For example, the topology map displays "NETSMART:federation1:Topology" to reflect the top level of network elements, the component, and the federation. If the view was switched to the DSO XC tab for an NE in the Configuration Manager, the title reflects the NE TID, such as "FLM105J." Log Managers will display the type of log, such as "Activity Log."

1. Menu bar—The menu bar wording defines categories of NETSMART commands. Clicking and holding down the cursor on a menu word displays a drop-down list of the available commands for that category. Continuing to hold down the button, dragging the pointer to highlight the desired command, and then releasing the button causes the command to start executing.

2. Toolbar—The toolbar displays the tools, which are command buttons that provide quick access to frequently used functions. For example, on the Topology window, this area is used for NE logon, NE logoff, deleting an NE, adding a ring, and adding a chain. On the right-hand side of the toolbar are the four alarm condition tools. The alarm tools display the number of current alarms and will flash if there are alarms that have not been cleared or acknowledged.

3. Tree—In the Topology window, this area displays a hierarchical list of NEs and groups of NEs. In the Configuration window, this area lists cards or facilities, depending on the selection. In the Security window, this area lists users, roles, or user sessions.

4. Graphical area—This area is used to display large graphical information such as network maps, shelf views, icons, or reports. Dialog and message boxes can also be displayed on top of this area.

5. Icons—An icon is a graphic representation of an object. Icons are described in legends that are available on related windows and are described in Appendix A of this document.

6. Status bar—The status bar is used to display useful information such as the results of the last command or the current status of the selected NE.

7. Scroll bars—Scroll bars can be used to reposition a portion of the window when the displayed information exceeds the size of the window. Either clicking on an arrow or dragging the scroll button will move the display.

NETSMART Window Elements

Several types of Windows elements may appear in the NETSMART window area when commands are selected. These elements are:

1. Dialogs—NETSMART uses dialogs to request information from the user. After supplying the requested information, click on a command button to execute the command. The Tab and SHIFT+Tab keys move the cursor between entry fields in the box.

2. Message Boxes—A message box is displayed to explain why a command cannot be completed, to inform the user of an action in progress, or to remind the user of the possible consequences of a choice.

3. Command buttons—Such as OK, Cancel, Apply, and Help (located across the bottom of a dialog or message boxes) initiate an immediate action when chosen.

4. Reports—NETSMART can display data about NEs, provisioning parameters, or conditions in a tabular form. Often that data can be saved as a file and/or printed.

Menu Conventions

Figure 3:
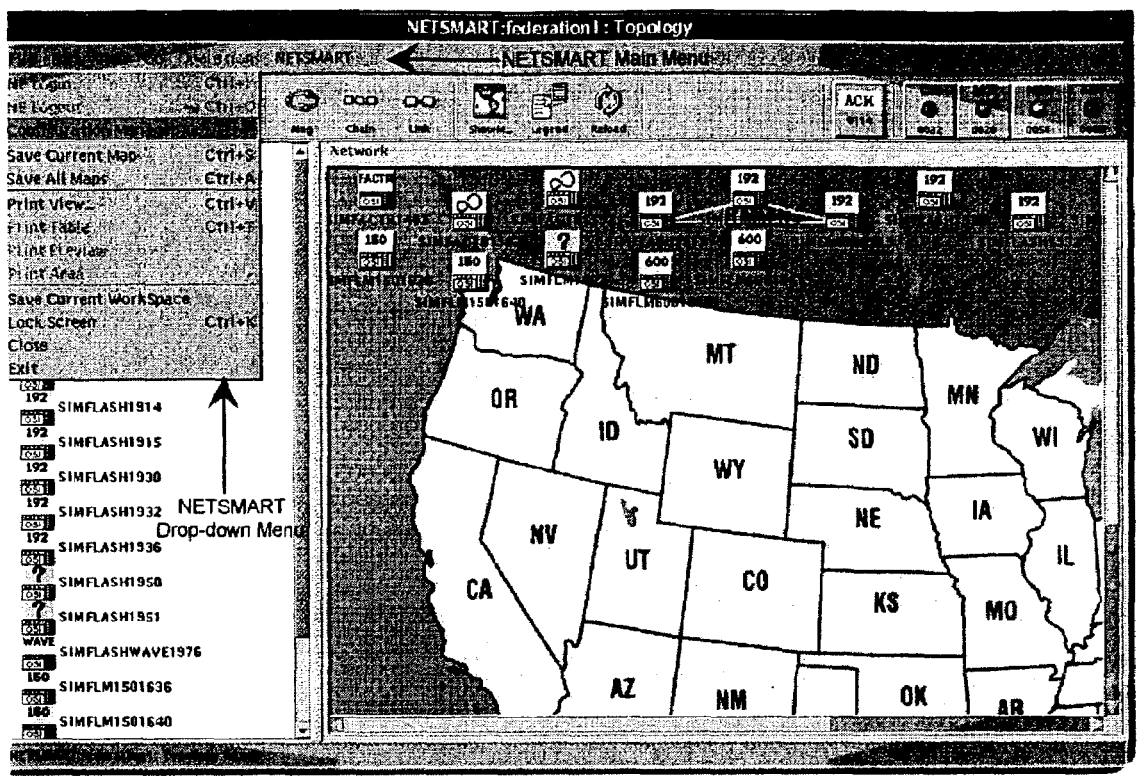
FIG. 3 shows NETSMART topology with drop-down file menu.

Many NETSMART commands are available from the toolbar or from NETSMART menus (FIG. 3). There are three types of NETSMART menus:

Main menu, the horizontal list of command names located immediately below the window title Associated drop-down menus for each main menu selection Pop-up menus, usually displayed from a mouse right-click action NETSMART Dialog Elements NETSMART dialog elements are the building blocks that are used on the base dialog window to add functionality to each dialog. Different dialogs contain different elements to reflect the particular action(s) to be caused by activating the dialog information.

Dialog Title

Most NETSMART dialogs have a dialog title or name displayed in the top portion of the dialog border. In some instances, the dialog title may contain the name of a selected element, rather than a constant single title. Other dialogs may have both a constant title and a variable name of a selected element.

Dialog Entities

A dialog may contain field labels, data/text entry fields, radio buttons, check boxes, list boxes, drop-down menus, slider bars, and command buttons.

The data/text entry field is designed for the user to type information.

Radio buttons are mutually exclusive groups of buttons. Selecting one button in the group will deselect all other buttons in the group. Check boxes are used to indicate one or more choices.

List boxes display a list of values from which the user can select a single value or a group of values. Contiguous (adjacent) groups of values are selected by holding down the SHIFT key while selecting the values with the mouse. Noncontiguous groups of values are selected by holding down the CONTROL key while selecting the values with the mouse.

Figure 4:
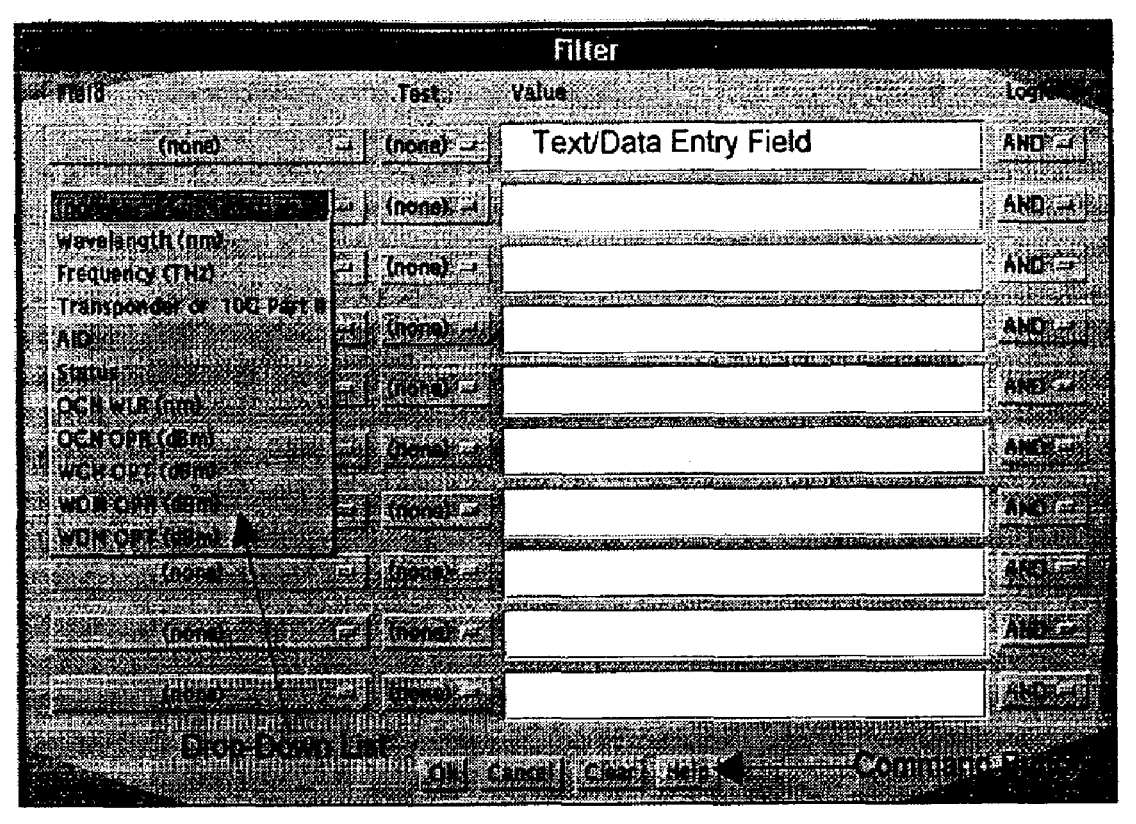

Drop-down menus are menus that display when a selection is made from a list box (FIG. 4).

Slider bars are used to set levels. For example, the NETSMART General User Preference dialog uses a slider bar to set the number of minutes that NETSMART can be idle before the NETSMART application screen locks.

Command buttons are located at the bottom of dialog boxes. They are used to indicate what action NETSMART should take with the information that the user entered in the dialog.

NETSMART Message Boxes

NETSMART message boxes are a form of dialog designed to alert the user to an impending condition that may alter the current state of NETSMART or NETSMART elements. Message boxes can be one of three types:

Acknowledgement—displays a message that must be acknowledged before continuing. This is usually a "wake-up" type of message and is not associated with any potentially system-affecting actions.

Decision—requires the user to decide how to proceed by selecting a command button.

In Progress—Displays a message stating that an event is occurring and a moving bar to indicate that the process is still continuing. Closing the message box does not stop the process.

NETSMART Procedures

Figure 5:
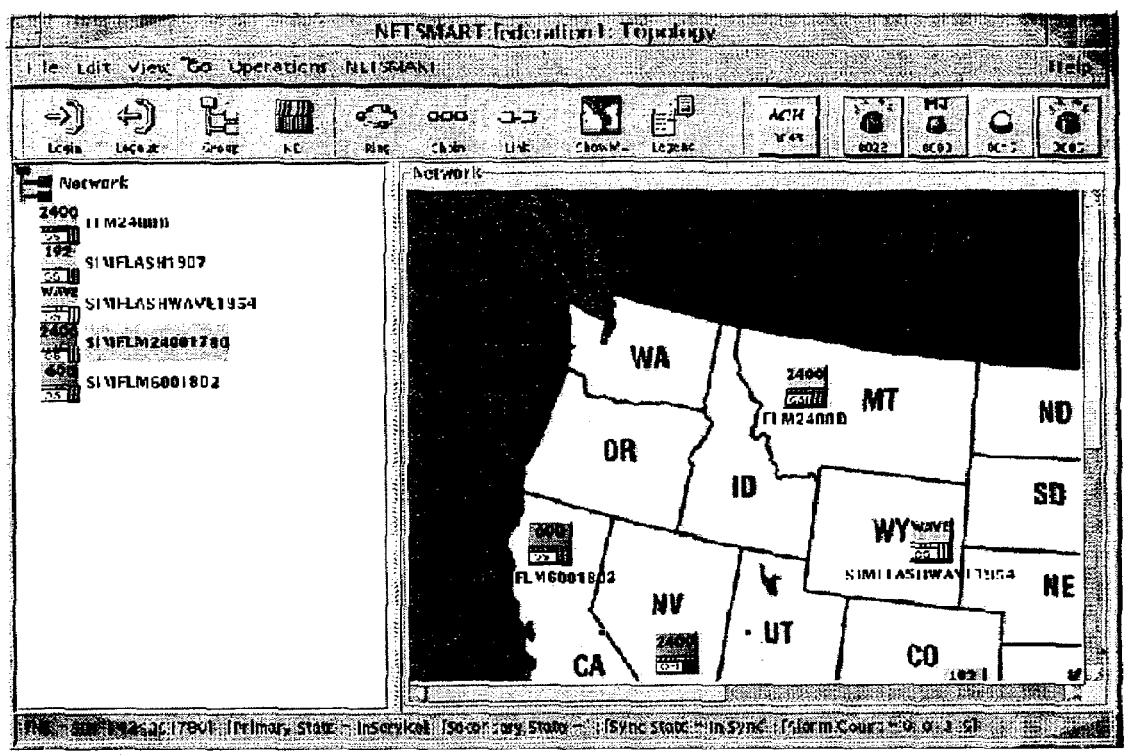
FIG. 5 shows the topology manager (with NEs created).

The Topology window displays when NETSMART is started for the first time. If no network elements (NEs) have been created, no NEs will display in the Topology window on start-up. FIG. 5 shows Topology with NEs already created.

Note: Most of the main NETSMART™ windows are accessed through the different software managers. These managers are listed on and accessed through the NETSMART menu. Therefore, in the following procedures, the relevant manager is indicated in the first steps. If the proper manager window is not open, it can be opened by selecting the NETSMART menu option and then clicking the appropriate manager option.

A variety of methods can be used to perform these functions; however, the procedures here are written to offer the most direct methods. References to applicable windows are included in the procedures. As NEs are created, they are, by default, autodiscovered and logged on. NEs will not be automatically discovered if the user specifically deactivates the default Auto Logon field during NE creation.

Some dialogs are available from several different manager screens because of their general nature. They allow the user to set environmental preferences and lock/unlock the NETSMART screens for security purposes.

Create and Manage NEs

This section describes how NEs are added, modified, maintained and deleted in the NETSMART database. Only Fujitsu NEs are supported in this release and they must have already been physically configured in the network using either TL1 commands or the FLEXR® interface. Fujitsu NEs that are not currently in the supported list, but comply with Telcordia TL1 grammar, are supported as generic NEs for commands such as ACT-USER, RTRV-ALM-ALL, and INH-DBREPT-ALL.

Find NE or Group

This procedure helps to locate an NE or a group of NEs.

Add an NE

This procedure adds an NE definition to the NETSMART database. However, to become active, the NE must already be physically in the network and configured using either the FLEXR interface or TL1 commands.

Clone an NE

Use the Clone NE dialog to make a copy of an existing NE definition. Make changes to the clone to identify a new NE in the network.

Edit NE Parameters

Editing an NE allows changes to be made to some basic NE parameters in the NETSMART database.

Note: The contents of the User ID and Password fields cannot be changed for an active NE. If these are to be changed, the NE must be logged off and deleted and added once again with the new User ID and Password information.

Delete an NE

Note: NEs should not be deleted during logon (the NE icon background is white). Wait until the server has finished logging on, then proceed with the delete operation. Deleting an NE during logon could cause the NE to be deleted partially. If the NE is partially deleted, you need to restart NETSMART to resolve the problem.

Deleting an NE logs the user off the NE and removes it from the NETSMART database. Deleting an NE also deletes any links associated with the NE. The NE is still physically in the network, but is removed from the NETSMART database.

Log On an NE

The user must log on an NE to perform configuration changes and receive alarm information. Only NEs that are in an inactive state can be logged on. If this is the first time this NE has been logged on, autodiscovery is invoked (NETSMART communicates with the NE database and loads the configuration information into the NETSMART database). If you select Auto Logon in the Add NE dialog, the log-on process will start as soon as you click Ok or Apply in the Add NE dialog.

Log Off an NE

Logging off an NE ends communications between NETSMART and this NE, but the NE is still defined in the NETSMART database and is functioning in the network.

Audit an NE

Auditing an NE compares the information contained in the NETSMART database with the information stored in the NE. The results of the audit are displayed. When you audit an NE using the following procedure, the Audit/Reconcile level that you set will apply only to this audit. The Audit level that you set when you created or edited an NE will apply only when the NE is restarted.

View the NE State

The current state of any NE in the network can be viewed.

Resynchronize an NE

Database resynchronization ensures consistency between the NE database and the NETSMART database. Resynchronization involves retrieving the entire database or distinct portions of that database from the NE and comparing this information with that contained in the NETSMART database. Either the NE database or the NETSMART database may be the master data source, depending on the type of data.

Resynchronization can be a time and resource intensive process.

Managing Groups of NEs

Groups are used to organize NEs and partition the network. A group icon can represent one or more NEs or groups of NEs. The background color of the group icon reflects a highest unacknowledged alarm level of NEs in the group.

Find a Group of NEs

Finding a single NE and a group of NEs is accomplished using the same dialog.

Add a Group Definition

A group definition can be created and then a group of NEs can be defined or moved into the new group.

Edit Group Parameters

Editing a group allows the user to change group parameters. The group parent can also be changed either by dragging the group icon under a new parent in the tree area or by typing a new parent name in the Parent Group field on the Edit Group dialog.

Delete a Group Definition

Note: Deleting a parent group results in deletion of all groups under the parent group.

This selection deletes a group definition from the NETSMART database. If the group has NEs assigned, a warning is displayed and must be acknowledged before the delete is completed. The group icon will be removed from the topology map and tree structure.

Use a Different Background Map for Each NE Group

A different background map can be established for each group of NEs so that when the group is selected, the NEs will be displayed on an appropriate map. The map file(s) must be in "jpg" format and must be accessible by the server. The file can be on a server drive, on a CD ROM or on a floppy disk that has been placed in the floppy disk drive (use the UNIX volcheck command to recognize the floppy disk).

Search NE Dialog

Figure 6:
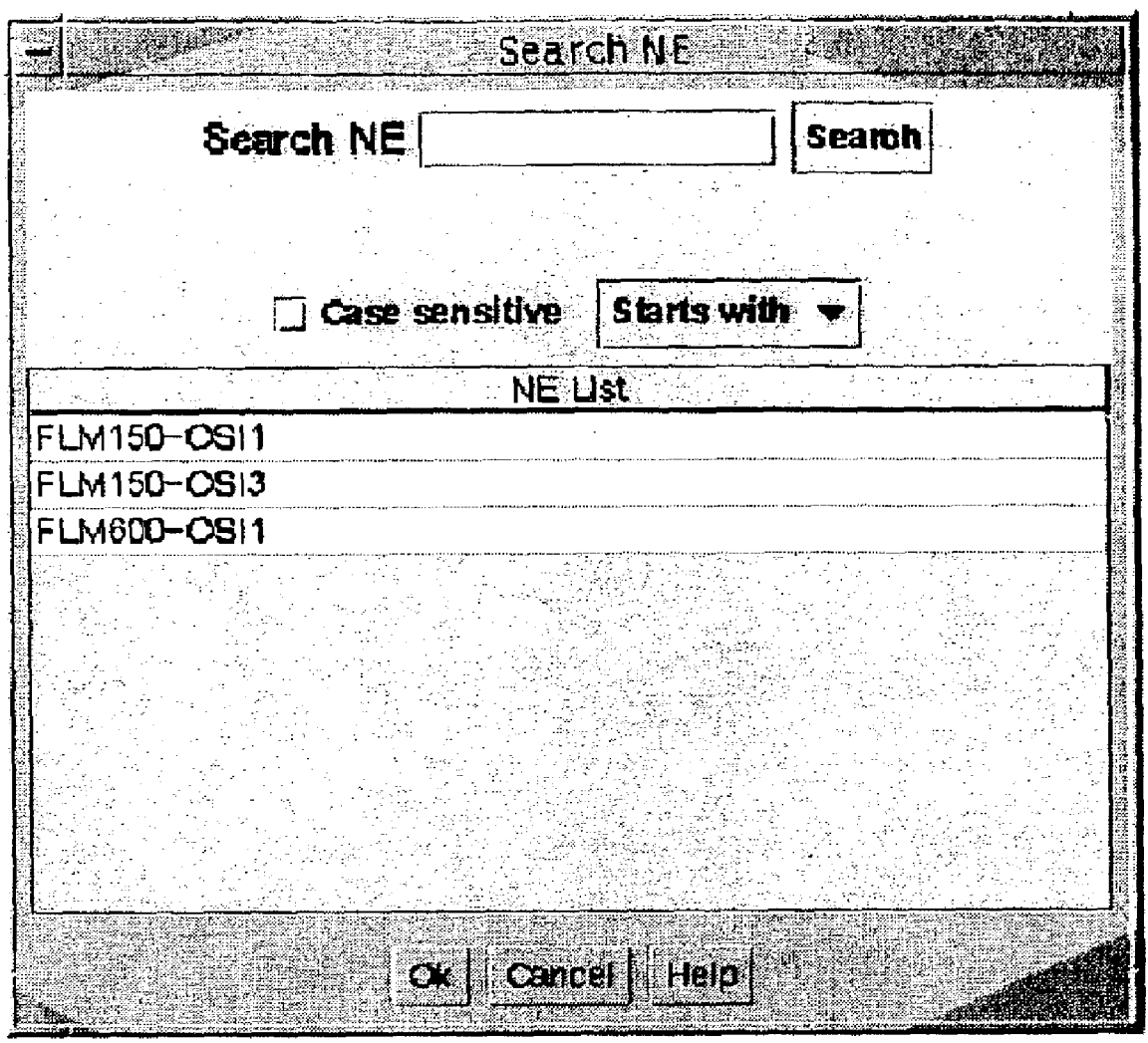
FIG. 6 shows the topology search NE dialog.

The Search NE dialog displays whenever the related Search button is selected in another dialog that requires an NE name be provided (for example, in the Add Link dialog). The following procedure assumes that you are currently working in a dialog with a Search button. FIG. 6 shows the Topology Search NE Dialog.

Search Group Dialog

The Search Group dialog displays whenever you click on the related Search button in another dialog that requires a group name be provided (for example, in the Add NE dialog). The following procedure assumes that you are currently working in a dialog with a Search button.

Connect NEs (Links, Chains, Rings)

Network Elements (NEs) are connected to provide various telecommunications services. Connection procedures add information about the different types of connections to the NETSMART database. They do not affect the NEs and physical network because the work defined in these procedures must be completed by on-site field technicians.

Within NETSMART, a single connection between two NEs is referred to as a physical link. The display of this information on the topology map is referred to as a logical link. There may be more than one physical link between two NEs, but it will be displayed as a single line on the topology map unless the connections form a ring. If a ring is formed using only two NEs, both links are displayed as angled lines, showing as a diamond pattern.

In NETSMART, a link in one direction only is a unidirectional link. A link in both directions is a bidirectional link.

In NETSMART, a connection is fully protected only if there are two separate routes and these routes do not share any link. A connection is partially protected if there are two separate routes but these routes do share a link.

Add a Link

A link represents a physical connection between two NEs, including generic NEs. This procedure adds the link information to the NETSMART database to represent the connections in the network. It does not affect the networks.

Note: The selected group and NE will determine the contents of the fields on the Add Link dialog.

Tasks:

1 From the NETSMART Topology window, log on all NEs to be included in the link.

2 Select Add Link from the Edit menu or select the Link tool from the toolbar.

3 Using the Search button, select information in the following fields:

Group 1—Use this field along with the Search button to select a parent group.

NE1—Use this field along with the Search button to select an NE. After the NE has been selected, available ports are displayed in the Linkable Termination Ports section of this dialog.

Group 2—Use this field along with the Search button to select a parent group.

NE 2—Use this field along with the Search button to select an NE. After the NE has been selected, available ports are displayed in the Linkable Termination Ports section of this dialog.

Linkable Termination Ports—This field displays a graphic representation of the ports that are available for connection for both selected NEs. If a connection is already in use, the box is grayed out. If a link needs to be created to a generic NE, the facility (for example, HS1-1, 1-P) port must be typed into the text field at the top of the Linkable Termination Ports area, followed by a carriage return.

Under each text field, a set of boxes is displayed.

Each box displays the RATE (for example OC3), AID (for example 1P) and two direction buttons: Tx (Transmit) and Rx (Receive). Direction buttons are used to make the connection. These buttons also indicate if a port is unidirectional or bidirectional. If both Tx and Rx are enabled, the port is bidirectional. If either Tx or Rx is grayed out, the port is unidirectional.

4 Make a connection between the NEs using one of the following methods:

To create a unidirectional link from Tx to Rx, click on the Tx button for a linkable port for the first NE to select it. Then move the mouse to the linkable port for the other NE and click on the Rx button if it is not grayed out. A line displays showing the link, and the Tx and Rx buttons for those ports will be grayed out.

To create a unidirectional link from Rx to Tx, click on the Rx button for a linkable port for the first NE to select it. Then move the mouse to the linkable port for the other NE and click on the Tx button. A line displays showing the link, and the Tx and Rx buttons for those ports will be grayed out.

To create two unidirectional links for a bidirectional port at the same time, click in an area in the box outside the Tx or Rx buttons for a bidirectional port for the first NE. Then move the mouse to a bidirectional port for the other NE and click in an area in the box outside the Tx or Rx buttons. A line displays showing the link, and the Tx and Rx buttons for those ports will be grayed out.

Figure 7:
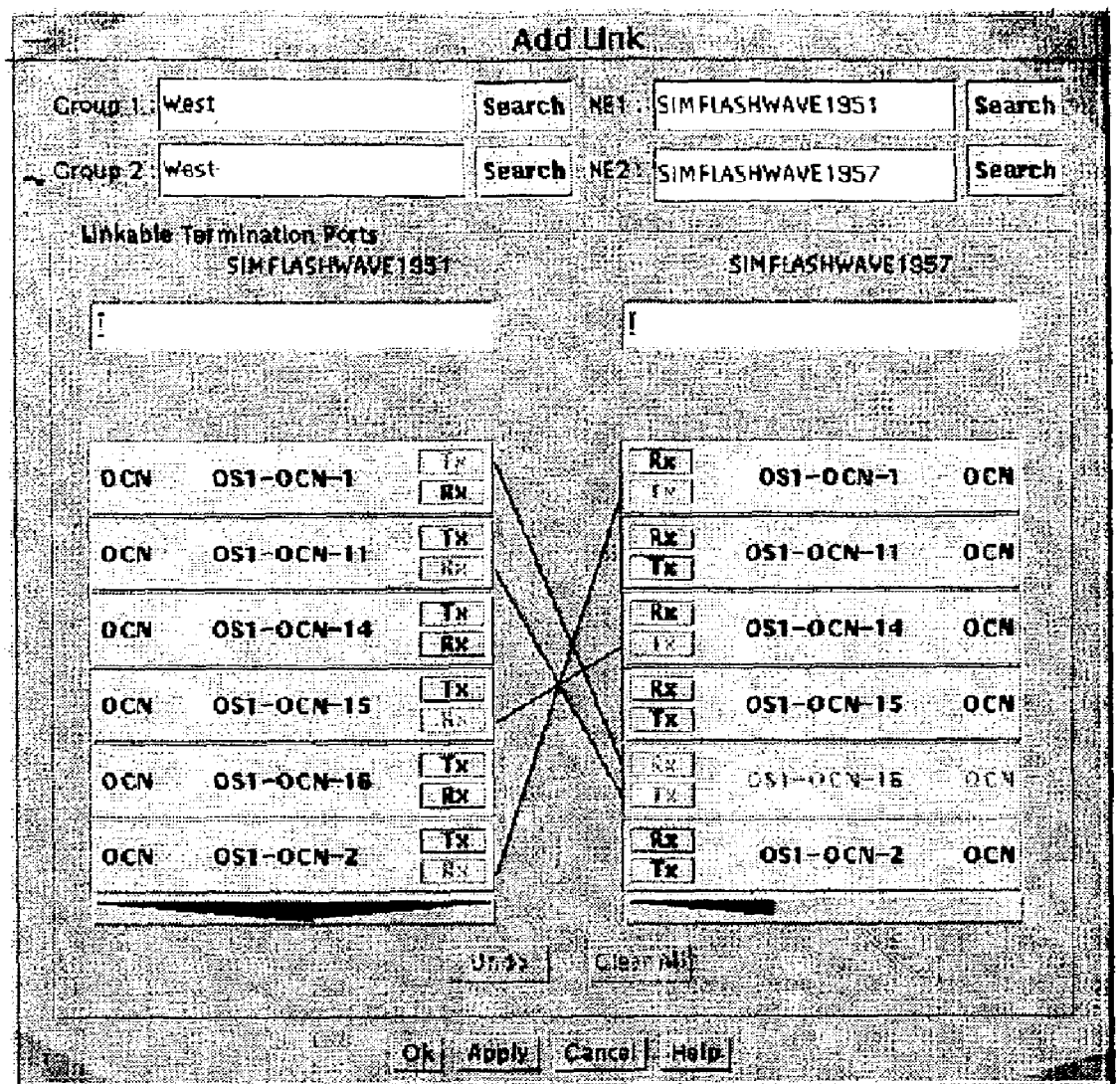
FIG. 7 shows the result of selection using the search NE dialog.

Once a link is successfully created, connection lines will indicate link direction(s), as shown in FIG. 7. Additional links can be added until all connections have been defined.

Note: To deselect a box or button, click on it.

5 If the last connection needs to be removed (and Apply or Ok has not been selected), click Undo. If all connections need to be removed, click on Clear All.

6 Click Apply to add this link information and leave the Add Link window displayed. Click Ok to add the link information and close the Add Link dialog.

7 From the View menu, select Graphical to return to the Topology map display. The link displays on the topology map.

Display Link Information

A link represents a physical connection between two NEs. This is NETSMART database information and may not reflect actual physical network connections. To display the link information for a single link, double-click on the link or right-click and select Link Report from the menu.

Figure 8:
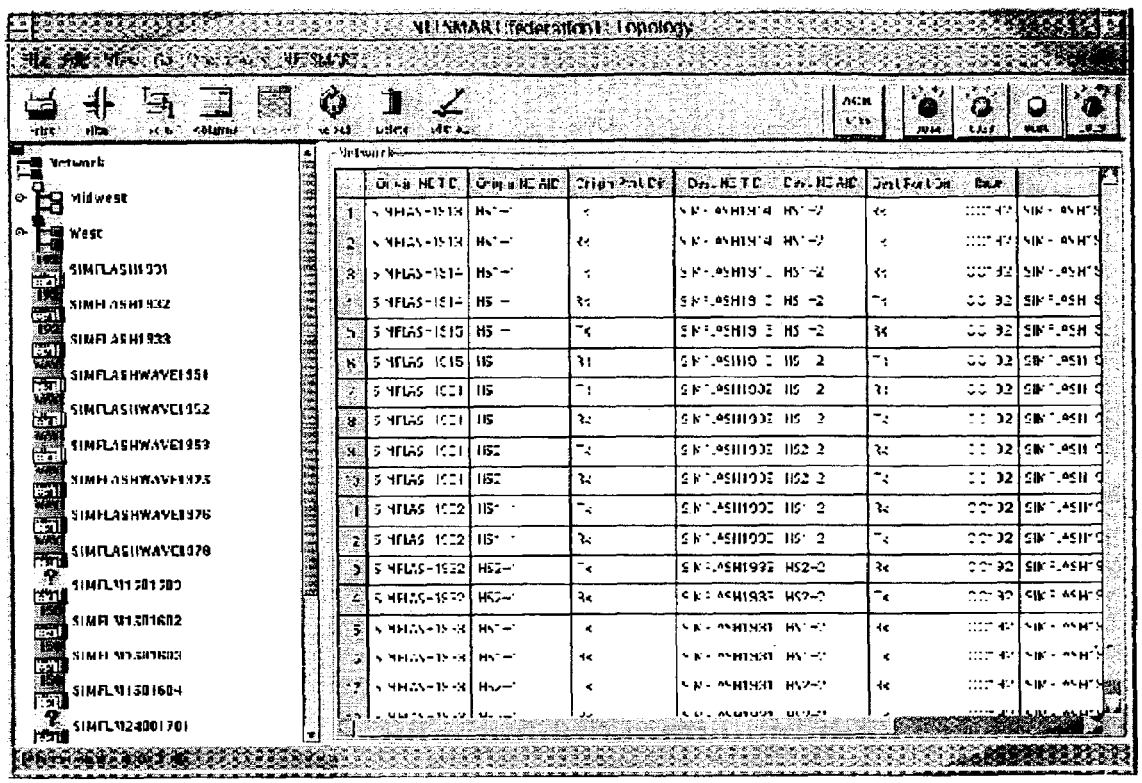
FIG. 8 shows the link report in the topoloigy manager/

To display the link information for all the links, from the NETSMART Topology window, select Links Report from the View menu. The tabular view of the Links report (FIG. 8) displays.

Note the new features of the Link reports in this release:

An EditName tool can be used to change a physical link name.

Multiple selection of rows can be used with the Delete and EditName operations.

To select a row on the Link Report, click on the row header (numbered from 1 up to the number of physical links displayed) and the row will become highlighted.

For multiple selections, two options are available:

Hold down the SHIFT key and click on the desired rows to select a contiguous set of records.

Hold down the CTRL key and click on the desired rows to select a non contiguous set of records.

To view the Display Link dialog for the two NEs in the selected physical link, double-click on a row.

The Link Report toolbar offers the following functions:

Print Print up to 100 lines of the current information. Refer to Printing Overview for more information.

Filter Display a dialog where you can specify criteria to filter the information in the display. Refer to Filtering Tabular Information for more information.

Sort Display a dialog where you can specify criteria to sort the information in the display. Refer to Sorting Information.

Columns Display a dialog where you can specify information to be shown or hidden. Refer to Setting Column Displays for more information.

Deselect Deselect any selected rows.

Reload Update the display with information from the database.

Delete Delete selected physical links from the database.

EditName Change the name for selected physical links. Use the Edit Name dialog to type a new link name. Click on Ok to confirm the change(s).

Edit a Link Name

The link name defaults to the format <TID>:<port>:<Tx or Rx>::<TID>:<port>:<Tx or Rx>of the connection (for example, FLASH-G:HS1-1: Tx: :FLASH-F:HS1-2:Rx). This link name can be changed to reflect user preference.

Delete a Link

A link can consist of a number of connections between two NEs. This procedure describes how to select an individual connection within a link before deleting the information from the NETSMART database. The procedure does not affect the actual physical connections, so links are referred to as "topology links."

Add a Chain

Chains use high-speed links to connect terminal and linear NEs. This procedure describes adding the link information to the NETSMART database. The actual physical connections are not performed using this procedure. All NEs that will be included in the chain must be logged on. Generic NEs cannot be included in a chain because the NE type cannot be accurately determined. An NE at the end of a chain must be configured as a terminal type of NE.

The Add Chain function is a "best-effort" operation. If two or more of the NEs specified in the list of TIDs encounter a compatibility error during ring creation, a dialog box will display. This dialog reports which links were created successfully and which links encountered errors. The chain will be displayed as lines between NEs. To access the Add Chain dialog, first display the Topology window, and ensure that all NEs targeted for the chain have been autodiscovered.

When the dialog closes, the chain displays on the Topology map. The corresponding links are added to the NETSMART database. Those links that were created will be displayed on the Topology map. For those links that generated errors, one or more of the following self-explanatory error messages may display:

The configurations for the specified NEs are not compatible.

High-speed links already exist between two or more of the specified NEs.

High-speed rates are not compatible for two or more of the specified NEs.

The directions of the high-speed ports are not compatible for two or more of the specified NEs.

The payloads of the high-speed ports are not compatible for two or more of the specified NEs.

The port sequences of the high-speed ports are not compatible for two or more of the specified NEs.

Add a Ring

A ring provides alternative routing in case of a single failure within a network. This procedure adds a ring definition to the NETSMART database. The actual physical connections are not performed using this procedure.

The Add Ring function is a "best-effort" operation. If two or more of the NEs specified in the list of TIDs encounter a compatibility error during ring creation, a dialog box will display, reporting which links were created successfully and which links encountered errors. Those links that were created will be displayed on the Topology map. For those links that generated the errors, one or more of the following self-explanatory error messages may display:

The configurations for the specified NEs are not compatible.

High-speed links already exist between two or more of the specified NEs.

High-speed rates are not compatible for two or more of the specified NEs.

Directions of the high-speed ports are not compatible for two or more of the specified NEs.

Payloads of the high-speed ports are not compatible for two or more of the specified NEs.

Port sequences of the high-speed ports are not compatible for two or more of the specified NEs.

Build a BLSR

Figure 9:
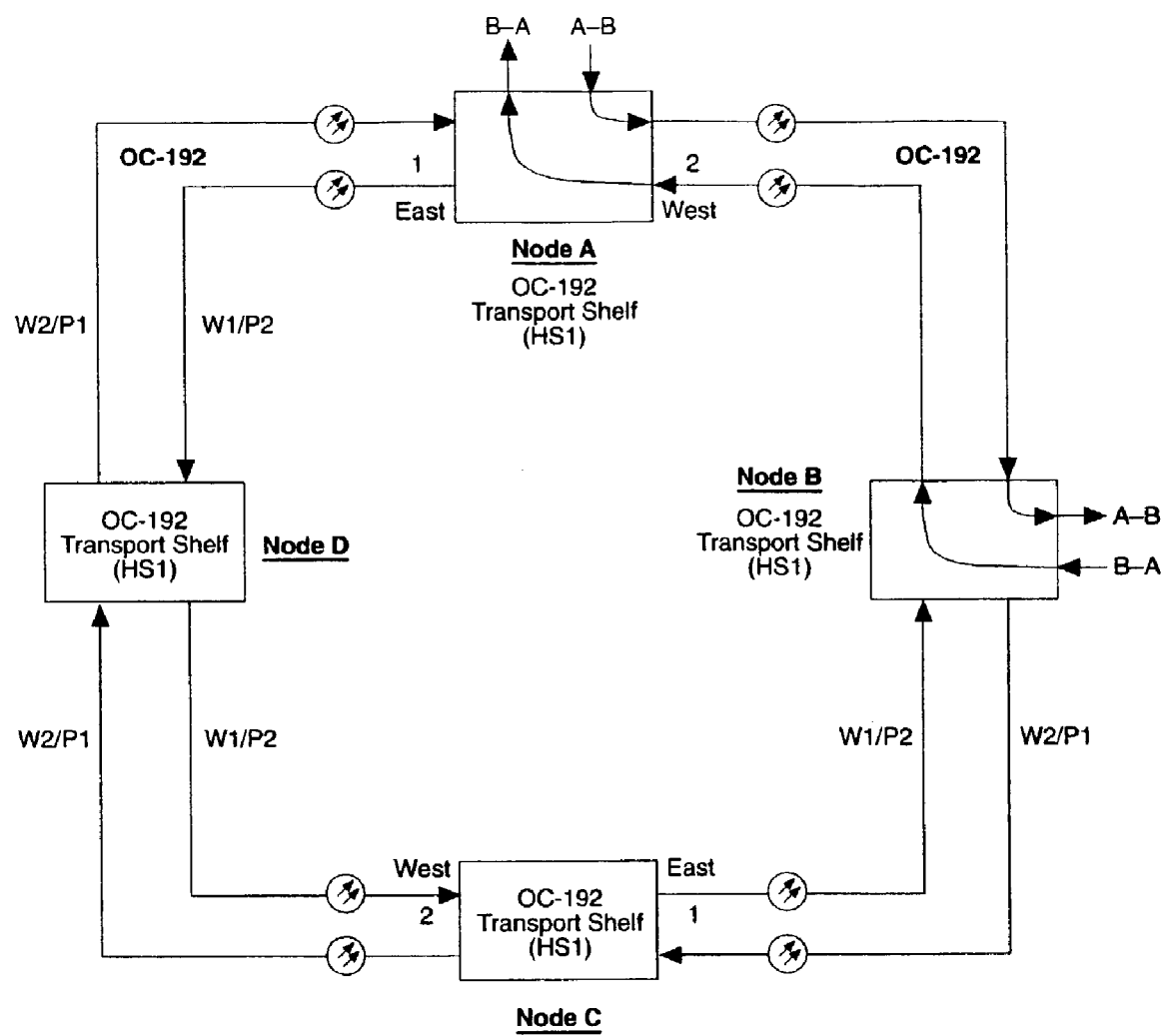
FIG. 9 shows OC-192 2F-BLSR.

A bidirectional line switched ring provides alternative routing in case of a single network failure as shown in FIG. 9, OC-192 2F-BLSR. The BLSR provides ring protection switching by detecting OC-192 line-level failures. Ring protection involves bridging (transmitting identical traffic on both the working and protection channels) and switching (selecting traffic from the protection channel instead of the working channel). In a bridge and switch, the 96 working time slots (1 through 96) are bridged onto the 96 protection time slots (97 through 192) and transmitted away from the failure.

Each 2F-BLSR can contain up to 16 nodes, labeled uniquely 0 through 15 in the ring. The ring topology table contains the order of the nodes in the ring.

Squelching prevents traffic misconnections during node failure by inserting STS-1 path AIS at the switching nodes into the time slots. Each node on the ring has the identities of the entry and exit nodes for all services passing through the node. The squelch table keeps track of these entry and exit points by time slot.

Only the channels that are added or dropped at the isolated nodes or used for extra traffic need to be squelched. The squelch table has an entry for each STS-1 time slot that the node is terminating or passing through and the source and destination node IDs.

Note: The squelch table may take some time to display because the information is retrieved from the NE.

Add a Node to a BLSR

Nodes may occasionally need to be added to a BLSR. This procedure adds a node to an existing BLSR definition in the NETSMART database.

Delete a Node from a BLSR

Nodes may occasionally need to be deleted from a BLSR. This procedure deletes a node from an existing BLSR definition in the NETSMART database.

Set/Release Loopbacks

A loopback tests the transmit and receive capabilities of the facilities at both remote and local terminals. A loopback test causes the transmitted signal to be returned to the sending device after passing through all or a portion of a data communications link or NE.

Loopback testing is not available on all NE components. An NE component is a facility, equipment and/or termination point. If the NE component is available, right-click on the NE component in the tree area to display a menu containing Loopback.

The NE must be placed in a maintenance state before a loopback can be performed. Placing an NE in maintenance state is not service affecting. However, once an NE has been placed in a maintenance state, actions performed on that NE may be service affecting (a loopback, for instance, is service affecting).

Set and Get a Path Trace

Path trace is a signal sent on the SONET overhead and is only supported at the EML layer. It allows the user to assign a unique path trace message to the transmit NE and the destination NE.

Tracing a path involves assigning the outgoing trace message (TRC) at the transmit NE, assigning the same message for the incoming trace message (EXPTRC) at the path destination NE, and viewing results in the incoming trace (INCTRC). If the message is received correctly, the path trace is successful.

Note: Path tracing is not available on all NE components.

Set and Get a Section Trace

In SONET, the terms section, line and path refer to the subsections of a route that a signal takes when traveling from origin to destination.

A section is the segment of fiber between two repeater NEs. It is possible for a signal to be corrupted or degraded over the span of a section. To troubleshoot a particular section for signal quality problems, a test signal can be sent on the section and the returned signal is compared to an expected trace. This is the essence of section trace.

Use the Section Trace window to view and modify the attributes related to section trace on a selected facility on an NE.

Note: Section trace is not available on all NEs.

Protection Switching

Protection switching allows a transfer of service between working and protection facilities or equipment. Protection switching allows plug-ins to be removed and replaced without affecting traffic. This feature also allows editing of the FFP attributes of facilities and equipment within the optical facility and equipment protection groups.

Note: Protection switching is not available on all facilities and equipment.

Synchronize Timing

Timing attributes that will define the synchronization timing source for the NE and the facility over which the output clock signal is sent, can be set by the user. The synchronization reference can also be switched to another source. Choices of primary, secondary or internal clock references are available to an NE.

Note: It is dangerous to set the NE timing reference to internal clock timing reference. NEs using internal clock reference can easily become out-of-sync with other NEs.

Note: Synchronization switching is not available on all NEs.

Equipment Maintenance

NETSMART can be used to perform basic maintenance on the NE hardware. These include:

Adding and deleting a shelf for an existing NE
Provisioning a plug-in unit
Modifying equipment parameters
Creating and deleting equipment protection groups (EPGs)

Add a Shelf to an Existing NE

The shelf should be installed on an NE before adding it to NETSMART. A NETSMART user can add or remove shelves from an existing NE. For instance, to add a new Narrowband shelf (NBS) to an existing FACTR NE, NETSMART will need to autodiscover the shelf and its components such as slots, cards, facilities and cross connects.

Delete a Shelf from an Existing NE

A NETSMART user can remove shelves from an existing NE.

Note: All crossconnects must be removed before a shelf can be deleted.

Provision a Plug-In Unit (Put In Service)

Figure 10:
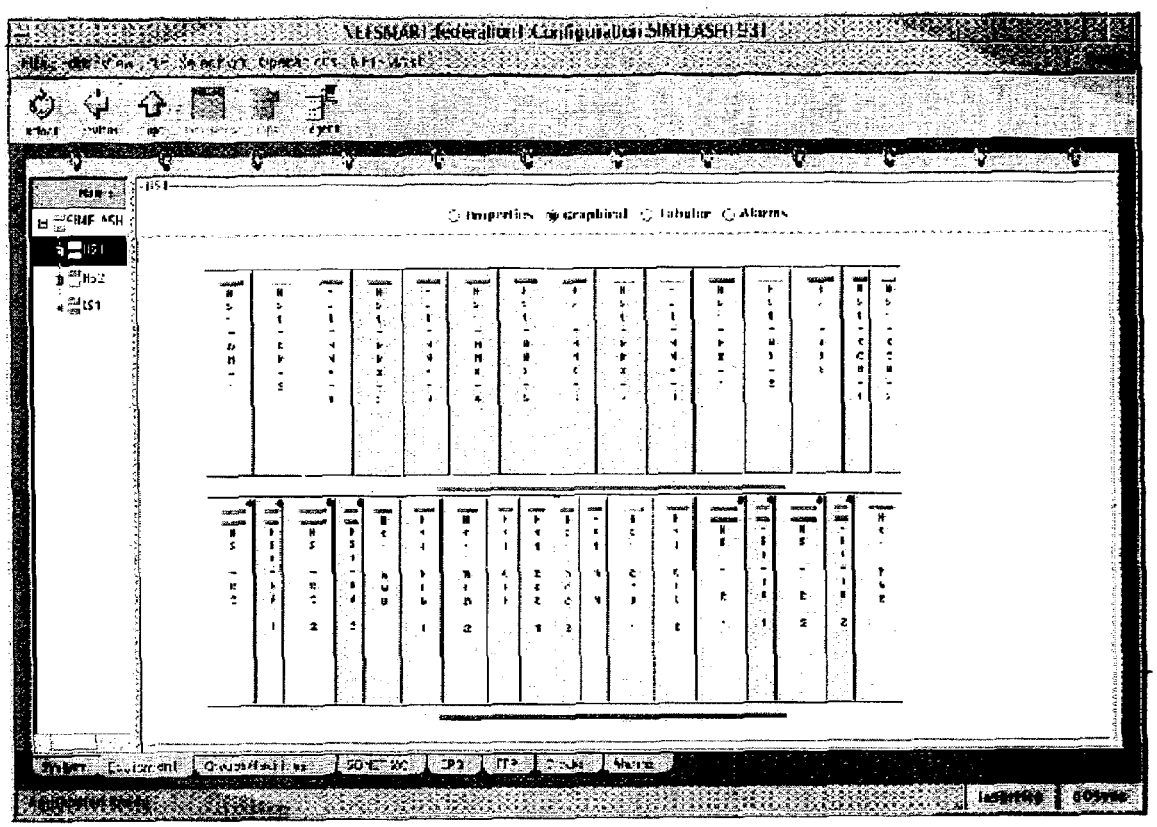
FIG. 10 shows the configuration of the equipment tab view.

A main shelf for a FLASH-192 (Release 2.1) or a FACTR Common shelf (CMS) or NBS can have some plug-in slots provisioned. The shelf must already be installed, but the plug-in does not need to be installed. Provisioning can also be accomplished by selecting the card or port and changing the required attribute to In Service (IS). FIG. 10 shows the Equipment Tab View for Provisioning.

Modify Equipment (Card and Port Attributes)

Individual cards and ports have attributes that can be modified. These attributes are shown in blue on the Properties window for the card or port. Values that are displayed in red are critical. Changing a critical value will trigger an automatic resynchronization.

Tasks

Figure 11:
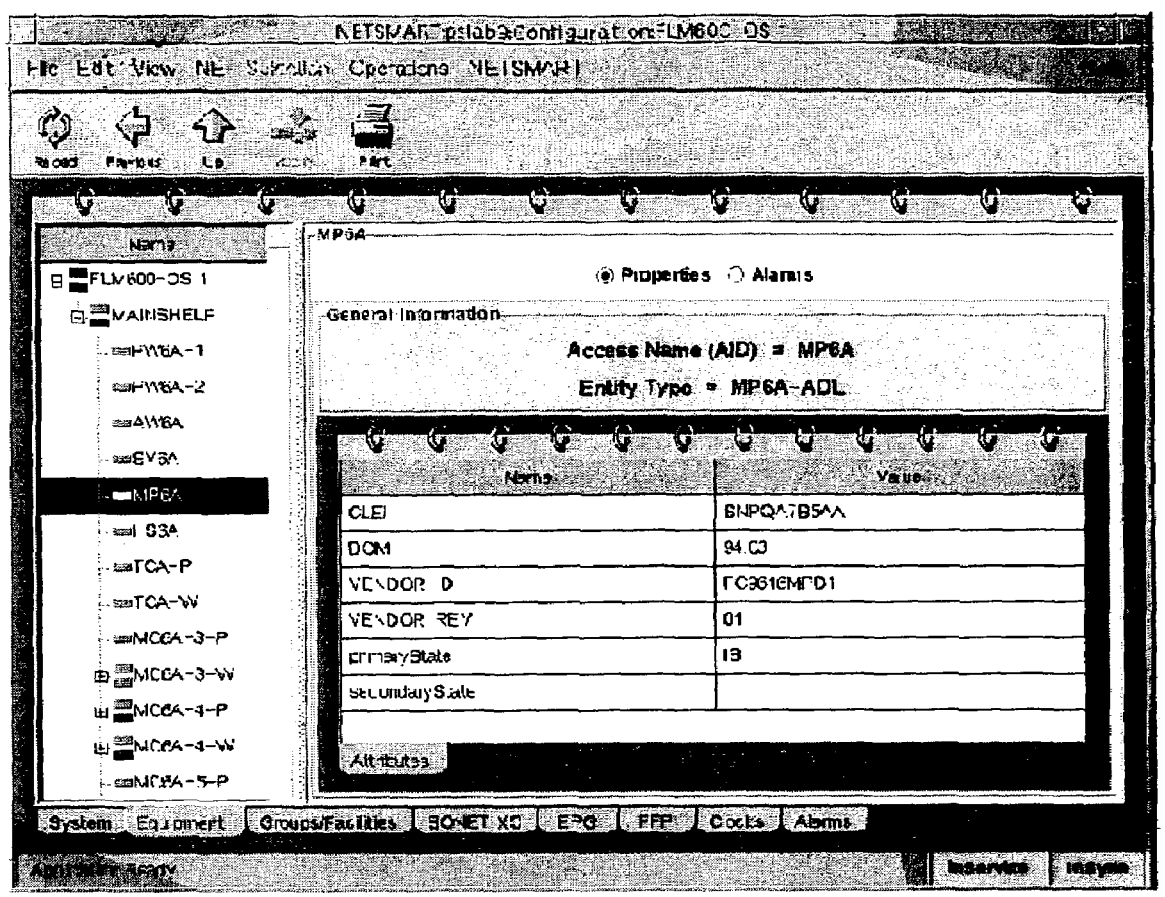
FIG. 11 shows the configuration of the properties view.

1 Log on the NE to be provisioned.
2 From the Configuration Manager window, select the Equipment tab.
3 Open the tree. From the tree area, select the card or port to be modified. The view in the window changes to the Properties view. Otherwise, select the card in the graphical shelf view, then right-click to display a menu where you can select Display Properties. The Properties view (FIG. 11) displays.
4 Modifiable attributes are shown in red and blue. Black text cannot be changed. In the Value column, click on the selection to be changed. A button appears to the right of the text. Type or select an option. Click on the button to display a drop-down list of available options. Select an option from the list. Repeat this step for all attributes that need to be changed for this card or port.
5 Click on the Modify tool, or select the Update option from the Operations menu. The Modify Attributes Operation progress dialog displays. When it closes, the attributes have been changed.

Create or Delete an EPG

Redundant equipment provides a level of protection against failure of certain plug-in units. For some types of NEs like FLASH192s, EPGs can be activated or deactivated using this procedure. For FLM and similar NEs, EPG are automatically created and cannot be deleted or modified.

Using the Administration Manager

The Administration Manager provides the ability to:
View administrative details about a selected NE.
Manage NE addressing.
View information about NE use.

Select Administration Manager from the NETSMART menu to display administration management tabs.

Use the System Administration Tab

The System Administration tab displays details about the different NETSMART processes that are running on the server. The NETSMART version that is currently installed and the most recent start time are shown in the heading.

Process monitoring can be enabled or disabled.

Figure 12:
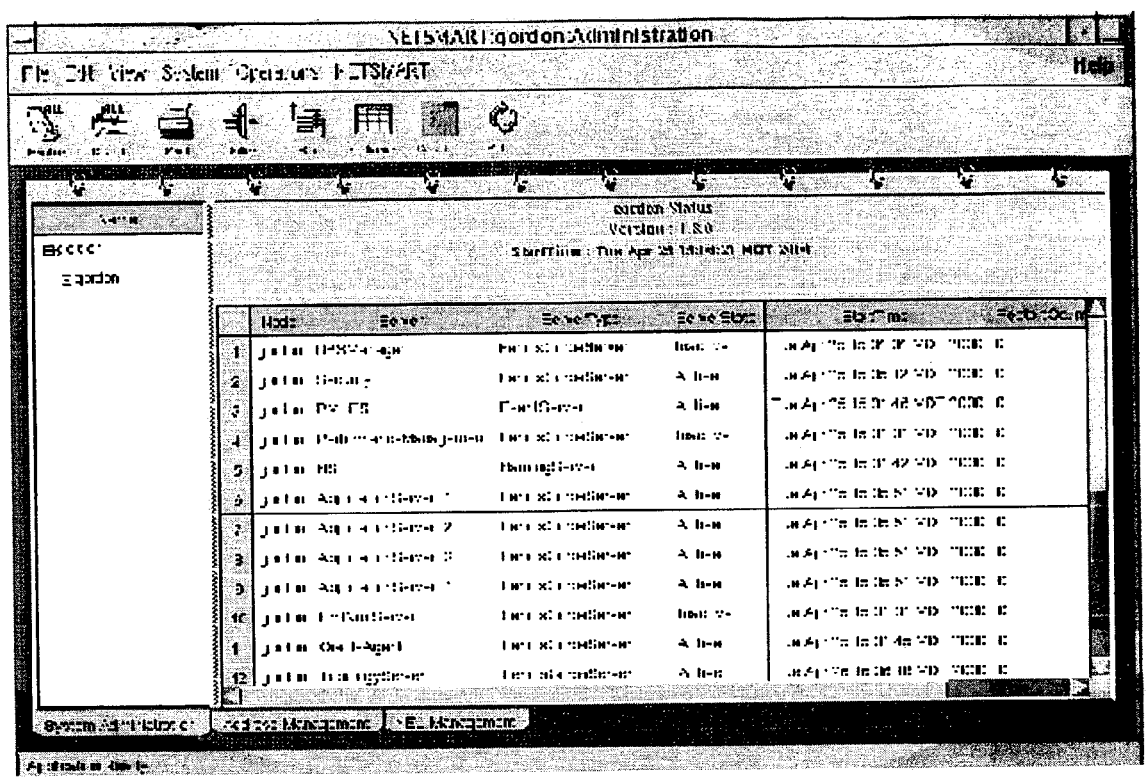
FIG. 12 shows the system administration view from the administration manager window.

System monitoring checks the status of the servers (active or inactive) You would disable monitoring only in extreme cases such as an urgent need for resources. If monitoring is enabled (the default setting) and a server goes down, NETSMART will detect state, and issues a message and attempts to restart the server. If monitoring is disabled and a server goes down, NETSMART will not detect its state change and will not issue a message or attempt to restart the server. FIG. 12 shows the Administration Managerview.

Administration Manager Set Password Dialog

From the System menu, select the FTP submenu. There are two cascading selections, Set Password, and Show Password. Select Set Password to change the password for security protection during an FTP transmission.

Use the Address Management Tab

The Address Management tab provides details about each NE. Information includes the TID, the communications protocol, the originating address type and the address.

All system-resolved or manually created OSI addresses are defined as TARP (Target ID Address Resolution Protocol). All IP addresses are defined as NETSMART. When the server restarts, all NETSMART addresses are retained; all TARP addresses are lost and must be re-resolved as part of the login process.

Figure 13:
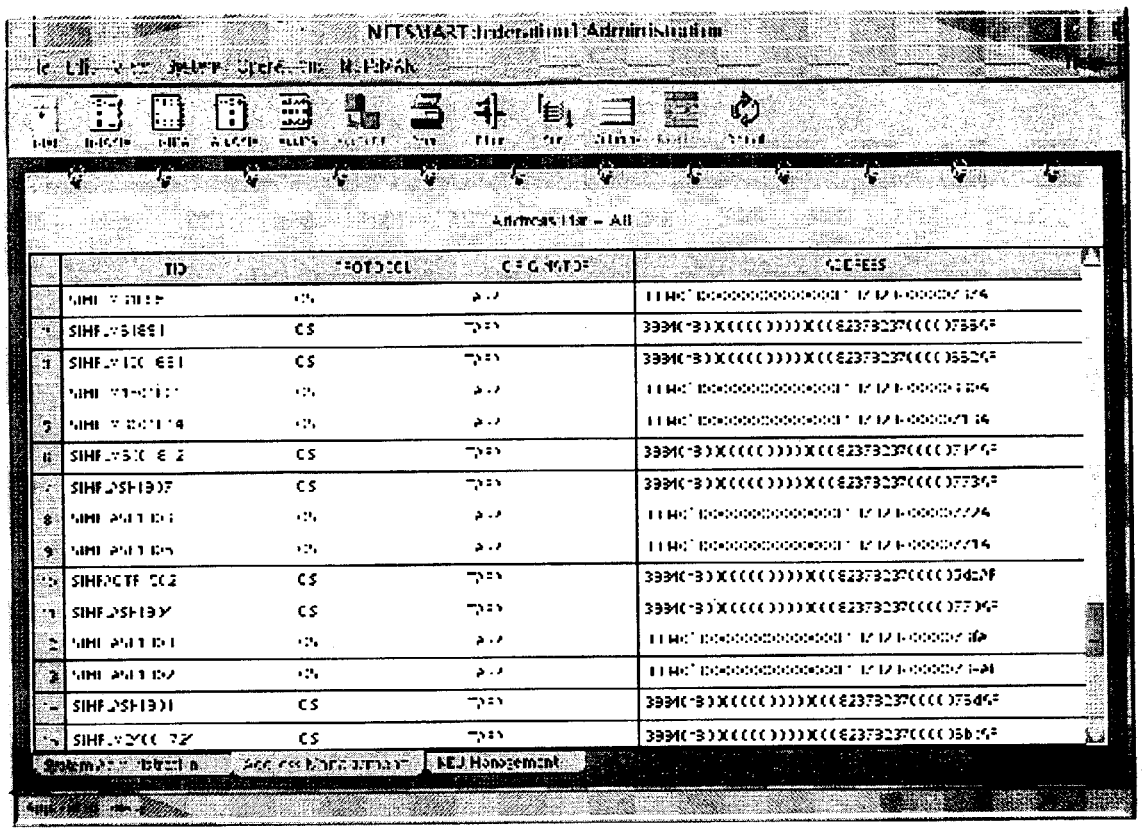
FIG. 13 shows the address mangement view from the administration manager window.

From the NETSMART System Administration window, select the Address Management tab (FIG. 13).

Add an OSI Address

Every NE in a NETSMART network configuration must have an OSI or an IP address. To enable communications within a ring configuration, the gateway NE must be configured as an IP NE.

If the NE is not a gateway NE, set an OSI address using the following procedure to configure an OSI NE:

View an OSI Address

Use this procedure to view an existing OSI address.

Add an IP Address

Figure 14:
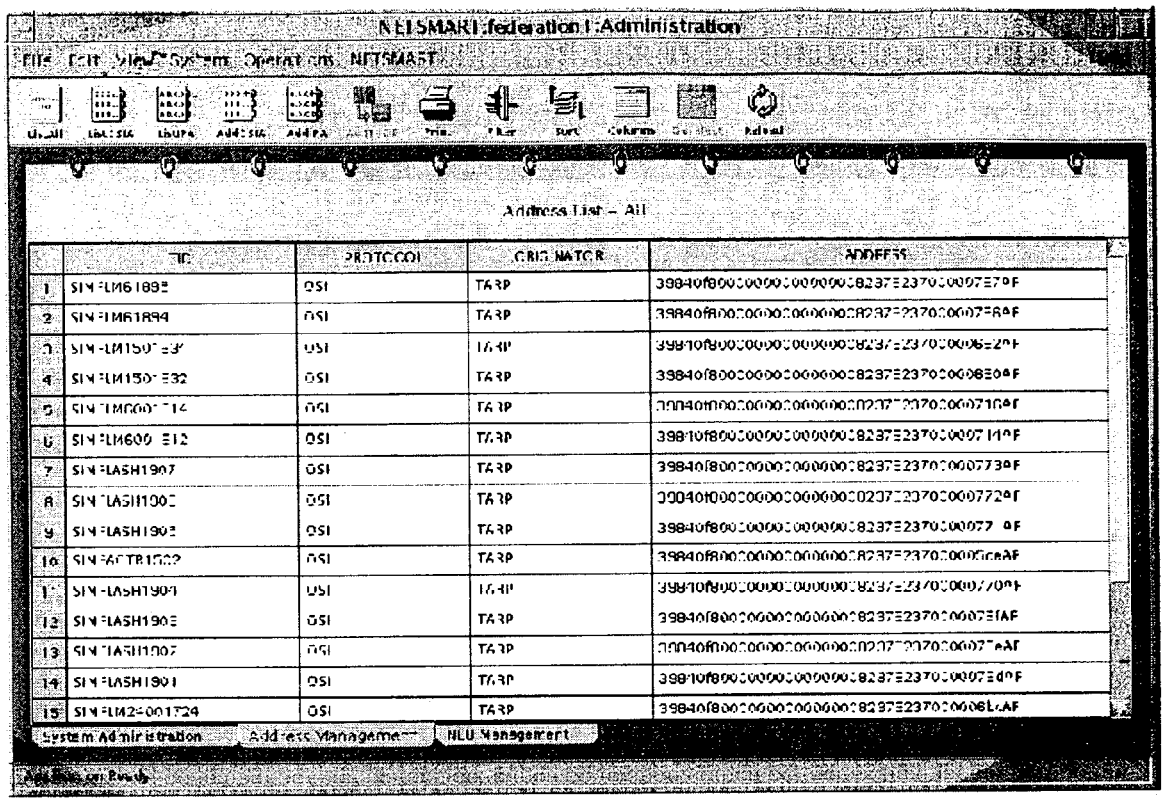
FIG. 14 shows the all-view of the address list.

Every NE in a NETSMART network configuration must have an OSI or an IP address. When enabling communications within a ring configuration, the gateway NE must be configured as an OSI NE. If the NE is not a gateway NE, set an IP address for the NE. FIG. 14 shows the Administration Address List—All View.

View an IP Address

Use this procedure to view an existing IP address.

Delete an IP Address

Use this procedure to delete an existing IP address.

Use the NEU Management Tab

The NETSMART hardware platform being used will support a maximum number of NE units (NEUs). When this number is exceeded, the database may not function properly. The NEU Management tab provides information about this usage, allowing for monitoring and managing network capacity.

Figure 15:
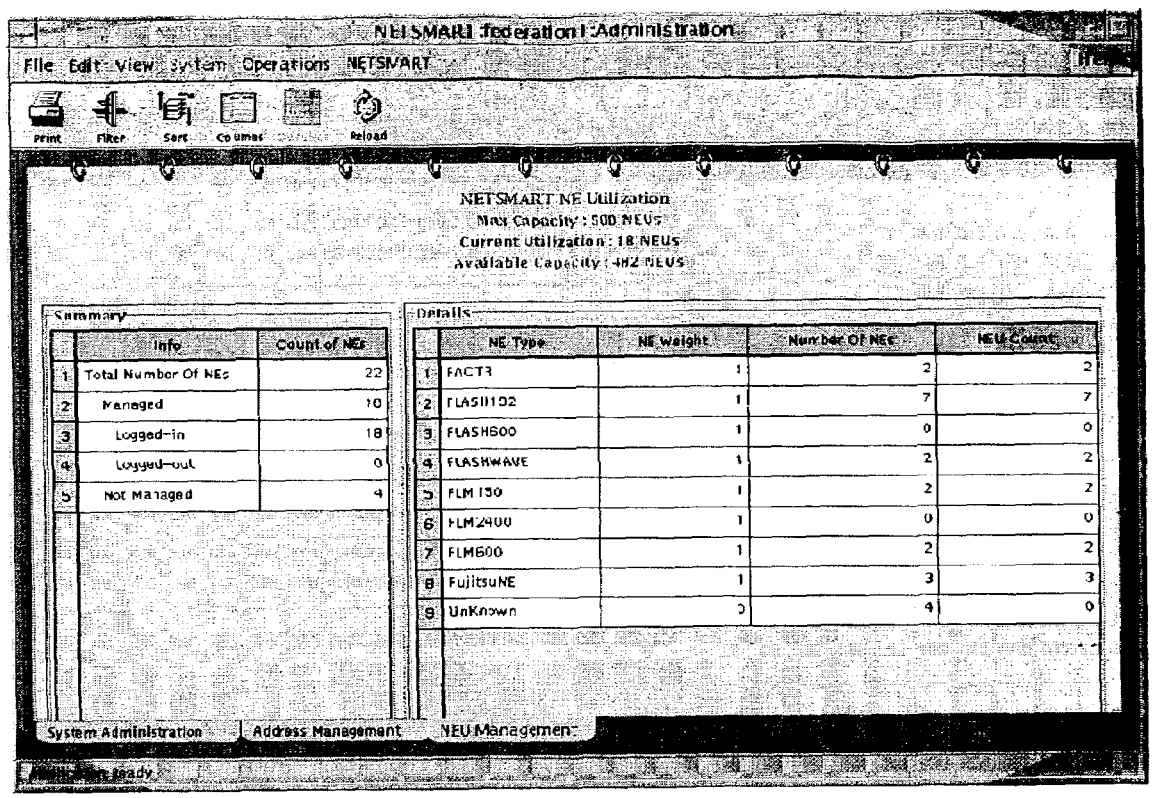
FIG. 15 shows the NEU management view.

The NETSMART NE Utilization window (FIG. 15) is divided into three areas:

The top part of the window contains the window title. The Max Capacity field shows the maximum capacity of the network. The Current Utilization field shows the current NEU count for the network. The Available Capacity field shows how many more NEUs can be supported within this network.

The Summary portion of the window shows summary information, including the Total Number Of NEs, the number Managed, the number Logged-in, the number Logged-out and the number Not Managed.

The total number of NEs is the total count of NEs in the system.

This includes NEs that are both managed and not managed. Managed NEs are those that the NETSMART system is aware of and has management control over. Logged-in are NEs that are logged in and active in NETSMART. Logged-out are NEs that are logged out and inactive. Not Managed are NEs that NETSMART is aware of but does not manage or control.

The Details portion of the window provides detail information, including the NE Type, the NE Weight, Number of NEs of this type in this network and the NEU Count. The capacity of NETSMART systems is based on Network Element Units (NEUs). Each type of NE is assigned an NEU value based on the number of objects to be managed.

Use the NEU Management view to monitor the number of NEUs currently logged on the system. Once the maximum capacity is reached, the system will deny creation of any new NEs.

Manage NE Software

This section provides procedures describing:
How to download software generics to an NE
How to perform NE memory backups
How to restore Service Database files to the NE
How to activate the software generics NETSMART uses an intermediate database called Software Repository to store and retrieve generic and service database files. This section describes procedures you will perform to install and extract software generic and service database files using the Software Repository.

About the Software Repository

The Software Repository is an internal database that NETSMART maintains in order to store software generic and service database files. It provides a way to extract files from the database to the file system. It also provides the means to remove generic and service database files from the database.

The Software Repository works off-line with the NE, so it is not necessary to log on to the NE to use this component. Once the generic or service database is installed in the repository, it can be downloaded to the NE using the Software Download (SWDL) component.

About Remote Memory Backup and Restore (RMBU)

Remote Memory Backup and Restore (RMBU) is used to make an NE memory backup and to restore the backup to the NE, when required. To use the SWDL and RMBU components, you must log on the NE. See Section Remote Memory Backup and Remote Memory Restore for details about using these features.

An RMBU Scheduler feature lets you schedule RMBU in advance. Scheduling options include weekly, monthly or one-time backups. See the Installation and Administration Guide, Scheduling Remote Memory Backups for NEs for details about using this feature.

Install Generics

Generics are software files that are specific to a particular NE and version. To upgrade the NE to a different version, the new version of the generics must be downloaded to the NE. Generics are supplied by Fujitsu Network Communications, Inc. (FNC) and are available to the customer:
On a floppy diskette
On a CD ROM
From a local or remote machine, using FTP file transfer See the Installation and Administration Guide, Installing NE Software Generics for procedures on installing software generics from a CD ROM or floppy.

Install Generics from a Local Machine

Figure 16:
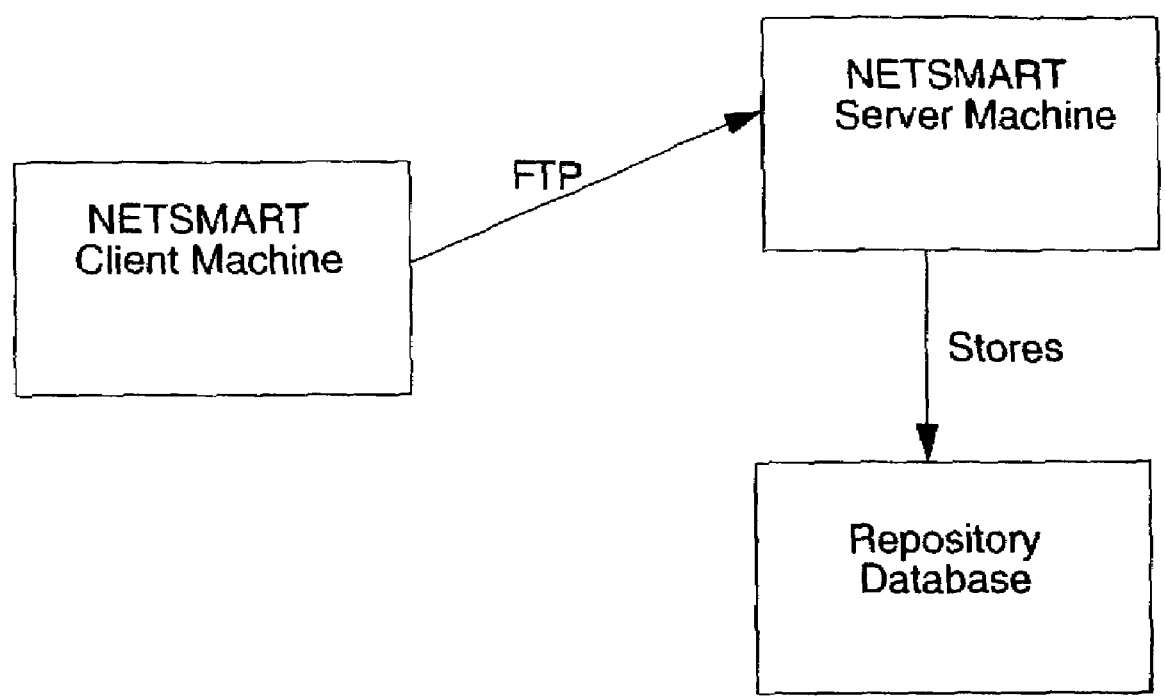
FIG. 16 shows the concept of installing generics from a local machine.

Installing generics from a local machine is a single-step process because generics were already copied into the NETSMART client machine file system. Whether the installation is done using FTP, floppy disk or CD ROM, the NETSMART server copies the generic files into the repository. FIG. 16 illustrates the concept.

Install Generics from a Remote Machine

Figure 17:
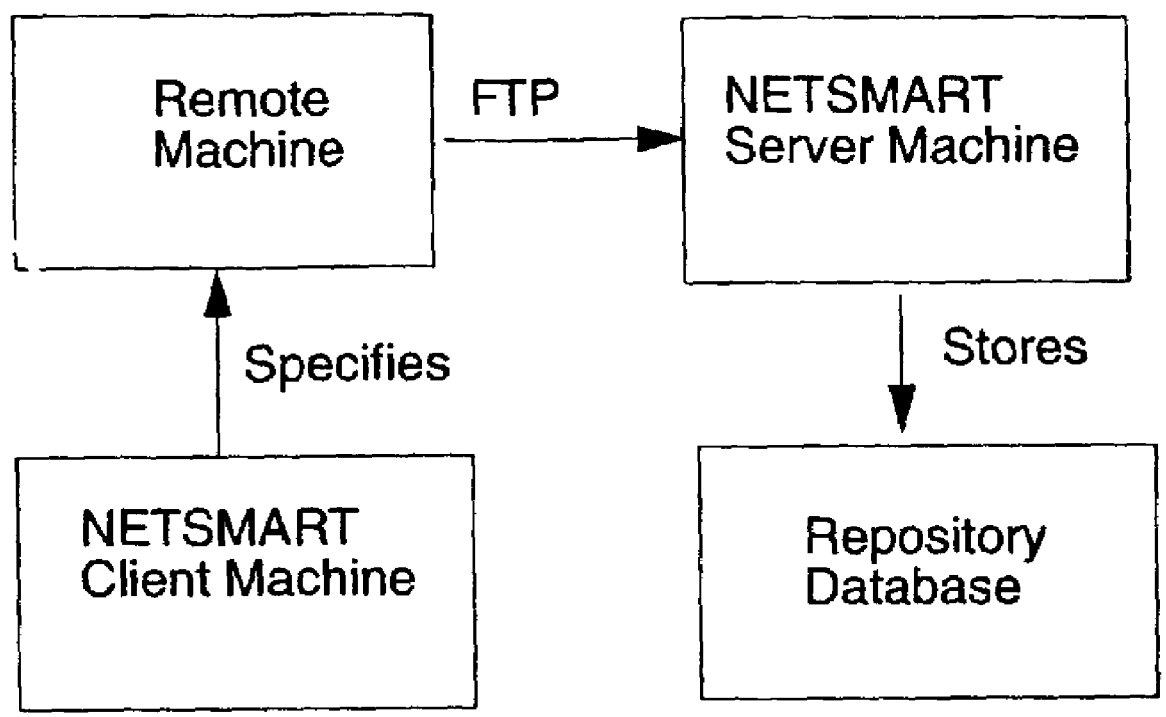
FIG. 17 shows installation of generics from a remote machine.

Installing generics from a remote machine is a single-step process. Generics can be directly picked up from the remote machine. In the following information, generics are available on a remote machine (where the NETSMART client is not running) that is connected to the network. FIG. 17 illustrates the concept of installing generics from a remote machine. The following are required before installing generics from the Client machine:

The remote machine must be running with the FTP Server daemon active.

You need log on access to the machine.

You need to know the directory path on the remote machine where the generics reside.

Extract Generics

If software generics are installed in the software repository, they can be extracted. The local file system can be extracted (where the NETSMART client is running) to any other remote machine where you have log on access, or can be copied onto a floppy disk or CD ROM for distribution purposes.

Remove Generics

If software generics are installed in the software repository, they can be removed. Be sure to remove the generics from the server machine.

Install the Service Database

You can install the service database files in the software repository for downloading to the NE in extreme cases such as NE memory corruption. To install the service database files, you need to have a valid set of database files from a previous NE backup created with the RMBU manager. Typically, if a memory backup of the NE has been taken, its service database files are stored in the software repository. It is possible that these files were extracted to the file system. In this case, install the files into the repository to download them to the NE.

Install from a Remote Machine

If the service database files are available on a remote machine file system, they can be installed directly into the software repository. The following are required before installing generics from the NETSMART client machine:

The remote machine must be running with the FTP Server daemon active.

You need log-on access to the machine.

You need to know the directory path on the remote machine where the generics reside.

Extract the Service Database

If the service database files are installed in the software repository, they can be extracted so that they can be saved on the file system or copied onto a floppy disk or CD ROM for distribution purposes. Extract the files to the local file system (where the NETSMART client is running) or to any other remote machine where you have log-on access.

Remove the Service Database

If the service database is already installed in the software repository on the server machine, it can be removed. Be sure to remove the service database, as others (those using NETSMART servers) may want to use the machine.

Software Download

SWDL is used to download new generic software releases (software generics) onto an NE using File Transfer Access and Management (FTAM) and FTP. As a precondition for SWDL, the generic should be installed in the Software Repository. For details about installing the generic on the Software Repository, refer to Install Generics for more details.

During the Software Download process, files are copied to the RAM Disk on the NE in the first step and then onto the CPUs. There are three different categories of NEs.
OSI NEs
IP gateway NE
IP subtending NEs.

Software Download on an OSI NE

The SWDL to Open Systems Interconnect (OSI) NEs is accomplished in the following way.
The files are copied to the RAM Disk on the NE and then the files are copied to the standby memory of the NE, or
Files are copied from Network Management System (NMS) to the RAM Disk on the OSI NE using FTAM (for IP gateway NEs this is done using FTP). At this stage, the software download is in a pending state; it will become active when the software is activated. For activation information, refer to "Configuring Scheduled Remote Memory Backups".

Software Download on IP Gateway NE

SWDL on an IP gateway NE is accomplished in the same way as the OSI NE.

Software Download on IP Subtending NE

For subtending NEs, an IP gateway NE is used as a pass-through for the files to be copied from the NMS to the destination NE. The procedure is accomplished in three steps.
1. The files are copied from NMS to the IP gateway NE RAM Disk.
2. Then files are copied from the gateway NE RAM Disk onto the IP subtending NE RAM Disk.
3. Finally, files are copied from the subtending NE RAM Disk to the corresponding CPUs on the IP subtending NE.

Consecutive Operations

From a user perspective, software download can be initiated only on a single NE at a time. Initiating software download on several NEs at the same time is not supported; however, you can start software download on different NEs, running one after another. Software download cannot be initiated on any NE while the NE is performing a remote backup or a restore.

For IP subtending NEs, an IP gateway NE is used as a pass-through for copying the files. An IP Gateway NE can be a gateway for several NEs, meaning that all the NEs under this gateway NE are dependent on this gateway NE for software management operations.

Details Dialog

Once an NE is selected from the Software Download dialog and the download is started, you can monitor the download. Select the Details dialog by clicking the Details button in the Software Download dialog.

The Details dialog displays the number of files to be transferred in each step and also the number of files currently transferring. Status strings on the Details dialog help you to understand the operation.

An important string called Failure Reason is displayed on the Details window if the SWDL is aborted. The failure reason will help you to understand why the SWDL failed.

Abort Operation

After SWDL is started, the Software Download can be aborted. Select the Abort button to display a status string on the SWDL window, indicating that the abort has initiated. It may take several minutes for the abort operation to be completed, depending on the stage of the SWDL.

Once the abort is completed, the status string contents will change to inform the user that the abort has completed. The message will provide the time of the abort. You can now schedule an activation and set the validation time. For more details about activation, refer to "Configuring Scheduled Remote Memory Backups".

Remote Memory Backup

Remote memory backup (RMBU) backs up the configuration database on an NE to the NETSMART database. At any time, only the last two versions of backup (per NE) are stored in the database. The backed-up NE configuration information can either be extracted onto any machine (with an active FTP daemon) or can be restored from the NE database. Refer to Extract the Service Database for details about extracting backed-up files onto a remote machine. Refer to Remote Memory Restore for details about restoring the NE database.

During the backup process, files are copied from CPUs to NE RAM Disk. There are three different categories of NEs.
OSI NEs
IP gateway NE
IP subtending NEs Remote Memory Backups from an OSI NE A remote memory backup from an OSI NE is accomplished in the following way:
The configuration files are copied to the RAM disk on the NE from active memory.
The files are copied from the NE's RAM disk to NETSMART using the OSI FTAM protocol.

Remote Memory Backup from an IP Gateway NE

A remote memory backup from an IP gateway NE is accomplished in the following way:
The configuration files are copied to the RAM disk on the NE from active memory.
The files are copied from the NE's RAM disk to NETSMART using the FTP protocol.

Remote Memory Backup from an IP Subtending NE

A remote memory backup from an IP subtending NE is accomplished in the following way:
The configuration files are copied to the RAM disk on the NE from active memory.
Using the OSI FTAM protocol, the configuration files are copied from the subtending NE's RAM disk to its gateway NE's RAM disk.
The configuration files are then copied to NETSMART using the FTP protocol.

Concurrent Operations

Backup can be initiated on up to 100 NEs. These NEs include OSI NEs, gateway NEs and IP subtending NEs. If backup is initiated on an IP subtending NE, this operation locks its gateway NE and transfers files through the gateway NE. If backup is initiated on multiple NEs within a ring, the gateway NE is shared across these backup operations.

At any time, backup for 10 NEs can be initiated in parallel. If backup for more than 10 NEs is requested, backups are serialized.

During either of the SWDL/RMR (Remote Memory Restore) operations on a gateway or subtending NE, you cannot initiate a backup on any of the NEs in that ring. If the NE database is being restored onto a gateway NE or a subtending NE, a backup cannot be initiated on any of the NEs in that ring.

Details Dialog

The Details dialog displays the number of files to be transferred in each step and also the number of files currently transferring. Status strings on the Details dialog help you to understand the operation.

An important string called Failure Reason is displayed on the Details window if the SWDL is aborted. The failure reason will help you to understand why the SWDL failed.

Abort Operation

Figure 18:
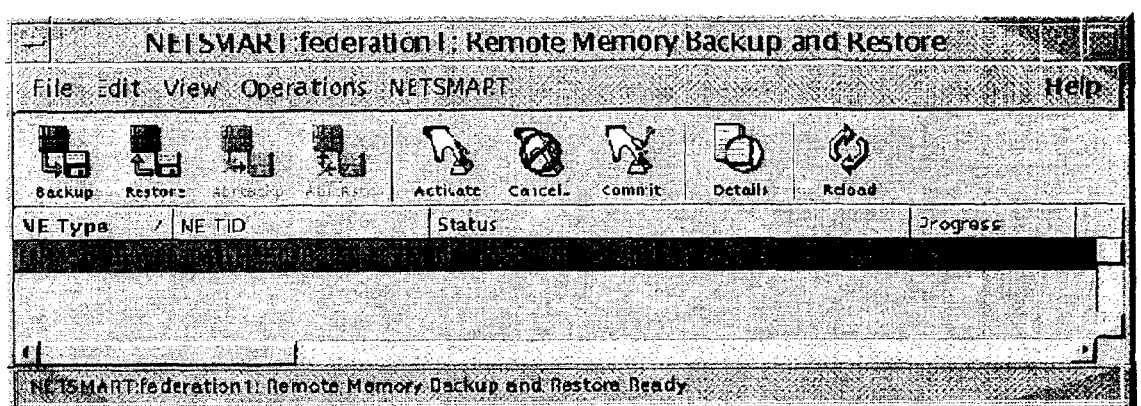
FIG. 18 shows the remote memory backup and restore window.

You can select an NE and click the AbortBkp tool. Status messages for this NE indicate initiation and completion of the abort operation. FIG. 18 shows the Remote Memory Backup and Restore Window.

Remote Memory Restore

If database corruption occurs on an NE, remote memory restore allows a previously stored configuration database for that NE to be used. The configuration files for an NE are stored either from the backup operation or by installing NE database files from a remote machine (with the FTP daemon running). Refer to Remote Memory Backup for details about backing up NE configuration files from an NE. Refer to Remote Memory Restore for details about installing these files.

Log on the NE to be restored. During the restore process, files are copied from NMS to NE RAM Disk and then onto CPUs. There are three different categories of NEs.

OSI NEs
IP gateway NE
IP subtending NEs

Remote Memory Restore to an OSI NE

A remote memory restore to an OSI NE is accomplished in the following way:

The configuration files are copied from NETSMART to the NE's RAM disk.
The configuration files are copied from the RAM disk on the NE to standby memory.
An activation of the standby memory needs to performed.
Refer to Software Activation for information on software activation.

Remote Memory Restore to an IP Gateway NE

A remote memory restore to an IP Gateway NE is accomplished in the following way:
The configuration files are copied from NETSMART to the NE's RAM disk using the FTP protocol.
The configuration files are copied from the RAM disk on the NE to standby memory.
An activation of the standby memory needs to performed.
Refer to Software Activation for more information on software activation.

Remote Memory Restore to an IP Subtending NE

A remote memory restore to an IP subtending NE is accomplished in the following way:
The configuration files are copied from NETSMART to the gateway NE's RAM.
The configuration files are copied from the RAM disk on the gateway NE to the RAM disk on the subtending NE using the OSI FTAM protocol.
The configuration files are copied from the RAM disk on the subtending NE to standby memory.
An activation of the standby memory on the subtending NE needs to performed. Refer to Software Activation for more information on software activation.

Consecutive Operations

A restore can be initiated on only one NE at a time. If any software management operation is running on any NE in a ring, you cannot initiate a restore operation on any of the NEs in that ring.

Backup Details Dialog

The Details dialog displays the number of files to be transferred in each step and also the number of files currently transferring. Status strings on the Details dialog help you to understand the restore operation. An important string called Failure Reason is displayed on the Details window if the restore operation is aborted. The failure reason will help you to understand why the restore failed.

Abort Backup Operation

While the restore process is active, you can select an NE and click on the AbortBkp tool to abort the backup process. Status messages for this NE indicate initiation and completion of the abort operation.

Software Activation

After the generic or database is loaded into memory, you need to schedule an activation.

Note: When activating either a software download or a remote memory restore, activation time can be selected based on the NE time. NETSMART reads the time from the TL1 response and places the NE time plus 2 minutes in the Time field. This is to prevent the SWDL or RMR activation time from being the exact current time. If this was the case, by the time the userfinished selecting activation time, the time would now be in the past.

Managing Crossconnects

This section provides the procedures for creating NE crossconnects. Crossconnect commands perform changes to the network and update the NETSMART database. NE crossconnect management provides the ability to modify the route for a circuit by changing the NEs and links where a signal is carried. NETSMART's graphical crossconnection feature lets you create crossconnects using a mouse click interface and lets you view and report on an end-to-end circuit through a SONET network.

Circuits may span multiple NEs and multiple interconnected rings and virtual rings. You can select the appropriate pass-through, drop-and-continue and service selector to assign.

Pending, active and errored connection states are supported. A pending connection state is one in which the crossconnects associated with a connection are defined in the database, but have not been configured in the NEs. In an active connection, the crossconnects associated with a connection are defined in the database and also configured in the NEs. An errored connection exists when there is a discrepancy between the definition of the connection in NETSMART and the actual crossconnects in NEs.

Crossconnect windows can be accessed from the Configuration Manager or by selecting Crossconnect Manager from the NETSMART menu. The crossconnect windows all bear the title "Configuration".

Add a DS0 Crossconnect

Use this procedure to create redline and regular DS0 crossconnects that drop off from the FACTR low-speed group (Group 3, 4, and 5) feeder to the Remote Digital Terminal (RDT) interface/NBS. T1 crossconnects are created using the procedure found in Add a T1 Crossconnect, below.

Figure 19:
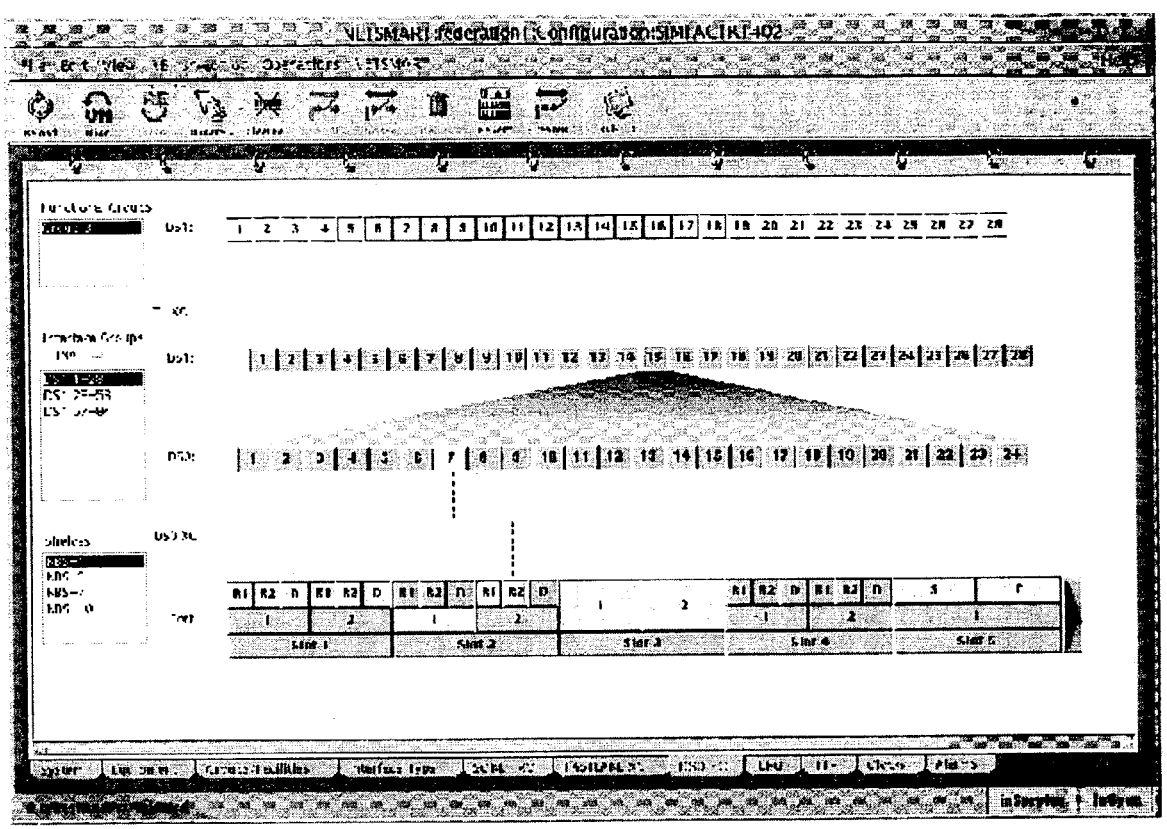
FIG. 19 shows the crossconnects: DSO XC tab.

If the interface group is Integrated Network Access (INA) or TR-008 Mode I or III, the next available DS0 time slot will be presented. If the interface group is TR-303 or TR-008 Mode II, the next Call Reference Value (CRV) number will be presented, and can be overridden. NETSMART determines the DS0 facility AIDs and sends the appropriate TL1 commands. FIG. 19 shows the DS0 XC crossconnect tab.

Add a T1 Crossconnect

Use this procedure to create the redline and regular DS1 feeder side of an interface group and the T1 facility in the FACTR low-speed group (Groups 3, 4, and 5) feeder for DS0 services.

Crossconnects are limited by the following types of interface groups:

TR-008 (Mode I)—Choose an available feeder DS1 (A, B, C, or D).
TR-008 (Mode H or III)—Choose an available feeder DS 1 (A or C).
TR-303—Choose an available DS1 (1 through 28).
INA—The T1 crossconnects are automatically created between the feeder of the INA interface group and the VT1 of the low-speed group when the first DS0 crossconnect is created. You cannot create them, but they can be displayed.

Tasks:
1 Log on the NE to be crossconnected.
  a. If Crossconnect Manager was selected from the NETSMART menu, the Configuration window displays. In the Configuration window, select the DS0 XC tab.
  b. If the crossconnect needs to be a redline, click the Redline tool or select Redline from the Create XC selection on the Operations menu.
  c. Click on the DS1 box to be connected, then drag the line to the port and click again. A dotted black line appears.
  Note: If the interface group or port (rectangle) is yellow, then it is already in use (possibly at a different speed).
  d. To complete the connection, click the Update tool or select Update NE from the Operations menu. The Confirmation dialog displays Add a FASTLANE Crossconnect FASTLANE crossconnects are used to map Ethernet and DS3 UNI services into an STS-1. FASTLANE™ service is only available for functional groups 4 and 5 configured as D3U or LAN bridge port (LBP). At least one dedicated STS-1 channel across the SONET ring must be available to carry the FASTLANE traffic. Two types of FASTLANE crossconnects are supported:

Ethernet Port-Mapped Bridge (EPMB)—an entity connecting an EPMB to a ring-side Asynchronous Transfer Mode virtual channel (ATMVC)

DS3 User Network Interface (D3UNI)—an entity connected to a particular ATMVC supported by a D3 UNI port to a ring-side ATMVC Ethernet port provisioning and ATMVC provisioning are performed independently of establishing crossconnects. Create ring-side ATMVCs to create a path through the network between the switches. The D3 UNI ATMVC ports are created by NETSMART. The value is shown for the next available Virtual Channel Identifier (VCI). You may override that channel selection.

Figure 20:
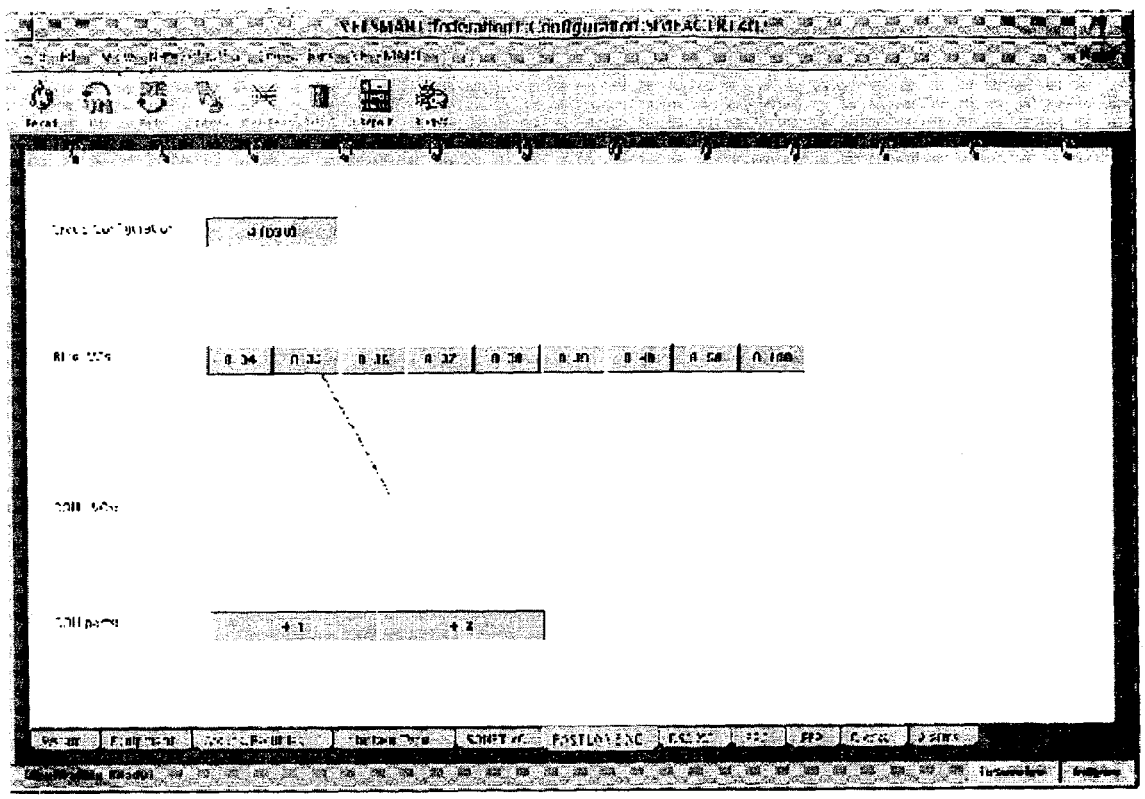
FIG. 20 shows the crossconnects: FASTLANE XC tab.

Tasks:
1 Log on the NE to be crossconnected
2 If the Crossconnect Manager was selected from the NETSMART menu, the Configuration window displays. In the Configuration window, select the FASTLANE XC tab. The Fastlane XC view (FIG. 20) displays.
3 Select Create ring VC from the Operations menu or right-click and select Create Ring VC from the drop-down menu. The Ring VC creation dialog displays.
4 Select or type values in the following fields:
  Ring VC VPI (0—0)—Type the Virtual Path Identifier (VPI). Only 0 is valid. Ring VC VCI (34-1023)—Type the VCI of the virtual channel.
  PCR—Type the Peak Cell Rate (PCR) per second.
  SCR—Type the Sustained Cell Rate (SCR) per second.
  Congestion Control—Select whether congestion control should be enabled or not.
  AAL-Type—Select the ATM Adaptation Layer (AAL). Only AAL5 is valid.
  From NE TID—The starting NE TID is the default value.
  To NE TID—Select the ending NE TID from the list.
5 Click Ok to add the ring VC and close the Ring VC creation dialog.
6 Click Apply to add the ring VC and leave the Ring VC creation dialog displayed.
7 Click Cancel to cancel any changes and close the Ring VC creation dialog. If Ok or Apply was selected, the new VC displays in the middle of the FASTLANE XC window.
8 Click on the appropriate port in the Group Configuration. On the FASTLANE XC tab, drag the mouse to the appropriate ring VC, then click again. A dotted line(s) will show the connection.
9 To complete the connection, click the Update tool or select Update NE from the Operations menu. The crossconnect Confirmation dialog displays Add a SONET Crossconnect A SONET crossconnect connects STS or VT time-slot facilities. A SONET crossconnect can connect a high-speed time slot to another high-speed time slot (pass-through), a high-speed time slot to a low-speed time slot (add and drop), and a low-speed time slot to another low-speed time slot (hairpinning). Time slot rates must match for all SONET crossconnects.

Note: For FLASH 192 2.x and 3.x NEs, not all AIDs can be interconnected. Only those AIDs that fan out from a SONET line that is green in color are open for crossconnects.

Figure 21:
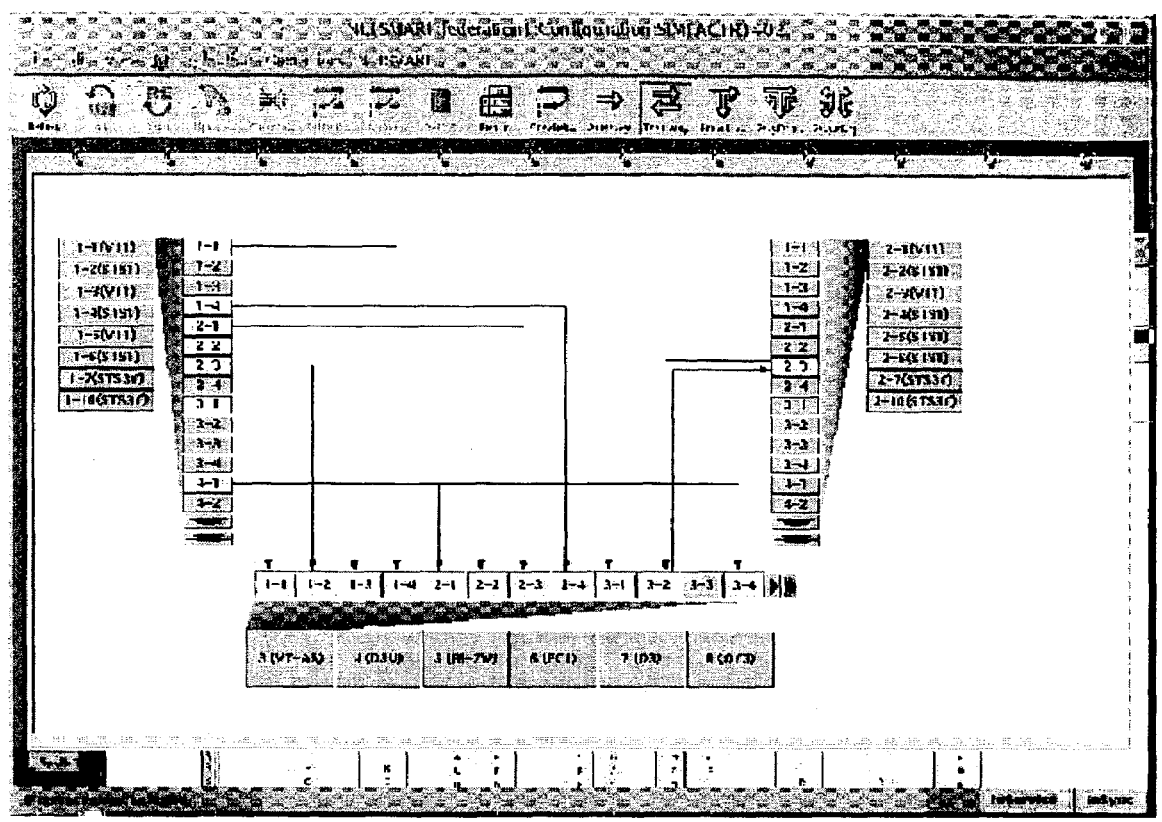
FIG. 21 shows the crossconnects: SONET XC tab.

Tasks:
1 Log on the NE to be crossconnected
2 If the Crossconnect Manager was selected from the NETSMART menu, the Configuration window displays. In the Configuration window, select the SONET XC tab. The SONET XC view (FIG. 21) displays.
3 Select the type of crossconnect (OneWay, TwoWay, OneWayBroadcast, TwoWayDropAndContinue, TwoWayAddAndDrop, or Service Selector) from the Create XC option of the Operations menu or by clicking on the corresponding tool.
  Note: Not all types of crossconnect are available at all times (depending on the AE type and the configuration).
4 If the crossconnect also needs to be a redline, click on the Redline tool or select Redline from the Create XC option on the Operations menu.
5 Click on the first STS or VT1 group to be connected, then drag the line to the far-end STS or VT1 group and click.

A dotted line shows the connection. If a drop-type connection is required, click on the first STS or VT1 group (left- or right-hand side), then click on the drop port along the bottom of the window and dotted lines will be generated (including the appropriate right-hand group).

Note: The time slot rates on both ends of this crossconnect must be equal. If the time-slot rectangle is yellow, then it is already in use (possibly at a different speed).

6 To complete the connection, click the Update tool or select Update NE from the Operations menu. The crossconnect Confirmation dialog displays Add a Hairpin Crossconnect A hairpin is a crossconnect between two low-speed SONET termination points.

Note: Hairpin crossconnects are supported for FLASH XC MV architecture. The FACTR or FLM 150 must have a TS1A-ENH2 (time slot assignment) unit, which allows the low-speed crossconnects. The system type must be linear or Unidirectional Path Switched Ring (UPSR) and the NE device system parameter TSTYPE must be provisioned as ENH2.

One-way, 2-way, bridge and roll crossconnects can be created, modified and deleted. Creation and deletion of redline crossconnects is supported. If a crossconnect is redlined, the redline must be removed before deletion.

Figure 22:
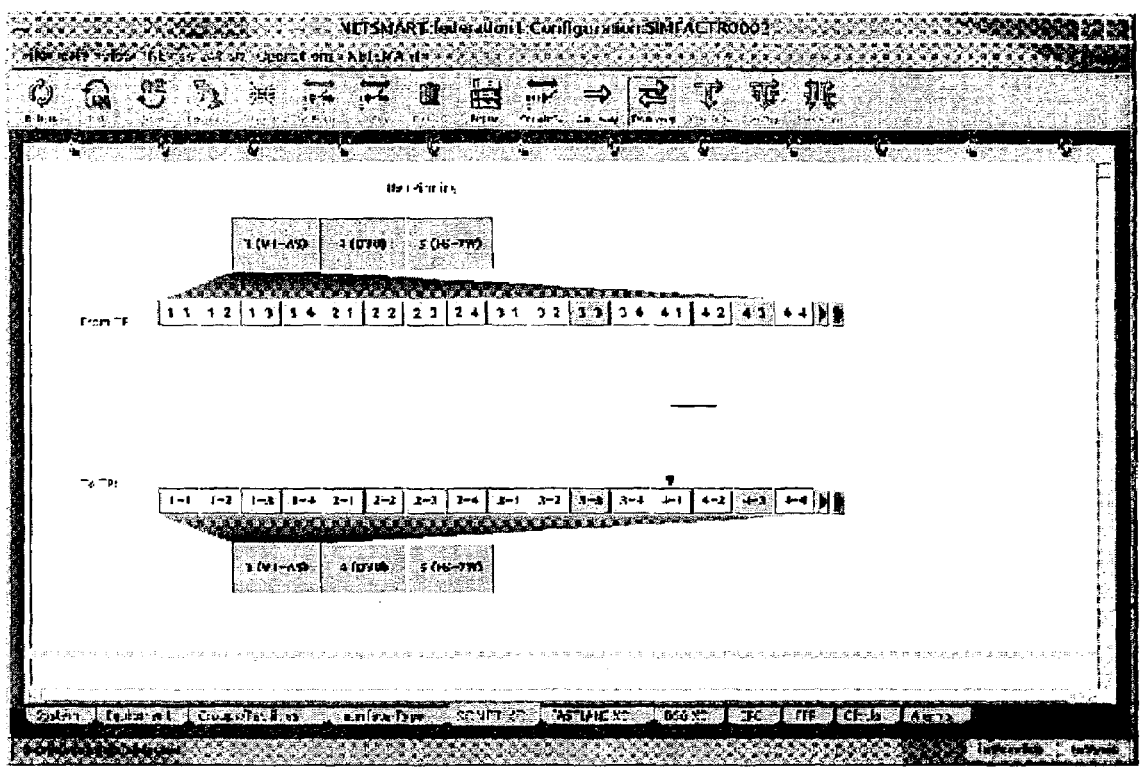
FIG. 22 shows the crossconnects: SONET XC tab hairpinning view.

Tasks:

1 Log on the NE to be crossconnected.
2 If Crossconnect Manager was selected from the NETS-MART menu, the Configuration window displays. In the Configuration window, select the SONET XC tab
3 Select the Hairpinning option from the Operations menu. The HairPinning view (FIG. 22) displays.
4 Depending on the type of crossconnect, select the One way or Two way tool or select the corresponding menu option from the Operations menu. If the crossconnect also needs to be a redline, click on the Redline tool or select Redline from the Create XC option on the Operations menu.
5 Click on the first group to be connected from the From TP line, then drag the mouse to the appropriate group in the To TP group and click again. A dotted line will appear.
6 When all of the crossconnects have been defined, click on the Update tool or select Update NE from the Operations menu.
7 Verify the connections. If the connections are correct, click Ok. If the crossconnect was created successfully on the NE, the line(s) will change from dashed to solid. If the crossconnect on the NE fails, the crossconnect lines will remain dotted. If connections are not correct, click Cancel and then change the connections. The Confirm Connection dialog displays, indicating the success or failure of the crossconnect.

Add a One-Way Service Selector Crossconnect

The one-way service selector is used for the BLSR configuration for FLASH-192 and FLM-2400 SONET NEs.

Figure 23:
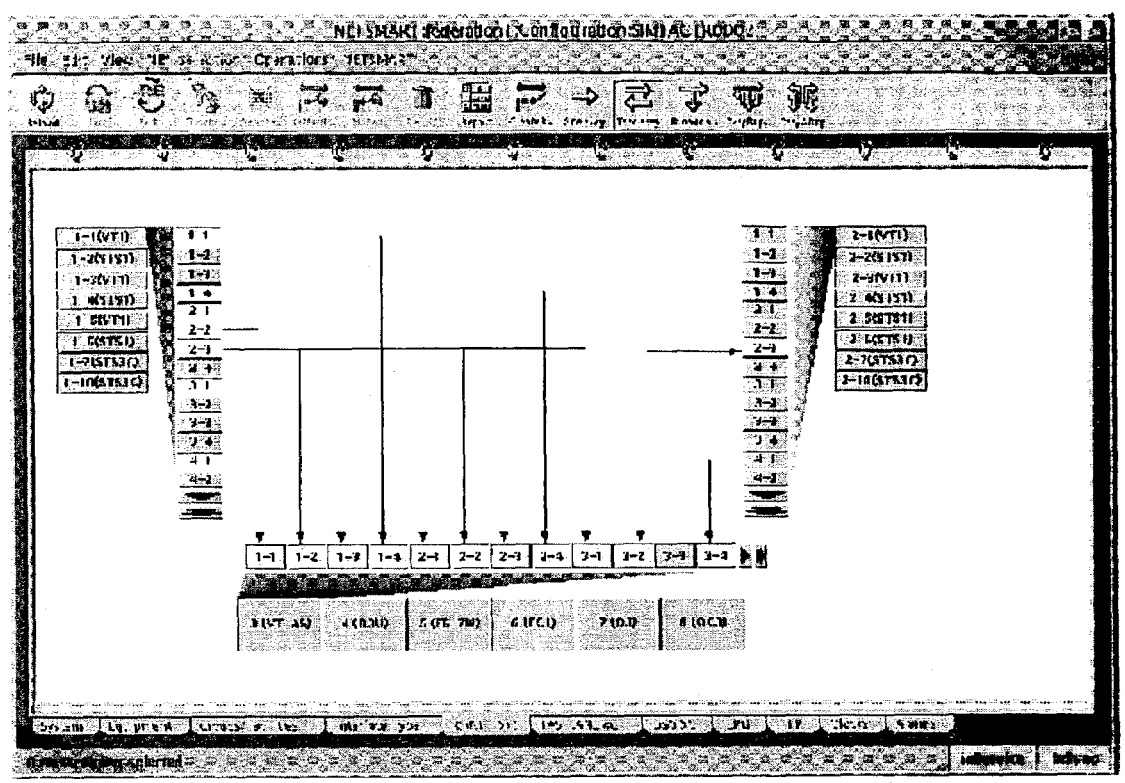
FIG. 23 shows the crossconnects: SONET XC tab.

Tasks:

1 Log on the NE to be crossconnected
2 If Crossconnect Manager was selected from the NETS-MART menu, the Configuration window displays. In the Configuration window, select the SONET XC tab. The SONET XC view (FIG. 23) displays.
3 Select the One Way service selector tool. Click on the low-speed port, then click on the destination high-speed port. The crossconnect displays as a dotted line.

Note: The default Service Selector and Holdoff times can be changed at this time by right-clicking on a crossconnect and selecting the appropriate menu item.

4 To complete the crossconnect, click on the Update tool or select Update NE from the Operations menu.

Perform a Bridge on an Existing Crossconnect

Bridge crossconnect functionality is supported for BLSR configurations of FLASH-192 and FLM 2400 SONET NEs. By setting up a bridge, traffic from one termination point is routed to two other termination points. Bridge and roll operations are performed on two NEs to complete the entire task. First do a bridge on a crossconnect on one NE and then do the roll on the other NE. After the roll is performed, clear the bridge on the first NE.

1 Log on the NE whose path is to be modified.
2 If Crossconnect Manager was selected from the NETS-MART menu, the Configuration window displays. In the Configuration window, select the SONET XC tab. The SONET XC view displays.
3 Select the 1-way drop crossconnect to be bridged.
4 Click the Bridge tool or select Bridge from the Operations menu.
5 Select the destination time slot. The display will show the new bridge connection as a dotted line on the window when the operation is completed.
6 To complete the connection, click the Update NE tool or select Update NE from the Operations menu.

Perform a Roll on an Existing Crossconnect

Roll crossconnect functionality is supported for the FLASH-192 and FLM 2400 SONET NEs. On an FLM 2400 SONET NE, this functionality is available only when the NE is configured as a BLSR. Rolling facilitates switching the source AID from one time slot to another time slot without loss of signal. Traffic is buffered by the NE during the roll operation.

The roll operation can be performed by selecting a 1-way crossconnect and then clicking the Roll tool or by selecting the Roll menu item from the Operations menu. After you select Roll, rubber banding starts and you can select a new origination point. A pending roll crossconnect is created You can then activate the roll crossconnect, which results in deletion of the original crossconnect and creation of a new roll crossconnect. Bridge and roll operations are performed on two NEs to complete the entire task.

First set a bridge on a crossconnect on one NE and then set a roll on the other NE. After the roll is performed, clear the bridge on the first NE.

1 Log on the NE whose path is to be modified.
2 If Crossconnect Manager was selected from the NETS-MART menu, the Configuration window displays. In the Configuration window, select the SONET XC tab. The SONET XC view displays.
3 Select the 1-way crossconnect to be rolled from.
4 Click the Roll tool or select Roll from the Operations menu. A prompt displays directing you to select the destination time slot.
5 Select the destination time slot. The display will show the new connection as a dotted line on the window when the operation is completed. The old connection will be displayed as a solid line.
6 To complete the connection, click the Update NE tool or select Update NE from the Operations menu.

Crossconnect Confirmation

The same dialog displays to confirm all types of crossconnects.

Figure 24:
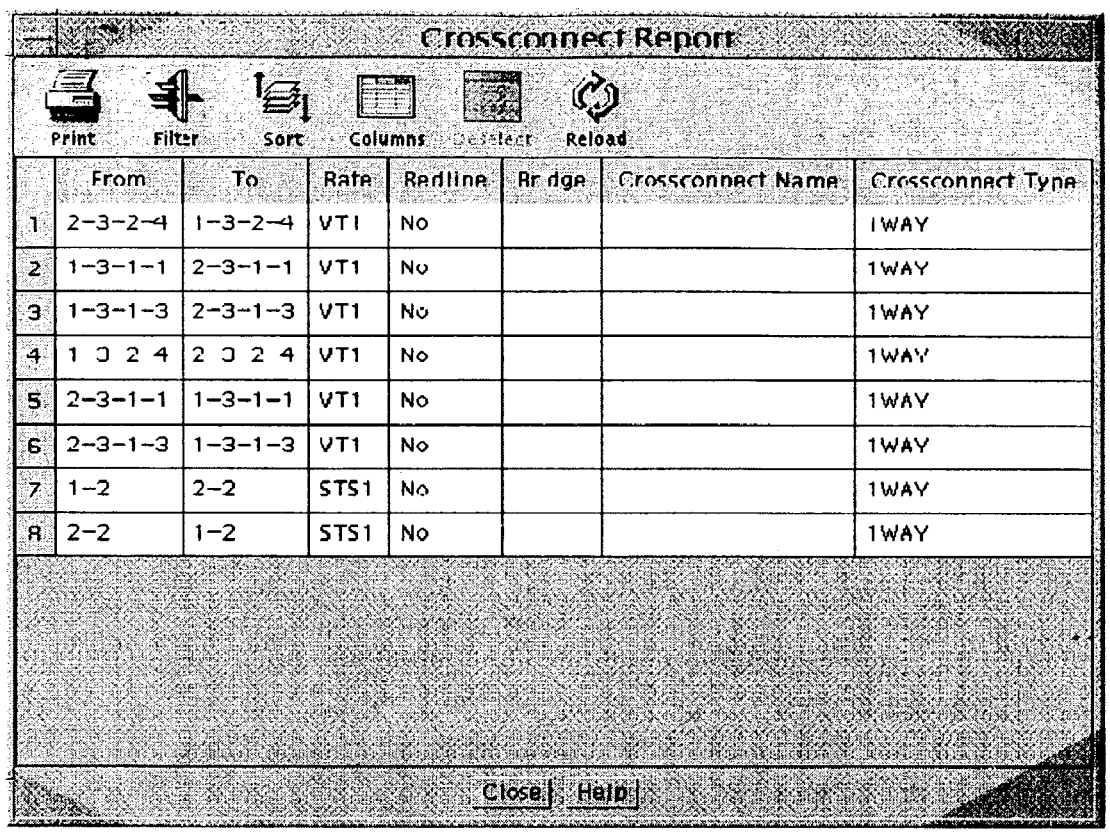
FIG. 24 shows the crossconnects: crossconnect report.

1 To complete the crossconnect, click on the Update tool or select Update NE from the Operations menu. The crossconnect Confirmation dialog displays.
2 Verify the connections. If the connections are correct, click Ok. If the crossconnect was created successfully on the NE, the line(s) will change from dashed to solid. If the crossconnect on the NE fails, the crossconnect lines will remain dotted. If connections are not correct, click Cancel and then change the connections. The Confirm Connection dialog displays, indicating the success or failure of the crossconnect.
3 Click the Close button to close the Crossconnect Report. FIG. 24 shows the Crossconnect Report.

Update the Crossconnect Name

Crossconnects are not given a name when they are created. The name can be structured to conform to the user's own network naming convention; however, crossconnect names must be alphanumeric, with no special characters. Several crossconnects can be updated at the same time.

Note: A crossconnect name must be alphanumeric and cannot contain any special characters.

1 Log on the NE with the crossconnect(s).
2 If Crossconnect Manager was selected from the NETSMART menu, the Configuration window displays. In the Configuration window, select the SONET XC tab. The SONET XC view displays.
3 Select the crossconnect that needs a new name. Select Set Name from the Operations menu, or right-click on the crossconnect and choose Set Name . . . . The Set Crossconnect Names dialog displays.
4 Type a new name.
5 Select the Set All button to move the crossconnect name to the Crossconnect Name field in the Set Crossconnect Names dialog. Click Ok to close the Set Crossconnect Names dialog.
6 The cross-connect displays as a dotted line. Click on the Update tool. The Confirmation dialog displays. Verify that the information is correct and click Ok.
7 The Messages dialog box displays with the new name shown in the table. Click Ok.

Adding Redline Designation to an Existing Crossconnect

Adding a redline designation to a crossconnect indicates that it is a critical circuit and care should be taken when changes or disconnects are issued that affect the crossconnect.

Figure 25:
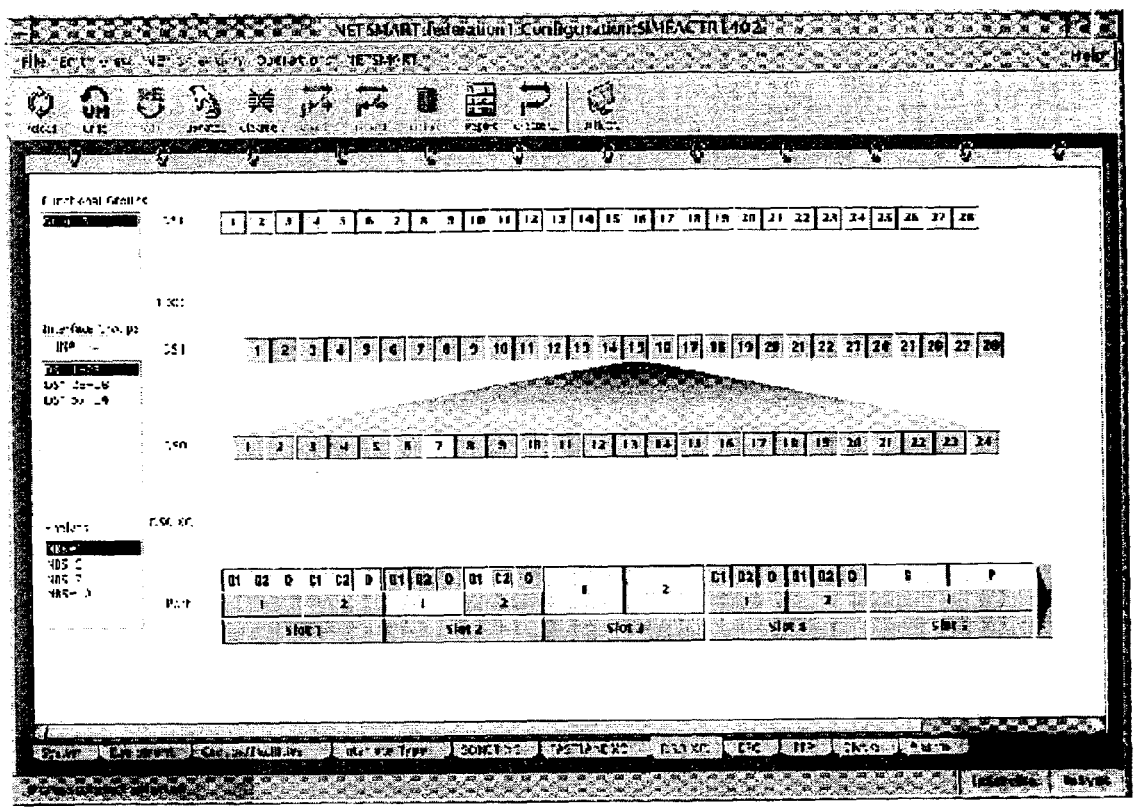
FIG. 25 shows the crossconnects: DSO XC tab.

1 Log on the NE with the crossconnect(s
2 From the Configuration Manager, select the SONET XC tab or DSO XC tab, depending on the type of crossconnect to be redlined.
FIG. 25 shows the DSO XC display.
3 Select the crossconnect that needs to be redlined. Click the SetRedl tool or select Set Redline from the Operations menu. Multiple crossconnects can be chosen by holding down the SHIFT and CTRL keys, then clicking on the crossconnect lines. The crossconnect line will change to a dotted red line.
4 To complete the redline designation, click on the Update tool or select Update NE from the Operations menu.

Delete a Crossconnect

Most crossconnects can be deleted using this procedure. If the crossconnect is redlined, the redlining must be removed, as described this procedure.

1 Log on the NE where the crossconnect is to be deleted.
2 If Crossconnect Manager was selected from the NETSMART menu, the Configuration window displays. In the Configuration window, select the appropriate tab: SONET XC, DSO, or FASTLANE.
3 If the crossconnect is redlined, the redline designation must be removed first. Select the crossconnect and click the NoRed tool or select Unset Redline from the Operations menu. Click on the Update AE tool or select Update NE from the Operations menu. The Confirmation dialog displays.
4 Click Ok to remove the redline.
5 Click on the crossconnect to be deleted. Multiple crossconnects can be selected by holding down the CTRL and SHIFT keys and then clicking on each crossconnect to be deleted.
6 Click on the DelXC tool or select Delete XC from the Operations menu. The crossconnect line changes from solid to dashed, indicating a pending change of state.
7 After all crossconnects have been marked for deletion in the GUI, make the changes to the NE by clicking the Update tool or select Update NE from the Operations menu. The crossconnect Confirmation dialog displays.
8 Verify that the appropriate crossconnects are listed, then click Ok to complete the deletion. If the crossconnections are not correct, click Cancel and reselect the connections. If you cancel the deletion, click the Undo tool to reinstate the connection.

Changing SSDEF

The Service Selector Definition (SSDEF) is, by default, set to Insert. To reset the SSDEF to Thru, perform the following procedure:

1 Log on the NE where the SSDEF is to be reset. Access the appropriate crossconnect window.
2 Right-click on a crossconnect to display a menu.
3 Select Set SS to Thru. The menu selection Set SS to Thru changes to Set SS to Insert. You can toggle this selection between the two items. Only the inactive selection will display in the menu.

Changing the Holdoff Timer Value

The holdoff timer is used to set the time interval after a protection switch when the NE will check the traffic origin and reset to that origin if possible. To change the holdoff timer value, perform the following procedure:

1 Log on the NE where the holdoff timer is to be set. Access the appropriate crossconnect window.
2 Right-click on a crossconnect to display a menu.
3 Select Holdoff Timer. Type a value for the reset interval.

Trace from a Time Slot

If you are viewing a crossconnect with one termination point, but no crossconnect visible, you can discover the other end of this crossconnect.

1 Log on the NE. Access the appropriate crossconnect window.
2 Right-click to select a crossconnect and display a menu where you will choose Trace XC. A label will display beside the crossconnect termination point where you right-clicked. This label identifies the other end of this crossconnect.

Manage Facilities

This section provides the procedures for defining and managing facilities for FLASH-192, FLM and FLASH-WAVE NEs. Primary states for facilities are: In Service (IS), Out of Service Autonomous (OOS-AU), Out of Service Management or Memory Administration (OOS-MA) and Out of Service Autonomous Management (OOS-AUMA). Facilities can also have a secondary state of Out of Service Management Unassigned (OOS-MA:UAS) when they are manually deleted.

Facilities can have secondary states of active (ACTI), normal (NR), abnormal (ANR), standby-hot (STBH), supporting entity outage (SGEO), facility failure (FAF), unassigned (UAS), and automatic in service (AINS).

Add a Facility (FLASHWAVE or FLASH-192)

Use this procedure to add fiber facilities for a FLASHWAVE or FLASH-192 NE.

Note: Facilities cannot be created unless supporting equipment has been created.

Note: When creating or modifying OC-48/OC-192 facilities in a Transponder type of FLASHWAVE NE a message will ask you to provide directional attribute information. Always input the attributes (UNI or BI, for example) in upper case.

Figure 26:
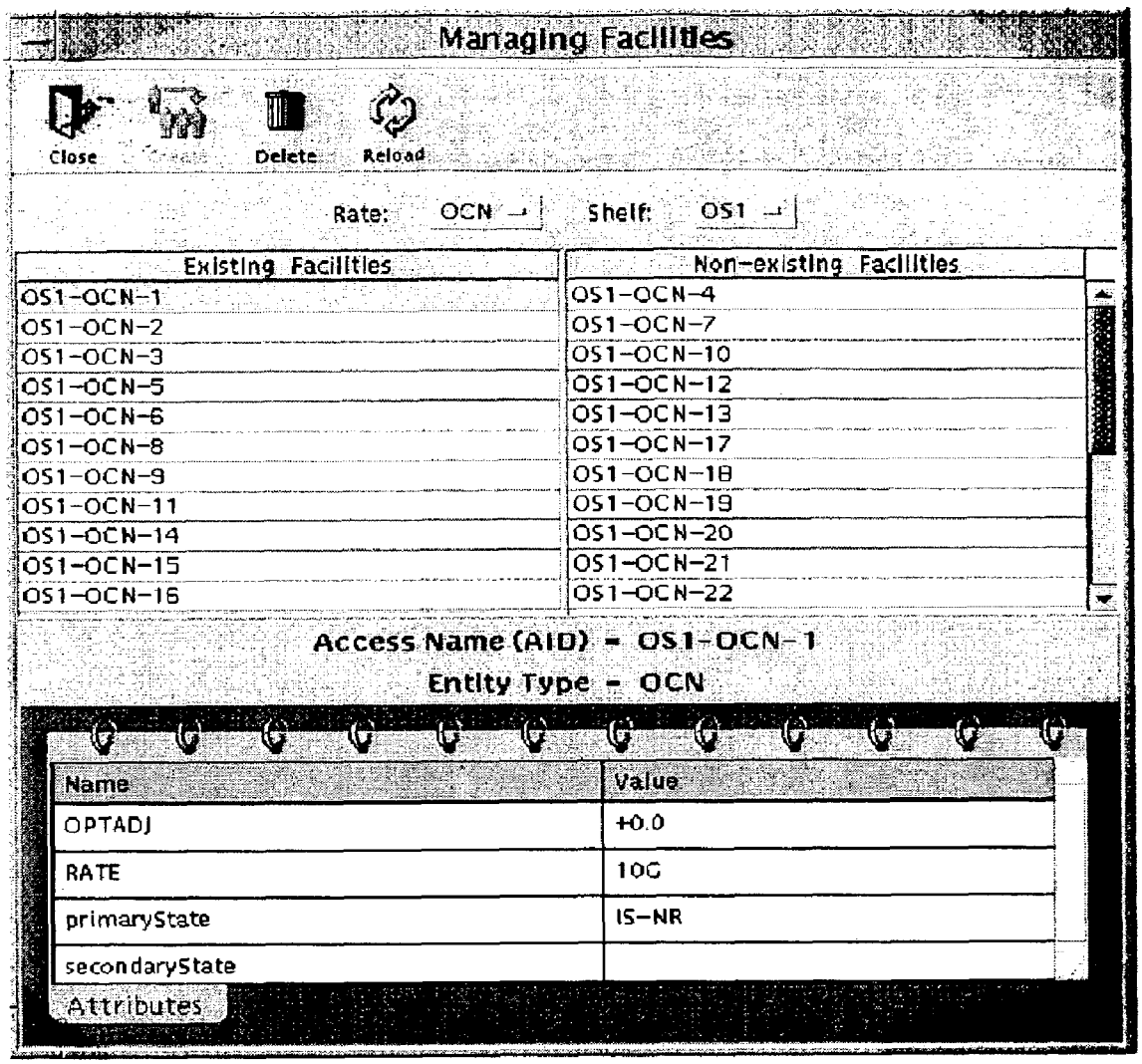
FIG. 26 shows the managing facilities dialog.

1 From any tab in the Configuration Manager, select the Managing Facilities . . . option from the NE menu. The Managing Facilities dialog displays (FIG. 26, Managing Facilities Dialog).

2 Click on the rate and select the rate from the Rate drop-down list. Select the shelf from the Shelf drop-down list. Select the facility in the Non-existing Facilities column. Click the Create tool.

Note: If there are no nonexisting (deleted) facilities, there will be nothing in this list 3 If this facility has any key attributes whose value should be specified at creation time, a dialog containing the key attributes will display. Enter the values for these attributes and click Ok.

4 The selected attributes of the selected facility will display in the Attributes table. Click the Create tool. A Manage Facilities message box displays: Creating Facilities. The facility will be moved from the Non-existing to the Existing column and will be activated.

Modify a Facility

This procedure allows you to modify facilities.

Note: When creating or modifying OC-48/OC-192 facilities in a Transponder type of FLASHWAVE NE a message will ask you to provide directional attribute information. Always input the attributes (UNI or BI, for example) in upper case.

1 From the Configuration Manager, select the Groups/Facilities tab.

2 Select the facility from the expanded tree or from the graphic area.

The Attributes view displays. This display will vary slightly, depending on the command origin (issued from the tree or graphic area).

3 Modify the required values shown in blue or red, then click the Modify tool or select the Update option from the Operations menu. Available operations include InServ, OOSMA, OOSMT, InServ, Operate PSW and Release PSW (the particular operation(s) available will depend on the facility). The same options can also be chosen from the Operations menu.

4 The values will be modified in the NE and the NETSMART database Delete a Facility. This procedure allows you to delete facilities for a FLASHWAVE or FLASH-192 NE.

Delete a Facility

1 From any tab in the Configuration Manager, select the Managing Facilities option from the NE menu. The Managing Facilities dialog displays.

2 Select the shelf from the Shelf drop-down list. Click on the rate and select a rate from the Rate drop-down list. Select the facility in the Existing Facilities column. Click the Create tool.

Note: If there are no existing (created) facilities, there will be nothing in this list.

3 A confirmation dialog displays. Click Ok to delete the facility. The facility will be moved from the Existing Facilities to the Non-exisiting Facilities column and will be deactivated Activate an FFP Group (FLASH-192)

Fiber Facility Protection (FFP) groups are available for FLASH-192. The equipment and the facilities to support the FFP group must already be created. A list of FFP pairs is displayed and you will select the FFP to be created.

Note: Changing FFP groups may change system configurations, which can cause system configuration inconsistencies.

1 From any tab in the Configuration Manager, select the Manage FFP option from the NE menu. The Manage FFP dialog displays.

2 Select the shelf from the Shelf drop-down list. Click on the rate and select the rate from the Rate drop-down list. Select the FFP in the Non-existing FFP column.

Note: The list will be empty If there are no nonexisting (deleted) FFPs.

3 Click the Create tool.

4 The FFP will move from the Non-Existing FFP to the Existing FFP column and will become active.

Modify (or View) an FFP Group

The FFP group attributes for NEs can be modified, by performing the following tasks:

1 From the Configuration Manager, select the FFP tab

2 Select the FFP group from the expanded tree or double-click on the FFP in the graphic area. The Attributes tab for the group displays.

3 Modify the required values shown in blue and red by clicking on the value, then select the new option from the drop-down list.

4 Click the Modify tool to download the changes to the NE. The changed values will be displayed in the Value column.

Deactivate an FFP Group (FLASH-192)

Active FFPs for a FLASH-192 can be deactivated, by performing the following tasks:

1 In any tab in the Configuration Manager, select the Manage FFP option from the NE menu. The Manage FFP dialog displays.

2 Select the shelf from the Shelf drop-down list.

3 Select the rate from the Rate drop-down list.

4 Select the FFP in the Existing FFP column.

5 Select Delete from the Edit menu. The FFP will be moved from the Existing FFP to the Non-Existing FFP column and will be deactivated.

Managing Wavelengths

Use the NETSMART Wavelength Management feature to produce a report about wavelength inventory in your network. The report includes:

Wavelength (in nm)

Frequency (in THz)

Part number for narrowband optics or transponder card

AID

Wavelength availability and primary status

OCN WLR (Optical Carrier Level n Wavelength Received)

OCN OPR (Optical Carrier Level n Optical Power Received)

WCH OPT (Wavelength Channel Optical Power Transmitted)

WDM OPR (Wavelength Division Multiplexer Optical Power Received)

WDM OPT (Wavelength Division Multiplexer Optical Power Transmitted)

Note: To avoid confusion, the window display is static (is not updated) once the view is requested. You must use the Reload tool or the Reload NE List command to redisplay the window and view updated information.

Wavelength Support

The following wavelengths are supported:

| Wavelength (nm) | Frequency (THz) | 10 G Part Number |
|---|---|---|
| 1535.82 | 195.2 | 08 |
| 1536.60 | 195.1 | 09 |
| 1537.39 | 195 | 10 |
| 1538.18 | 194.9 | 11 |
| 1538.97 | 194.8 | 12 |
| 1539.76 | 194.7 | 13 |
| 1540.55 | 194.6 | 14 |
| 1541.34 | 194.5 | 15 |
| 1542.14 | 194.4 | 16. |

Produce a Wavelength Inventory Report

The Wavelength Management window can be started from any application with a NETSMART menu item.

| Wavelength (nm) | Frequency (THz) | 10 G Part Number. |
|---|---|---|
| 1542.93 | 194.3 | 17 |
| 1543.73 | 194.2 | 18 |
| 1544.52 | 194.1 | 19 |
| 1545.32 | 194 | 20 |
| 1546.11 | 193.9 | 21 |
| 1546.91 | 193.8 | 22 |
| 1547.71 | 193.7 | 23 |
| 1548.51 | 193.6 | 24 |
| 1549.31 | 193.5 | 25 |
| 1550.11 | 193.4 | 26 |
| 1550.91 | 193.3 | 27 |
| 1551.72 | 193.2 | 28 |
| 1552.52 | 193.1 | 29 |
| 1553.32 | 193 | 30 |
| 1554.13 | 192.9 | 31 |
| 1554.94 | 192.8 | 32 |
| 1555.74 | 192.7 | 33 |
| 1556.55 | 192.6 | 34 |
| 1557.36 | 192.5 | 35 |
| 1558.17 | 192.4 | 36 |
| 1558.98 | 192.3 | 37 |
| 1559.79 | 192.2 | 38 |
| 1560.60 | 192.1 | 39 |

If you open this window from the Topology window, the following selections are available:
Select a number of NEs.
Select a number of groups.
Select a number of NEs and groups.
Select the Network group.

If any of these selections are made, the Wavelength Management window displays with only the selected FLASH-WAVE terminals.

Otherwise, all existing FLASHWAVE terminals are displayed To produce a wavelength inventory report, perform the following tasks:
1 From the NETSMART menu, select Wavelength Management. The Wavelength Management window displays.
2 The list area contains a list of all FLASHWAVE terminal NEs. Click on an NE to display its data.
3 To filter the columns of the data display, select the Filter tool from the toolbar.
4 Click on the first button below the Field label. A list of values to filter with displays. Values include Wavelength (nm), Frequency (THz), Transponder or I0 G part #, AID, Status, OCN WLR, OCN OPR, WCH OPT, WDM OPR, and WDM OPT. Click to select one of these values.
5 Once a filtering value has been selected, the Test button becomes active. Click on the Test button to display a series of values to test against for filtering; one of:
contains
!contains
starts with
!starts with
ends with
ends with
6 Click to select one of the values listed above. Boolean values can be used to filter by selecting one of and/or from the Logic button.
7 Once all filtering values are selected, click Ok to redisplay the Wavelength Management values with the filter(s) applied.

NGDLC Services

Next generation digital loop carrier (NGDLC) systems enable carriers to provide integrated access between the customer premises and the public network. NGDLC supports concentration of switched traffic and grooming of non-switched traffic.

You may view and edit Next Generation Digital Loop Carrier services including the TR-008, TR-303, or INA interface groups for a FACTR NE. Each of these groups is created by autodiscovery. Choose the mode (I, II, or III), the mapping sequence (D1D or D4) and the bypass pair option (1 or 2). TR-303 defines an interface between a central office switch and a remote terminal to handle all call processing and operational functions for the DLC system. TR-303 is a versatile interface supporting a large number of subscribers and transport bandwidth, providing carriers with the ability to choose a concentration ratio geared to traffic engineering guidelines. For TR-303 DSOs, the NETSMART user can see the assigned Call Reference Value (CRV), which is a number between 1 and 2016 that is assigned to a TR-303 DS0.

Edit a TR-008 or TR-303 Interface Group

This procedure edits TR-008 and TR-303 parameters for those NEs that support these interfaces. It also places the interface in service or, for maintenance purposes, out of service. Placing an NE in maintenance state is not service affecting. However, once an NE has been placed in a maintenance state, actions performed on that NE may be service affecting (a loopback, for instance, is service affecting).
1 Log on the NE.
2 From the Configuration Manager, select the Interface Type tab. The Interface Type tab displays.
3 A blue dot in the upper right-hand corner indicates that an interface group has children. Double-click the TR-008 or TR-303 box in the graphical area or, in the expanded tree, select the item that corresponds to the interface to be modified. The Attributes dialog displays.
4 Click on the interface option to be changed. Only interface options displayed in blue can be changed. Select the new option from the drop-down list
5 Click the Modify tool or select the Update option from the Operations menu to make the changes.
6 Click to select the tool for the correct operation: InServ, OOSMA, OOSMT. The same options can also be chosen from the Operations menu.

Edit an INA Interface Group

This procedure allows the user to modify INA interface attributes and put T1s in service or take them out of service for maintenance. Placing an NE in maintenance state is not service affecting. However, once an NE has been placed in a maintenance state, actions performed on that NE may be service affecting (a loopback, for instance, is service affecting).

Figure 27:
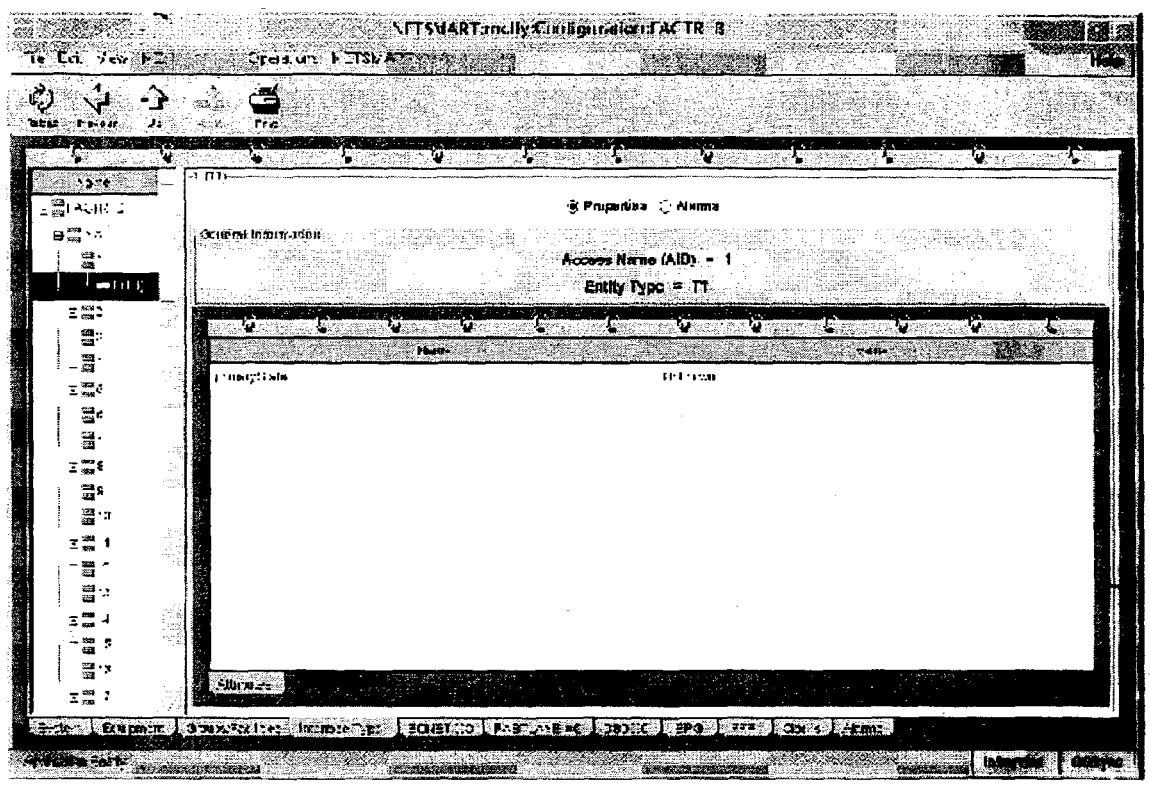
FIG. 27 shows the interface tab: INA attributes view.

1 Log on the NE.
2 From the Configuration Manager, select the Interface Type tab.
3 A plus sign to the left of an interface group indicates that this interface group has children. Expand the tree list and select the T1 to be modified.
4 The Attributes dialog (FIG. 27) displays.
5 Only interface options displayed in red or blue can be changed. Select a new option from the drop-down list that is displayed when the value is clicked.
6 Click the Modify tool to complete the changes.
7 Click to select the tool for the correct operation: InServ, OOSMA, or OOSMT. The same options can also be chosen from the Operations menu.

Performance Management

Performance Management is an optional feature and is started using a different NETSMART command than the regular startup command. If you cannot access this feature, please contact your NETSMART administrator. For information about enabling and disabling Performance Management, refer to "NETSMART Optional Features" in the NETSMART Installation and Administration Guide (FJTU-320-940-150).

A NETSMART user needs a way of accessing the PM Monitoring parameters on a Network Element (NE) to determine how an NE is performing in the network. The PM feature provides the mechanism for the user to query and set PM Monitoring parameters on one or more NE(s). A comprehensive listing of PM parameters for each NE can be found in the appropriate NE manual. Most PM operations may be applied to one or more NE(s), to multiple cards or facilities on a single NE, or to a single card or facility on a single NE. Use Performance Manager to:

Enable and disable a performance monitoring report
Retrieve performance monitor reporting status
Initialize the performance registers for an NE
Set individual threshold values
Retrieve current threshold values
Retrieve historical performance data Operations that can be applied only to a single card or facility on a single NE are:

Setting of individual threshold values
Retrieval of current threshold values
Retrieval of performance data Management Procedures This section describes the procedures for using the Performance Manager. Performance Manager is supported for the following NEs:

FLASH-192 (02.03)
FLASH-192 (04.02)
FLASHWAVE (02.01)
FLASHWAVE (01.03)
FLM 2400 ADM (14.02S).
FLM 2400 ADM (14.02BS)
FLM 600 ADM (14.02)

You can display the Performance Manager window in three different views, depending on how the window is accessed. Views include: Element View, Equipment View and Groups/Facilities View.

Element View: Accessing Performance Manager from the Topology window displays the Element View.

Equipment View: Accessing Performance Manager from the Configuration Manager—Equipment Tab displays the Equipment View.

Groups/Facilities View: Accessing Performance Manager from the Configuration Manager Groups/Facilities tab displays the Groups/Facilities View.

Performance Manager Element View

To display Performance Manager in Element View, select an NE or several NEs in the Topology window and then select Performance Management from the NETSMART menu. If no NEs are selected, a list of available NEs will be displayed in the Performance Manager window after it is launched. The view is divided into two main parts. The Selection area in the top portion of the view displays selected elements in the Selected Elements list. Radio buttons to the right of the Interval label are used to define a monitoring interval. The bottom portion of the view displays monitoring data.

Start and Stop Monitoring

Note: If the Performance Manager was started from a selected NE or NEs, there will be no elements in the Available Elements list and the selected NE(s) will be displayed in the Selected Elements list. If you started Performance Management from the NETSMART menu with no NE selected, all NEs will be displayed in the Available Elements list. The following information assumes that Performance Management was selected from the Operations menu with no NE selected (all NEs will appear in the Available Elements list).

1 To begin monitoring, select the Monitors tab in the Performance Manager window. This is the default tab for the Element view.
2 To select NEs to monitor, select an item in the Available Elements column and use the Add button to add it to the Selected Elements column.
3 To remove an item from the Selected Elements column, highlight the item in the Selected Elements column and click the Remove button. After the in-progress message bar disappears, the entry is added to the monitoring data area. Verify the status of the initialization in the third column.
4 To add all items to the Selected Elements column, click the Add All button.
5 To remove all the items in the Selected Elements column, click the Remove All button. After the in-progress message bar disappears, the entry stays in the list, but the status is changed to Disable.

Note: When it is impossible to use a selection, that selection is grayed-out. For example, in PM Element View from NE):

Monitors Tab the Add and Add All buttons cannot be used because there is nothing in the Available Elements: list to add. The Remove button cannot be used until an element in the Selected Elements: list is selected.

6 Define the interval for monitoring using the Interval radio button.

Figure 28:
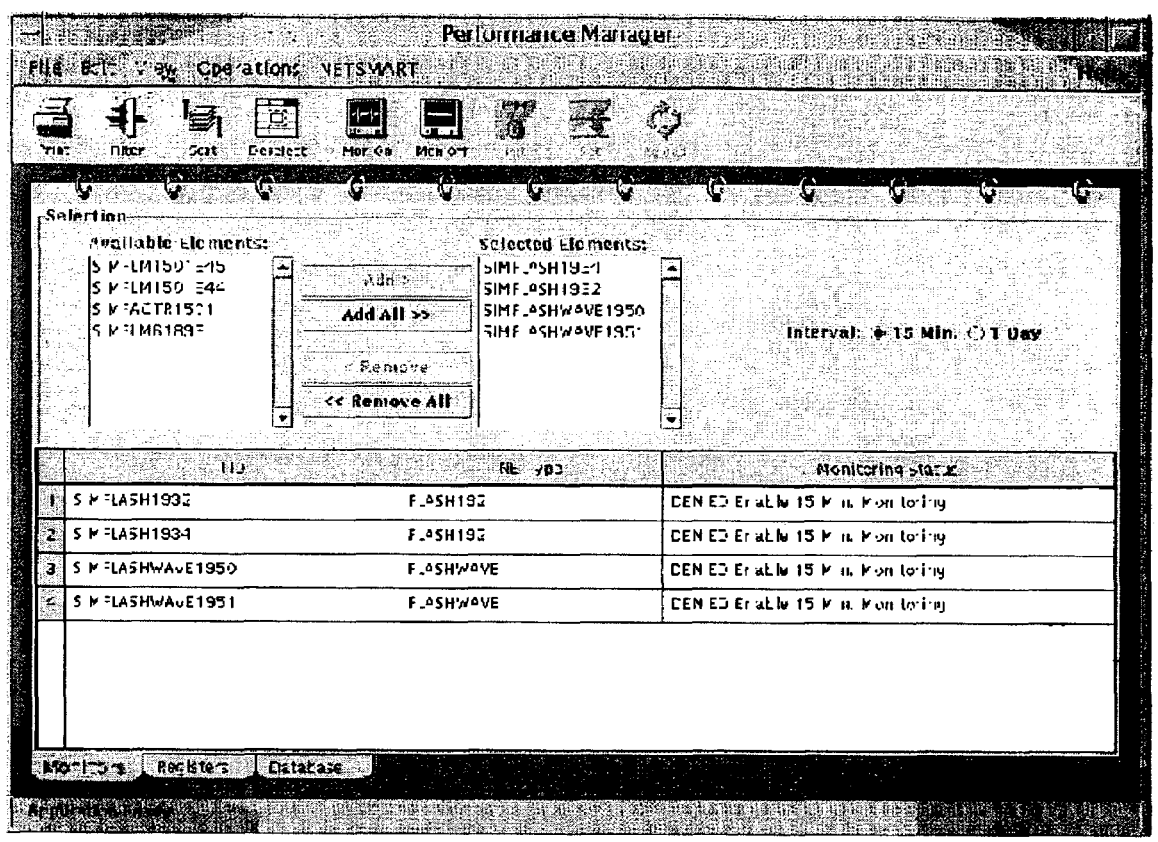
FIG. 28 shows the PM element view (from NETSMART menu): monitors tab.

Options are 15 Min. (15-minute intervals) or 1 Day. The default value is 15 minutes. If you select 15 Min., data is retrieved from the NE 15-minute registers. If you select 1 Day, data is retrieved from the NE 1-day registers 7 Click the Mon On tool in the toolbar or select Turn Performance Monitoring On from the Operations menu (FIG. 28).
8 To stop monitoring, select the Monitors tab and then click the Mon Off tool in the toolbar or select Turn Performance Monitoring Off from the Operations menu.

Initialize Registers

Figure 29:
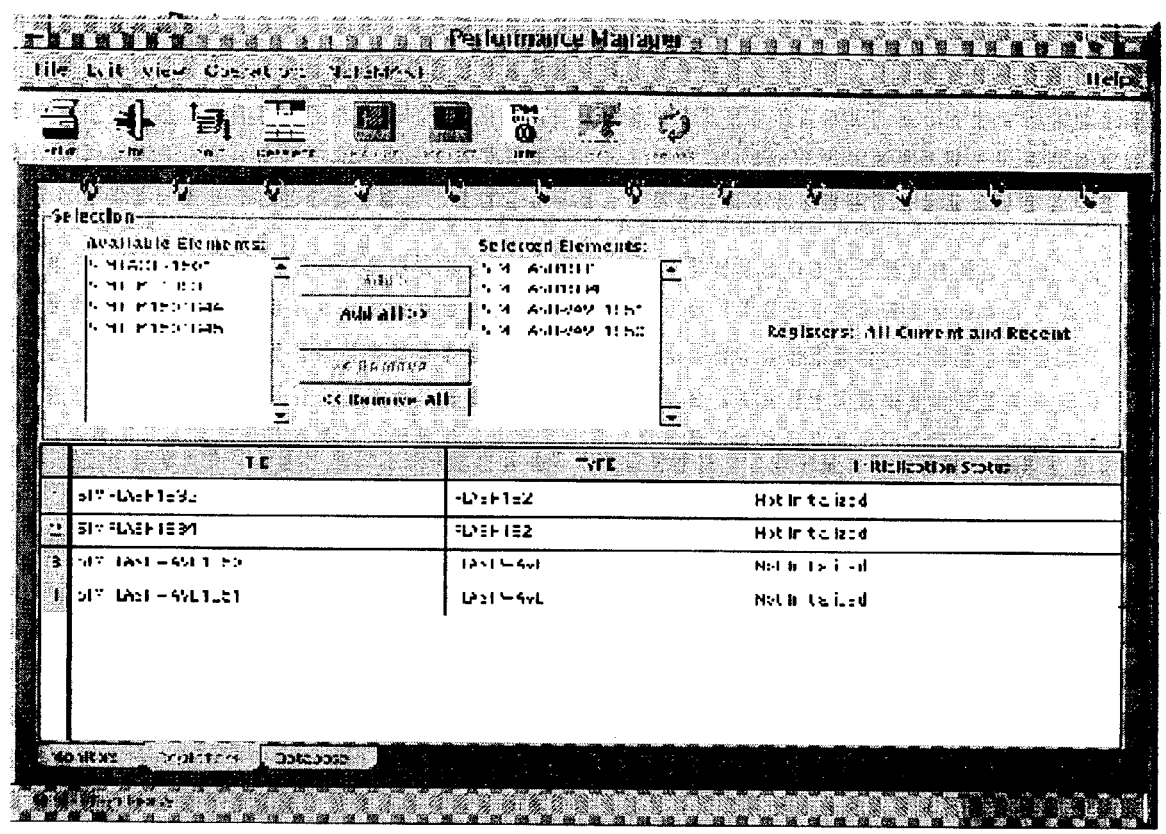
FIG. 29 shows the performance manager element view—registers tab.
Figure 30:
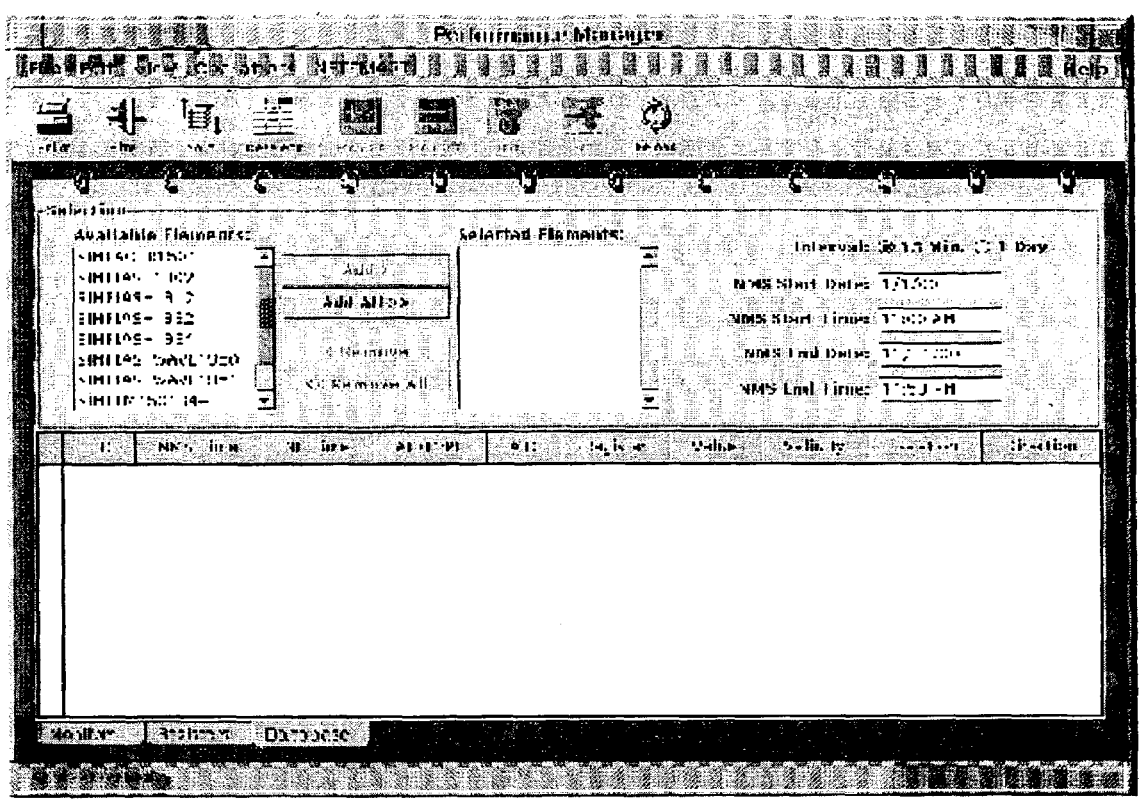
FIG. 30 shows the performance manager element view—database tab.

To reset all registers to zero values, you will initialize the registers. To initialize registers:
1 Select the Registers tab in the Element view (FIG. 29).
2 To select NEs to initialize, select an item in the Available Elements column and use the Add button to add it to the Selected Elements column.
3 To remove an item from the Selected Elements column, highlight the item in the Selected Elements column and click the Remove button.
4 To add all items to the Selected Elements column, click the Add All button.
5 To remove all the items in the Selected Elements column, click the Remove All button.
   Note: When it is impossible to use a selection, that selection is grayed out. For example, in PM Element View (from NE): Monitors Tab the Add and Add All buttons cannot be used because there is nothing in the Available Elements: list to add. The Remove button cannot be used until an element in the Selected Elements: list is selected.
6 Select the Init tool in the toolbar or select Initialize Performance Registers from the Operations menu. Selecting this option will initialize all the registers in the NEs to zero (Initialized Retrieve Performance Data Occasionally you will want to retrieve performance data for reporting or analysis. To retrieve performance data, perform the following tasks:
1 Select the Database tab in the Element view (FIG. 30).
2 Select the element(s) from the Available Elements list.
3 Use the Add button to add it to the Selected Elements column.
4 To remove an item from the Selected Elements column, highlight the item in the Selected Elements column and click the Remove button.
5 To add all items to the Selected Elements column, click the Add All button.
6 To remove all the items in the Selected Elements column, click the Remove All button.
   Note: When it is impossible to use a selection, that selection is grayed out. For example, in PM Element View (rom NE):
   Monitors Tab the Add and Add All buttons cannot be used because there is nothing in the Available Elements: list to add. The Remove button cannot be used until an element in the Selected Elements: list is selected.
7 Select or type values in the following fields:
   Interval—Displays the time period interval. Possible options are 15 Min. or 1 Day. The default is 15 minutes. If you select 15 Min. the collected data will be divided into 15-minute periods. If you select 1 Day, the collected data will be reported in 1-day periods.
   NMS Start Date—Select the date when NETSMART started receiving data from the NE. A default format is provided.
   NMS Start Time—Select the time when NETSMART started receiving data from the NE.
   NMS End Date—Select the date when NETSMART stopped receiving data from the NE.
   NMS End Time—Select the time when NETSMART stopped receiving data from the NE.
8 Select Reload from the Operations menu or click the Reload tool from the toolbar to start retrieving data.

Performance Manager Equipment View

Figure 31:
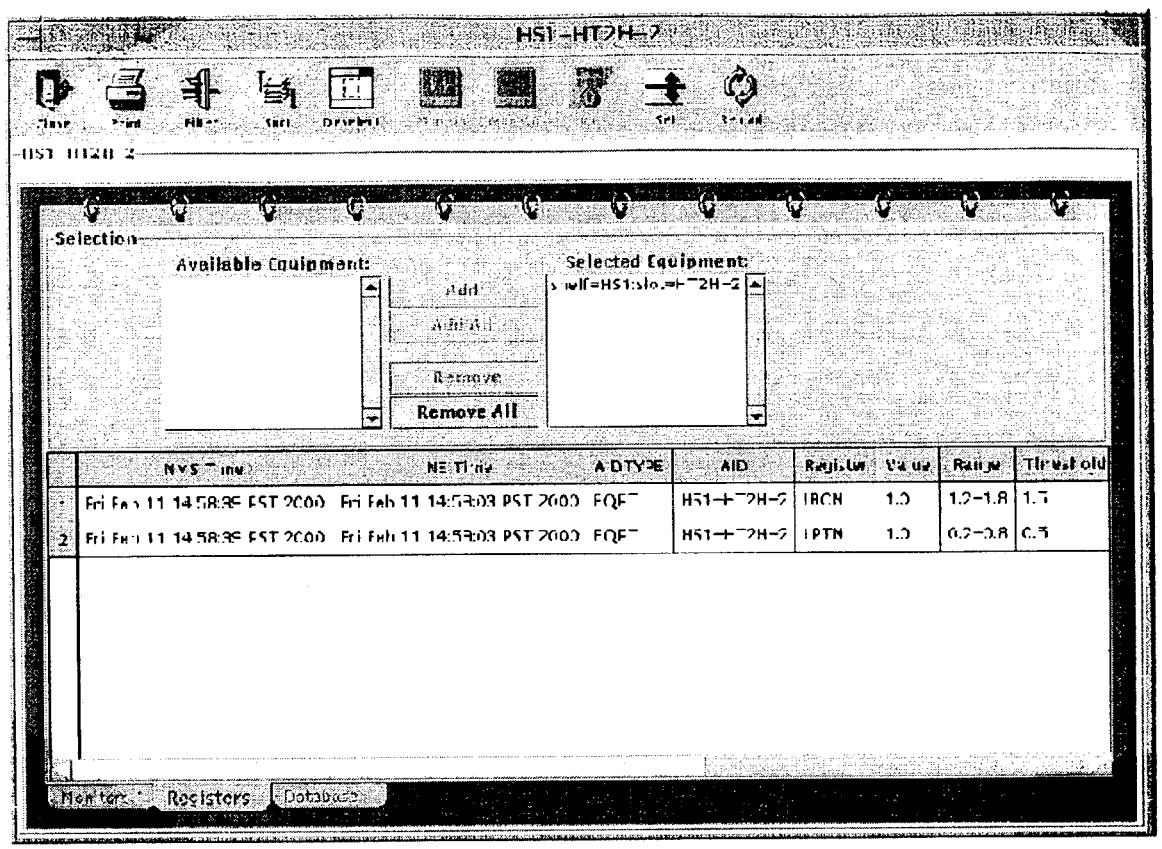
FIG. 31 shows the performance manger equipment view.

To display the Performance Manager Equipment view, select a card in the Configuration Manager Equipment tab and then click on the Retrieve tool in the toolbar. Otherwise, right-click to display a pop-up menu and then select Display PM from the pop-up menu. If a card does not have PM registers, the PM tool will not be displayed in the toolbar FIG. 31 shows the Performance Manager Equipment view. The Equipment view displays only the Registers tab and facilitates setting register thresholds and retrieving current performance registers. Fields in the display include:
NMS Time—NETSMART time.
NE Time—The time on the NE.
AID Type—Type of Access Identifier.
AID—Access Identifier name.
Register—Register name.
Value—Value of the register that was retrieved.
Range—Allowable range for the register Value.
Threshold—Indicator to the NE to regenerate the threshold report if the threshold was exceeded.
Default Threshold—When an NE is first started, this is the default value set by the NE. This value can be reset using the procedure described in "Set Threshold".
Validity—This value is valid only for FLASH-192 and FLASHWAVE NEs. Under normal operating conditions, this value should be FALSE. PM registers are accumulated in 15-minute intervals; if any data being reported is not for the full 15-minute interval this value will be reported as TRUE.
Location—This value indicates where the data is coming from (near-end or far-end). Equipment registers will always be far-end.
Direction—For equipment, this will always report N/A as the physical characteristics of equipment have no direction. Typically the value reported for facilities will be Tx or Rx.
Time Interval—This value is always N/A for equipment. For facilities the time reporting interval will be displayed as either 15 MIN or 1 DAY.
Index—This value will always be 0 for equipment. For facilities, the current register (0) plus previous registers 1 to 32 will be displayed. The Monitors and Database tabs cannot be selected, because equipment registers are not counters; they are current operating levels for items such as Laser Bias Current Normalized (LBCN). Because of this, monitoring cannot be turned on or off and the database will not contain any historical data.

Set Threshold

Performance monitoring registers can, potentially, be collected for thousands of circuits, creating an overwhelming amount of data. To limit this data, thresholds for data collection can be set. If these thresholds are not crossed, the assumption is that the NE performance is acceptable. A default threshold value exists for each register. The threshold for any register can be set and changed. To set thresholds:
1 Select equipment from the Available Equipment list and click the Add button to add the equipment to the Selected Equipment list
2 Select a numbered row in the report and then click the Set tool in the toolbar. The Set Thresholds dialog displays.
3 Type a new value for the threshold. Threshold ranges are NE-dependent and are displayed when you select the row that you will set registers for. You can also refer to the System Engineering section of the Fujitsu Network Communications web site for the TL1 threshold value specification for each NE.

4 Click OK to select the threshold and close the dialog.

Retrieve New Data

To retrieve new performance data:

1 Select equipment from the Available Equipment list and click the Add button to add them to the Selected Equipment list.
2 Select the Reload tool from the toolbar. The Reload tool updates the report for the equipment contained in the Selected Equipment list and for the values specified in the Location, Direction, Time Interval, and Index fields.

Performance Manager Groups/Facilities View

To display Performance Manager in the Groups/Facilities View, select a facility in the Configuration Manager Groups/Facilities tab and then click on the Retrieve tool in the toolbar. Otherwise, right-click to display the pop-up menu and then select Display Performance from that pop-up menu. The Monitor tab is the default initial display.

Figure 32:
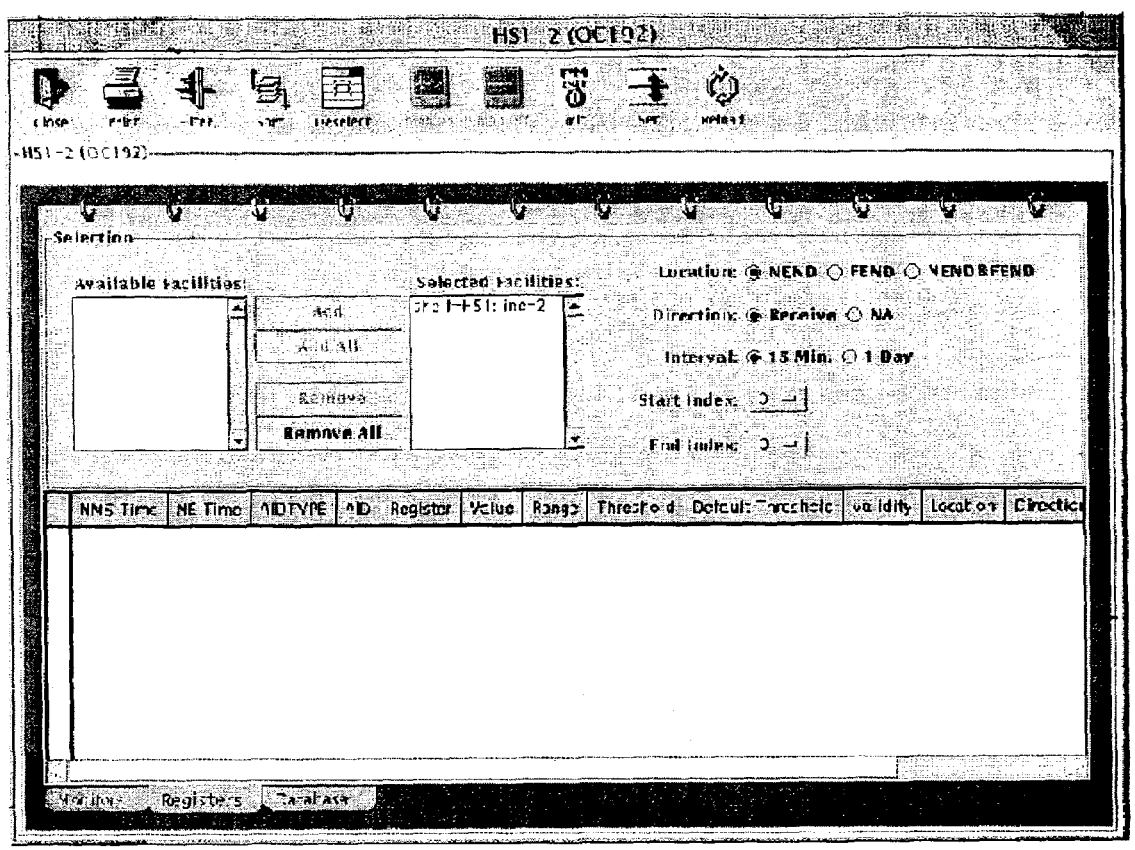
FIG. 32 shows the performance manager groups/facilities view.

If a facility has PM registers, when that facility is selected, the PM tool will become active in the toolbar. FIG. 32 shows the Performance Manager window in the Groups/Facilities view. The Groups/Facilities view contains the Monitors, Registers, and Database tabs and allows you to turn reporting on or off, to retrieve current PM registers from the facility and to retrieve historical data from the database. The Monitors tab is grayed-out on any group/facility that does not support performance monitoring. By default, the facility selected in Configuration Manager is the one displayed in Performance Manager and the Interval option is set to 15 Min. (the default). Fields in the display include:

NMS Time—NETSMART time.

NE Time—The time on the NE.

AID Type—Type of Access Identifier.

AID—Access Identifier name.

Register—Register name.

Value—Value of the register that was retrieved.

Range—Allowable range for the register Value.

Threshold—Indicator to the NE to regenerate the threshold report if the threshold was exceeded.

Default Threshold—When an NE is first started, this is the default value set by the NE. This value can be reset using the procedure described in "Set Threshold".

Validity—This value is valid only for FLASH-192 and FLASHWAVE NEs. Under normal operating conditions, this value should be FALSE. PM registers are accumulated in 15-minute intervals; if any data being reported is not for the full 15-minute interval this value will be reported as TRUE.

Location—This value indicates where the data is coming from (near-end NEND or far-end FEND).

Direction—Typically the value reported for facilities will be Tx or Rx.

Time Interval—For facilities the time reporting interval will be displayed as either 15 MIN or 1 DAY.

Index—For facilities, the current register (0) plus previous registers 1 to 32 will be displayed Start and Stop Monitoring 1 To start monitoring, select the Monitors tab in the Performance Manager Groups/Facilities view. The reporting status is automatically retrieved and displayed.
2 To select NEs for monitoring, select an item in the Available Facilities list and use the Add button to add it to the Selected Facilities list. By default, the facility that is selected when Performance Manager is launched is already in the Selected Facilities list.
3 To remove an item from the Selected Facilities column, highlight it in the Selected Facilities column and click the Remove button.
4 To add all the items to the Selected Facilities column, click the Add All button.
5 To remove all the items in the Selected Facilities column, click the Remove All button.
6 Choose the location by selecting one of the Location radio buttons. Possible choices are NEND (near-end) or FEND (far-end).
7 Choose the direction by selecting one of the Direction radio buttons. Possible choices are Receive, Transmit or NA (Not Applicable). This list is dynamically updated based on the selected facility.
8 Select the interval for monitoring using the Interval: radio button. Options are 15 Min. or 1 Day. The default is 15 minutes. If you select 15 Min., data is retrieved from the NE 15-minute registers. If you select I Day, data is retrieved from the NE 1-day registers.
9 In the Start Index and End Index fields, select a value between 0 and 32 for registers. 0 is the current register and there may be up to 32 previous registers. The End Index value must always be higher than the Start Index value.
10 Click the Mon On tool in the toolbar to start monitoring.
11 To stop monitoring, select the Monitors tab and then click the Mon Off tool in the toolbar Initialize Performance Registers To initialize performance registers:

1 Select the Registers tab in the Groups/Facilities view.
2 Select the Init tool in the toolbar. Selecting this option will initialize all the selected NE facility registers to zero.

Retrieve Register Data

To retrieve register data, select the Registers tab in the PM Groups/Facilities view. Once this tab is selected, a command is sent to the NE to retrieve register data for the selected facility. This data is displayed using the default parameters for Location, Direction, Interval and Start and Stop Indexes.

Reload Register Data in the Report

To reload new register data while in the Registers tab:

1 Select the facilities from the Available Facilities list and click the Add button to add them to the Selected Facilities list.
2 Choose the location by selecting one of the Location radio buttons.

Possible choices are NEAD (near-end) or FEAD (far-end).

3 Choose the direction by selecting one of the Direction radio buttons. Possible choices are Receive, Transmit or NA (Not Applicable).

This list is dynamically updated based on the selected facility.

4 Select the interval for monitoring using the Interval radio button.

Options are 15 Min. or 1 Day. The default is 15 Min. If you select 15 Min., data is retrieved from the NE 15-minute registers. If you select 1 Day, data is retrieved from the NE 1-day registers.

5 In -the Start Index and End Index fields of the Registers tab, select a value between 0 and 32 for registers. 0 is the current register and there may be up to 32 previous registers. The End Index value must always be higher than the Start Index value. These choices may be dynamically updated, depending on the selected type of facility.
6 Select the Reload tool in the toolbar. Selecting this tool will reload the register data for the selected facility for the index selected in Step 2 and will display the results in the window.

Set Threshold

You can set and change the current threshold for any register. To set thresholds, from the Performance Manager:
1 Select the Registers tab in the Groups/Facilities view.
2 Select facilities from the Available Facilities list and use the Add button to add them to the Selected Facilities list.
3 Select a numbered row in the report and then click the Set tool in the toolbar. After the Set Thresholds dialog displays, type a new value for the threshold.
4 Click Ok to save the changes and close the dialog.

Retrieve Historical Data

To retrieve historical data for the selected facility in the Facility View:
1 Select the Database tab in the Groups/Facilities view.
2 Select elements from the Available Elements list and click the Add button to add them to the Selected Elements list. Select Add All to add all elements.
3 Select the interval for monitoring using the Interval radio button.
Options are 15 Min. or 1 Day. The default is 15 minutes. If you select 15 Min., data is retrieved from the NE 15-minute registers. If you select I Day, data is retrieved from the NE 1-day registers.
4 Type values in the following fields:
NMS Start Date—Select the date when NETSMART started receiving data from the NE.
NMS Start Time—Select the time when NETSMART started receiving data from the NE.
NMS End Date—Select the date when NETSMART stopped receiving data from the NE.
NMS End Time—Select the time when NETSMART stopped receiving data from the NE.
5 Click the Reload tool from the toolbar to begin retrieving data. The resulting report is updated for the elements in the Selected Elements list and for the specified Interval, NMS Start Date, NMS Start Time, NMS End Date, and NMS End Time.

TL1 Command and Batch Processing

This section provides the procedures for entering and executing both batch and online TL1 commands. Batch TL1 commands can be saved as a file and executed at a later time.

To start the TL-1 Editor, from the Configuration Manager NETSMART menu, select TL1 Editor. The Raw TL-1/TL-1 Batch window displays. There are three main display areas on this window.

The upper part will contain any commands that were typed in the TL1 Command text entry area The middle part will contain any results/responses generated by this command.

The lower part contains the TL1 Command text entry area, the Active Sessions list area and the list of saved batch files. This procedure refers to the upper portion of this window as the history area and the middle portion is referred to as the results/responses area. The lower portion of the window is referred to as the batch listing area.

Enter Single TL1 Commands

Use the Raw TL-1/TL-1 Batch window to enter and execute individual TL1 commands. Using individual TL1 commands is the simplest way to interact with a single NE and will ensure that the command executes properly before using it in a batch file (especially one that will be executed on multiple NEs). When executing time-consuming TL1 commands, it is best to use a TL1 batch (when individual TL1 commands are sent for execution, the TL1 Editor remains busy waiting for command response).

1 In the Raw TL-1/TL-1 Batch Window, type in the TL1 command in the TL1 Command field.
2 Press the ENTER key to execute the command. The command displays in the history area of the TL1 window. The command and the results display in the results/responses area of the TL1 window. Each TL1 session corresponds to a user ID that is logged on a specific NE. Multiple sessions can exist. An active session must exist to send a command. If no sessions exist, one can be created by issuing the ACT-USER TL1 command.

Enter TL1 Commands in Batch Mode

TL1 commands can be entered into a batch file for immediate execution or can be saved in a batch file for a scheduled execution. Before a batch can execute, at least one TID must be selected. In addition, the batch must have the UID and Password properties set before the batch can execute.

Batch commands can be exported as a file, in which case the TID and Properties values will not be retained. Importing a TL1 file into the TL-1 Batch Editor will override any existing commands in the editor. The command syntax for TL1 commands is described in *Bellcore document GR-831-CORE Issue* 1 (November 1996).

1 In the Raw TL-1/TL-1 Batch window, select New from the Batch menu to display the NETSMART TL-1 Batch Editor window, where you can create a new batch. To edit an existing batch, double-click on an existing batch in the batch listings at the bottom of the window or click on a batch name and select Edit from the Batch menu. The NETSMART TL-1 Batch Editor window displays (FIG. 4–144).
2 Select TIDs from the Batch menu. The TID List dialog displays.
3 Select the TID(s) for the batch by clicking to highlight the TID to which the TL1 commands will be sent. Multiple TIDs can be selected. Click a second time on the TID to deselect any unwanted values.
4 If the TID that is needed is not in this list, type the name of the TID in the list to the left of the Add TID to List button.
5 Click the Add TID to List button to add the TID to the list. If there are no TIDs to add, this button is grayed out and unavailable.
6 Click Ok to select the TID(s).
7 Use the Import Batch tool to display the Import Batch dialog where the file to be imported can be identified, or use the Export Batch tool to display the Import Batch dialog where the location and file name for data to be exported can be identified.
8 Click to select the file to be imported or exported. Only one file at a time can be selected.
9 Click OK to select the file and close the dialog.
10 Click the mouse to place the cursor in the free-form area of the NETSMART TL-1 Batch Editor (the main part of the window) and type TL1 commands in this area.
11 To set the properties for the batch, click on the Props tool or select Properties from the Batch menu. The Batch Properties dialog displays. Values must be entered in the UID and Password fields for the batch to execute.
12 Select or type values in the following fields:
Name:—If this is a new batch, this field is blank. If this is an existing batch, this field displays the name of the batch. Data cannot be entered in this field.
Owner—Displays the user name that logged on NETSMART. Data cannot be entered in this field.

Privilege:—Select PRIVATE if only the person who created the batch file can execute it or PUBLIC if any user with TL1 privileges can execute the batch file.

Send Mode:—Select SERIAL if the TL1 batch of commands is to be sent to one NE at a time or PARALLEL if the batch file is to be sent to all NEs in the TID list at the same time.

UID:—Type the user ID that will be used to create a new session for batch execution. This user ID must be valid for each TID that was selected using the TID List dialog. If a command within the batch file specifies another user ID, the user ID within the batch file will override this user ID.

Password:—Enter the password for the User ID that was typed in the UID field.

13 Click Ok to save the property settings or Cancel to close the dialog without making changes.

14 To save the batch file, click the Save As tool or select Save As from the File menu.

The Save As Dialog

Use the Save As . . . dialog to save a file with the existing name (overwrites the existing file) or to type a new filename and save the file with the new name.

1 When the Save As . . . dialog displays, type a value in the Batch name field. The file will be saved using this name.

2 In the Raw TL-1/TL-1 Batch window, double-click to select a saved batch file from the listing area (the lowest portion of the TL1 window). If there is more than one session active, select the active session TID from the Active Sessions list. Click the Send tool or select Send from the Batch menu to transmit the TL 1 commands.

Edit TL1 Batch Commands

The TL 1 batch file can be edited and saved in the original file or in a new batch file for a scheduled execution. The new batch must have the UID and Password properties set before the batch can execute. Batch commands can be exported as a file, in which case the TID and Properties values will not be retained. Importing a TL1 file into the Batch Editor will override any existing commands in the editor. The command syntax for TL1 commands is described in Bellcore document GR-831-CORE Issue 1 (November 1996), which is hereby incorporated by reference.

1 In the Raw TL-1/TL-1 Batch window, either double-click on an existing batch in the batch listings at the bottom of the window or click on a batch name and select Edit from the Batch menu. The NETSMART TL-1 Batch Editor window displays.

2 To add or change TIDs, select TIDs from the Batch menu. The TID List dialog displays.

3 Select the TID(s) for the batch by clicking to highlight the TID to which the TL1 commands will be sent. Multiple TIDs can be selected. Click a second time on the TID to deselect any unwanted values.

4 If the TID that is needed is not in this list, type the name of the TID in the list to the left of the Add TID to List button. Click the Add TID to List button to add the TID to the list. If there are no TIDs to add, this button is grayed out and unavailable.

5 Click Ok to select the TID(s).

6 Use the Import Batch tool to display the Import Batch dialog where the file to be imported can be identified, or use the Export Batch tool to display the Import Batch dialog where the location and file name for data to be exported can be identified.

7 Click to select the file to be imported or exported. Only one file at a time can be selected.

8 Click OK to select the file and close the dialog.

9 Click the mouse to place the cursor in the free-form area of the NETSMART TL-1 Batch Editor (the main part of the window) and type TL1 commands in this area.

10 To modify the properties for the batch, click on the Props tool or select Properties from the Batch menu. The Batch Properties dialog displays. Values in the UID and Password fields must be changed so that the batch can execute.

11 Select or type to change values in the following fields:

Name:—If this is a new batch, this field is blank. If this is an existing batch, this field displays the name of the batch. Data cannot be entered in this field.

Owner—Displays the user name that logged on to NETSMART. Data cannot be entered in this field.

Privilege:—Select PRIVATE if only the person who created the batch file can execute it or PUBLIC if any user with TL1 privileges can execute the batch file.

Send Mode:—Select SERIAL if the TL1 batch of commands is to be sent to one NE at a time or PARALLEL if the batch file is to be sent to all NEs in the TID list at the same time.

UID:—Type the user ID that will be used to create a new session for batch execution. This user ID must be valid for each TID that was selected using the TID List dialog. If a command within the batch file specifies another user ID, the user ID within the batch file will override this user ID.

Password:—Enter the password for the User ID that was typed in the UID field.

12 Click Ok to save the property settings or Cancel to close the dialog without making changes.

13 To save the batch file, click the Save As tool or select Save As from the File menu.

14 When the Save As . . . dialog displays, type a value in the Batch name field or leave the old name if you do not want to change it. The file will be saved using this name.

15 In the Raw TL-1/TL-1 Batch window, double-click to select a saved batch file from the listing area (the lowest portion of the TL1 window). If there is more than one session active, select the active session TID from the Active Sessions list. Click on the Send tool or select Send from the Batch menu to transmit the TL1 commands.

Using the TL1 Console

This section provides the procedures for using the TL1 Console. The TL1 Console window allows a user to view the TL1 activity generated due to a user's actions; for example, log on to NE, create crossconnect, etc. System-level TL1 activities include all the TL1 activities that are sent to or received from the NEs being managed, such as TL1 command and response, autonomous messages (REPT-*), raw TL1 command and response, and RTRV-HDR.

By default, all security roles defined in NETSMART have the TL1Console user function, which allows users to view the TL1 activities that they generated. The NetSmartUserAdmin role has the TL1SuperConsole function, which allows users to view the system TL1 activities. If the role includes the TL1SuperConsole user function, the user with this role can use the TL1 Console window to view system-level TL1 activities. As a TL1SuperConsole user, up to five TL1 Console windows can be started. By default, the TL1 messages viewed by the TL1Console user include the command and response received from the NE. For information about viewing other TL1 record attributes or changing the order of the displayed attributes, refer to Section A. 13.1, TL1 Console Rearrange Attributes Dialog. As a TL1 Console user, you can start only one TL1 Console window.

For information about modifying the security roles, refer to Roles Tab. To start the TL1 Console, from the NETS- MART menu, select TL1 Console. The TL1 Console window displays. As soon as you open the TL1 Console, the display of TL1 events begins and scrolls automatically to display additional events. The TL1 Console window displays a maximum of 1000 records at a time.

Display TL1 Messages

The display can be started, stopped or paused by selecting Start, Stop or Pause from the Operations menu or by selecting one of the Start, Stop, or Pause tools from the toolbar.

1 The TL1 console starts with the default setting, which displays TL1 messages. The server will start sending messages to the console. To add, remove, or rearrange the attributes to be displayed, use the Rearrange Attributes dialog. For more information, refer to Rearrange TL1 Attributes. If the display was paused earlier by selecting the Pause button, the console will display the messages that were sent during the pause and will then start to display new messages. If the display was stopped earlier by selecting the Stop button, the new real-time messages will begin to display. The Start button becomes active only when the display has been paused or stopped.

2 To pause the message display, select Pause from the Operations menu or click the Pause tool. This option pauses the display of TL1 events to the console. Internally, the messages are buffered for up to 1000 records; these records will be displayed when you select Start to restart the display.

3 To stop display of any messages in the console, select Stop from the Operations menu or select the Stop tool in the toolbar. The server stops sending messages to the console.

Rearrange TL1 Attributes

Adding, removing, or rearranging the attributes to be displayed in TL1 Console is accomplished by using the Rearrange Attributes dialog.

1 To open this dialog, select Rearrange Log Attributes from the View menu or click the Rearran . . . tool in the toolbar. The Rearrange Attributes dialog displays.

2 To add an attribute to the Selected List, highlight the attribute in the selections beneath the Attribute List and then click the Add button.

3 To remove an attribute from the Selected List, highlight the attribute in the Selected List and then click the Remove button.

4 To add or remove all attributes, use the AddAll button or the RemoveAll button. TLIMsg is the default item in the Selected List and cannot be removed.

5 To change the order of the attributes in the list, select an attribute and then click the Up button to move the attribute up in the list or the Down button to move the attribute down in the list.

6 Click OK to save the settings and close this dialog or click Cancel to cancel all changes and close this dialog.

Filter TL1 Messages

Messages to be displayed in the TL1 Console can be filtered using the Filter TL1 Messages dialog.

1 To open the Filter TL1 Messages dialog, select Filter from the Operations menu in the TL1 Console window or click the Filter tool in the toolbar. The following dialog displays.

2 Messages can be filtered based on the NE TID or the message type. Select the filter from the NE ID drop-down list. To filter the TL1 message display based on the NE TID, select:

Starts with—If you want the NE to start with the specified value.

Ends With—If you want the NE to end with the specified value.

Contains—If you want the NE to contain the specified value. Type the text relevant to your NE ID selection in the Value field (for example, FLM) and check the Case Sensitive box to search for the NE using the case-sensitivity specified for the typed value.

3 To filter messages based on the message type, in the Message Type screen area, select the message type(s) that you want to be displayed in the TL1 Console window. The TL1SuperConsole user can filter all message types. The TL1Console user can only view and filter the following messages: Command, Response and Acknowledgement. The complete list of message types includes: Unparsed, Send Raw, Autonomous, Received Raw, Command, Acknowledgement, and Response.

4 Click OK to make the changes and close the dialog or click Cancel to close the dialog without making any changes.

Reports

This section provides the procedures for reporting information from the NETSMART databases. All the reports are similar in functionality and access methods.

Link Report

Use the Link Report window to view and edit physical link information in the NETSMART database. Read-only (view) functions include filtering and sorting of displayed physical links. Edit functions include modification of physical link names and deletion of physical links from the system. The Link Report can be displayed as either:

A global view (all physical links in the system)

A group link view (all physical links belonging to a particular link that is displayed on the Topology map window)

NETSMART Crossconnect Report

The crossconnect Report dialog displays a report containing information about a selected type of crossconnect.

1 In one of the Crossconnect tabs, select Report from the Operations menu or select the Report tool from the toolbar. In the cascade to the right of the Report menu label, select the type of crossconnect to report. The Crossconnect Report dialog (FIG. 33) displays.

2 Use the tools on the toolbar or select Operations menu items to perform the following functions.

Select the Print tool to display the Print dialog to print a report.

Select the Filter tool to display the Filter dialog to filter the information displayed.

Select the Sort tool to display the Sort dialog to sort the information displayed.

Select the Columns tool to display the Column Settings dialog to determine the columns to be displayed.

Select the Deselect tool to remove the selection shading from any selected screen area(s). The tool will be grayed out and unavailable if no selection has been made.

Select the Reload tool to reload information from the NETSMART database.

3 Once you have completed operations in this dialog, click Close to close the report.

NETSMART Crossconnect Trail Report

The Crossconnect Trail window displays a report containing information about all the crossconnects in all the NEs that are autodiscovered in the Topology window.

1 Access this dialog by selecting Query NE from the Topology view Edit Menu.

2 In the dialog, select Crossconnect Name from the choice box labeled Query by and type the Crossconnect name or another valid value in the adjoining text field. Wild card searches are allowed, so the entry can either be a name or part of a name followed by a % sign. A % sign can be entered alone, in which case all the crossconnects will be retrieved from the database. The text field cannot be left blank. Apostrophes cannot be used. The apostrophe interferes with Oracle semantics. For either of the two cases, a popup dialog prompts you to enter a name or to refrain from using an apostrophe in the search name.

3 Click Ok to produce the report or click Cancel to cancel and close this dialog.

4 The NETSMART Crossconnect Report window displays.

5 Use the tools on the toolbar or select Operations menu items to perform the following functions.

Select the Print tool or select Print from the Operations menu to display the Print dialog to print a report.

Select the Filter tool or select Filter from the Operations menu to display the Filter dialog to filter the information displayed.

Select the Sort tool or select Sort from the Operations menu to display the Sort dialog to sort the information displayed.

Select the Columns tool or select Column Settings . . . from the Operations menu to display the Column Settings dialog to determine the columns to be displayed.

In a multipage report, use the Previous and Next tools to go to the previous and next page of the report.

Use the DelXC tool to delete a crossconnect.

Select the Deselect tool or select Deselect from the Operations menu to remove the selection shading from any selected screen area(s). The tool and the menu selection will be grayed out and unavailable if no selection has been made.

Select the Reload tool to reload information from the NETSMART database.

6 When completing operations in this window, select Close from the File menu to close the report.

Delete a Crossconnect from the Trail Report

A crossconnect can be deleted from the NETSMART Crossconnect Trail Report. In the NETSMART Crossconnect Trail Report,—each of the rows represents one crossconnect record. Crossconnects can be deleted from the NETSMART Crossconnect Trail Report by selecting the appropriate row(s).

1 After the NETSMART Crossconnect Trail Report displays, select the row(s) to delete using the mouse. For multiple selections, you have two options:

Hold down the SHIFT key and click on the desired rows to select a contiguous set of records.

Hold down the CTRL key and click on the desired rows to select a non contiguous set of records.

2 Either select the tool labeled DelXC from the toolbar, or from the Operations menu select Crossconnect. From the Crossconnect runoff menu, select Delete XC.

3 Once the row(s) have been selected from the table in the report panel, select either the tool labeled DelXC, or from the Operations menu select Crossconnect and from the runoff menu select Delete XC. Some of the crossconnects may be redlined. If so, when the Ok button is clicked on the Confirmation dialog, an Information Message box indicates that some of the crossconnects selected could be set to redline, and asks whether you would like to delete the Crossconnects not redlined and skip the redlined ones. If the Y (Yes) option is selected, the underlined crossconnects are deleted. If N (No) is selected, control is returned to the table in the Report from where the selections were made. If Yes was selected, the report will redisplay without the deleted crossconnect. If Y (Yes) is selected, the crossconnects should be deleted. However, there could be reasons for which the delete operation for a few crossconnects might fail. In that case a dialog provides a list of failed crossconnect deletes and the reason why that delete from the report failed.

4 To verify that the changes have been made, select Report from the Operations menu, then select the appropriate type of crossconnect. A report is displayed showing all the selected types of crossconnects.

Printing

This section describes the procedures associated with printing NETSMART information. This information includes:

Printing a report

Saving a report to a disk

Printing a graphical view

Selecting a table area for printing

Previewing print output

Setting up a page for printing

Printing Overview

Use the NETSMART Print dialog to enter print commands and to print reports to a file or to a printer. The following describes page layout and wrapping:

By default, if a row is wider than a page, the data is wrapped inside the cell.

Table rows are wrapped into multiple table regions, but only one table region is printed on each page, regardless of how many table regions can fit into one page. Table rows that extend beyond a single page are broken into side-by-side pages on cell boundaries A Fit Page Width button is provided in the Page Setup dialog. When this button is selected, regardless of how wide a table row is, the table width is set to the same as the page width.

Note: A maximum of 100 lines of output is produced for each report.

Print a Report

1 After displaying a tabular report, print the data by selecting either the Print option on the File menu or by selecting the Print tool from the toolbar. The Print option on the File menu is not always available. The NETSMART Print dialog displays.

2 Select or type values in the following fields:

Print To—Select the output format: Printer, Text File, or PostScript File.

Printer Command:—For text/postscript file output, this field will be grayed-out and unavailable. For printed output, type any valid printer command(s) in this field.

File Name:—If you are printing to a file, use this field to type a file name.

Orientation—For printer output, select whether the printed output should be in landscape or portrait format.

Paper Size—For printer output, select the size of paper for the printed report.

3 Use the Preview . . . button to display a print preview.

4 Use the Setup . . . button to set up printing parameters.

5 Click Ok to send the data to the specified output device.

6 Click Apply to apply the changes and leave the dialog open.

7 Click Cancel to close the dialog without sending the data to the output device.

Save a Report to a Disk

Certain tabular style reports can be saved to a disk in text file (.txt) or PostScript (.ps) format.

1 After displaying a tabular report, click the Print tool or select the Print Table option from the File menu. The NETSMART Print dialog displays.
2 Select or type values in the following fields:
  Print To—Select one of Text File or PostScript File.
  Printer Command:—For text/postscript file output, this field will be grayed-out and unavailable.
  File Name:—Type the name of the file to be created. Click on the button to the right of this field to display the File Selection dialog where you can select a location for the file.
  Orientation—This field is grayed out and not available for text/postscript file output.
  Paper Size—This field is grayed out and not available for text/postscript file output.
3 Use the Preview . . . button to display a print preview.
4 Use the Setup . . . button to set up printing parameters.
5 Click Ok to save the data to the specified location.
6 Click Apply to apply the changes and leave the dialog open.
7 Click Cancel to close the dialog without saving any data.

Print a Graphical View

The Print View option on the File menu lets you print what you see on the screen. This option is available in components that have graphic images (such as Topology). It is also enabled in some components that produce reports. If this selection is not available, it is grayed-out.

1 After displaying a graphical view, print the view by selecting the Print View option on the File menu. The NETSMART Print dialogs.
2 Select or type values in the following fields:
  Print To—Select the output format: Printer, Text File or PostScript File.
  Printer Command:—For text/postscript file output, this field will be grayed-out and unavailable. For printed output, type any valid printer command(s) in this field.
  File Name:—If you are printing to a file, use this field to type a file name.
  Orientation—For printer output, select whether the printed output should be in landscape or portrait format.
  Paper Size—For printer output, select the size of paper for the printed report.
3 Use the Preview . . . button to display a print preview.
4 Use the Setup . . . button to set up printing parameters.
5 Click Ok to send the data to the specified output device.
6 Click Apply to apply the changes and leave the dialog open.
7 Click Cancel to close the dialog without sending the data to the output device.

Print Area

Use the Print Area option on the File menu to select an area of a table for printing. Both Set Print Area and Clear Print Area options may be available. The Print Area option is only available for tables.

1 Display the table that you want to print. Select Print Area from the File menu, and select Set Print Area from the Print Area menu.
2 Select a row or rows for printing. For multiple print elections, you have two options:
  Hold down the SHIFT key and click on the desired rows to select a contiguous set of records.
  Hold down the CTRL key and click on the desired rows to select a non-contiguous set of records. When you select an area for printing, no visual changes occur.
3 Click on the File menu, then select the Print menu item.
4 Process printing as normal. When printing, only the selected region is taken into account. For example, the Print Preview option will show only the selected region. The Clear Print Area option will clear the selected area.

Print Preview

Use the Print Preview option on the File menu to view what will be sent to the printer or file. The Print Preview option is available for any tabular data displayed on the screen.

Note: A maximum of 100 lines of tabular output is produced for each report.

1 After displaying a report with the appropriate data, select the Print Preview option from the File menu. The NETSMART Print Preview dialog displays.
2 Select the Print button to display the Print dialog.
3 Click the Close button to close the Print Preview dialog.

NETSMART Page Setup

Each Print dialog in NETSMART contains a Setup . . . button. Selecting this button displays a dialog where you can select parameters that affect printed output.

1 After displaying a report with the appropriate data, select the Print tool from the toolbar or click on one of the print options on the File menu. The NETSMART Print dialog displays.
2 Click to select the Setup . . . button. The NETSMART Page Setup dialog displays.
3 In the Font area in this dialog, click in the selection list to the right of the Name label and select the font name to be used for printing. In the selection list to the right of the Style label, select the font style to be used for printing. In the selection list to the right of the Size label, select the font size to be used for printing.
4 In the Title field, either select the default window title or type a new value that will be the title for the print output.
5 In the Header field, type a value that will be used as the header information for the print output.
6 In the Footer field, type a value that will be used as the footer information for the print output.
7 Check the Fit Page Width box to fit the print output within the page width.
8 Click Ok to send the output to the selected printer.
9 Click Apply to make the changes but keep this dialog open.
10 Click Cancel to close the dialog without printing.

Filtering Tabular Information

Use the Filter tool and/or select Filter from the Operations menu to refine the data that you want to see in a report or other tabular information. Many of the reports in NETSMART provide this option including the Log Manager and Fault Manager reports.

1 After displaying a report with the appropriate data, select the Filter tool from the toolbar or, if it is available, select the Filter option from the Operations menu. The Filter dialog displays.
2 Click on a button beneath the Field label to display a drop-down list to select a field.
3 Select a field to be filtered. The Test button becomes active. Click on this button to display a series of values to test against for filtering, one of:
  contains
  !contains
  starts with
  !starts with ends with
!ends with
Click to select one of these values.
4 Use Boolean values to filter by selecting one of AND/OR from the choice boxes beneath the Logic button.
5 Once all filtering values are selected, click Ok to redisplay the information with the filter(s) applied.

Sorting Information

Use the Sort dialog to specify sorting criteria in most tabular views.

Note: There are two types of Sort dialogs. One type allows you to sort using a single argument, while another type (the Fault Manager, for instance) allows selection of multiple sort arguments. In the second type (multiple arguments), it may sometimes appear that the data is not ordered correctly.

1 Click on the Sort tool or select Sort from the Operations menu. The Sort dialog displays.
2 The sert will consider case on string sorts. To turn off case-sensitivity, select the Ignore Case? (valid only for strings) box at the top of the dialog.
3 Select the sort parameters. The order in which you select the Sort By buttons will determine the sort order.
4 Use the Order button to indicate the sort order for the Sort By parameters. Select one of Ascending (lowest to highest) or Descending (highest to lowest).
5 Click Ok to begin the sort. The data will redisplay in the sort order that you specified.

Sorting by Time

In a tabular display, where data can be sorted on multiple criteria, the results of a sort may appear erroneous because the system measures time in milliseconds, while NETSMART reports time in seconds. For example, the following Sort dialog shows the sorting criteria that were used to sort Fault Manager alarms information. First, the time the alarm was raised was selected and then the severity of the alarm was selected. The resulting output looks to be incorrect for the 10:31:44 time slot. The results of the sort in the following figure shows that a condition (NA) is inserted between two major alarms. The condition was raised milliseconds before the second major alarm, so it appears in the list before the second major alarm.

Ordering Sort Parameters

The order in which the Sort By buttons are selected will determine the sort order. The first (top) sort parameter has precedence over the second, the second has precedence over the third, and so forth. When the sort takes place, the NMS Raise Time will be sorted first. Because the Ascending button was selected, the sort will be from the earliest time to the most recent time. Next, the severity level of each alarm will be sorted in descending order within each NMS raise time. Alarm conditions will be sorted next in descending order within each severity level (which was sorted within each NMS raise time). Service Effect is the last button selected, and will be sorted last. Because the Ascending button is selected, the processing will sort service effects in ascending order, within each condition.

Cutting and Pasting Information

Support for Copy and Paste is available in editable fields such as the ones in Edit NE and the Raw TL1 editor, using the system clipboard.

Use CTRL+C to copy the information, and CTRL+V to paste it into a text area. From tables, right clicking on a cell lets you see the text in a separate dialog. Select the text in this dialog that you want to copy and press CTRL+C to copy. The text can then be pasted by pressing CTRL+V in a text destination field. There is no menu item or toolbar tool to support this action.

Setting Column Displays

You can define which columns will be displayed and which will be hidden in most tabular views. To display the Column Settings dialog, either click on the Columns tool in the toolbar or select Column Settings from the Operations menu. Use the Column Settings dialog to specify display criteria. The order for column display can be changed by selecting the heading field and dragging the field to a different position in the display.

1 Click on the Columns tool or select Column Settings from the Operations menu. The Column Settings dialog displays.
2 By default, all columns are listed in the Visible Columns list. Click to select a column in the Visible Columns list and then select the Hide button to move the column to the Hidden Columns list. To show a hidden column, click to select a column in the Hidden Columns list and then select the Show button to move the column to the Visible Columns list.
3 Highlight a visible column and then use the Move Up or Move Down button to move the order of the column in the list. This will change the display order for the columns.
4 Click Ok to confirm the column settings.

View Logs

Use the Log Managers to view NETSMART logs. Available logs include:
Activity Log Manager
Fault Manager
TL1 Log Manager
Transient Event Log Manager Each of these logs can be viewed from the NETSMART menu's Log Manager selection. All logs maintain a maximum of 30 days worth of records.

Note: There are two types of Sort dialogs. One type allows you to sort using a single argument, while another type (the Fault Manager, for instance) allows you to select multiple sort arguments. In the second type (multiple arguments), it may sometimes appear that the data is not ordered correctly.

View Activity Log

The Activity Log provides a summary list of operator activities and NE state changes. For performance reasons, the Activity Log is buffered and the user may experience a delay of at least 1 minute before the log appears in the database. This delay is to accommodate transient log messages. The Activity Log is sorted based on a descending timestamp order. The record with the newest timestamp is displayed first. Because the system measures time in milliseconds while NETSMART reports time in seconds, some sort ordering may appear erroneous.

1 From the NETSMART menu, select Log Managers. From the menu, select Activity Log Manager to display the Activity Log Manager window. The selected log displays. By default, the Activity log is sorted in Timestamp Descending order.
Note: It takes approximately 30 seconds to I minute for an action to be added to the Activity Log.

View Fault History Log

Once an NE alarm has been cleared, the record is stored in the Fault History database. For performance reasons, the Fault History Log is buffered and the user may experience a delay of at least 1 minute before the log appears in the database. This delay is to accommodate transient log messages.

1 From the NETSMART menu, select Log Managers. From the cascading menu to the right of Log Managers select the Fault History Log Manager. The following window displays. The menu bar and toolbar for the Fault History Log Manager are identical to the Activity Log Manager.

View TL1 Commands

Both user-generated and NE-originated TL1 commands can be viewed in the TL1 Log.

1 From the NETSMART menu, select Log Managers. From the cascading menu to the right of Log Managers select TL1 Log Manager.

View Transient Events

The Transient Log Manager allows viewing, filtering and sorting of all the Transient Condition events from the Fault History log. Transient Condition records are those that are reported but do not have any clearing event associated with them. It is similar to the Fault History log manager except for the condition that is a Transient event. For performance reasons, the Transient Event Log report is buffered and the user may experience a delay of at least one minute before the log appears in the database.

1 From the NETSMART menu, select Log Managers. From the cascading menu to the right of Log Managers select Transient Log Manager. The toolbar and menu bar are the same the Activity Manager.

Introduction to Meta Model

This section provides overview and design information about Meta Model component of NETSMART. The Meta Model provides an instantiated means of describing any specific network element and generic. The meta model captures the physical and logical components that comprise the NE.

This meta model is used by the application to access meta information for an NE and any specific instance of a component supported by the NE. One challenge and objective for NETSMART is to provide a generic solution for introducing new NE assemblies. The design of the meta model was intended to satisfy this goal. Other applications within NETSMART also face this similar challenge.

It is been widely accepted that a network element suites a generic assembly tree pattern very well. Ideally, applications like auto discovery, auditing, reconciliation, database change handling, configuration management should all provide generic solutions (i.e. non-type specific). Type specific traversal is supported by the meta model for those applications that find it difficult to design generically.

Scope

This document describes the NE Meta Model design with some coverage on related applications (e.g. Autodiscovery). It does not cover details on aspects related to other components. It is acknowledged that additional requirements for the Meta Model will arise during the remaining development phases of NETSMART. The NE Meta Model is very flexible and extensible. It is expected that as additional requirements are identified they will be added to subsequent revisions of this document.

Overview

This section provides an overview for the Meta Model component of NETSMART. Meta Model is the core the data driven approach of NETSMART. Various semantic details of a network element are captured in Meta Model, such as different objects managed by network element (e.g shelves, equipment, facilities etc.), relationships between these objects, various attribute applicable to these managed objects etc. The containment hierarchies between managed objects is also captured in Meta Model. The meta model provides a type of management information base for the application. If something changes between two successive releases of a network element, it can be handled in Meta Model by just incorporating these changes to the network element model. Following are few examples of the kind of information captured in this component:

Equipment contained in a shelf

Different facilities available on a network element.

Different values which an equipment attribute can take

Working and Protect participant in an EPG or FFP

The following depict the major design objectives for the meta model.

Easy introduction of new network elements.

Allow the applications to traverse the meta model hierarchically and generically.

Allow the applications to define various data model, and meta model, relationships which will help satisfy their specific requirements. Note: These may and probably will be unrelated to the assembly containment. For example, a MetaSection is a way to group MetaSlot(s) for alarm correlation but a MetaSection has nothing to do with the assembly hierarchy.

Provide the application with the ability to design using typed interfaces while maintaining the models generically.

Each managed object on network element is represented by a Meta Object in the Meta Model which contains all relevant meta information about that managed object. There are different Meta Objects for different type of facilities, equipment, EPGs etc. Each Meta Object for a given NE type in the meta model, is identified by Meta Instance Id which is just a label given to Meta Objects for identification. If there are multiple Meta Objects of the same type (e.g. two STS1 facilities) which have same characteristics, they are mapped to the same Meta Component. Meta Component represents 'Type' of Meta Object. The attributes can be defined against a Meta Object as well as Meta Component. Attributes defined against a Meta Component are applicable to all Meta Objects related to that Meta Component. All common attributes of similar Meta Objects are defined against Meta Component whereas, if there are any specific attributes applicable to a particular Meta Object only, they can be defined against Meta Object itself. Meta Model also captures some information which does not pertain to network element directly, for example the name of the java class to be used for address translation for a particular NE is also captured in meta model.

In the overall picture of NETSMART, meta model resides in Application Server. Configuration Manager is the main user of meta model. All other components access meta model via Configuration Manager. The usage of meta model can be divided into two major parts:

Autodiscovery/Resync/Audit/Reconcile

Providing specific meta information

The meta model knows nothing about the current state of a network element. It maintains only a static representation of a network element. The Autodiscovery[1] application uses the meta model to drive the building of the dynamic view of the network element. Only the dynamic view of a network element provides current state. The dynamic view of a network element is captured in another component namely the Configuration Manager. Fundamentally, the dynamic view of a network element is a subset of the meta model containment tree. During autodiscovery, the containment hierarchy modeled in meta model is used to build the containment tree (dynamic view) of application objects in Configuration Manager. The containment hierarchy in meta model dictates the containment hierarchy in configuration manager. Only containment relationships in meta model are used for autodiscovery. Other relationships in the meta model relationship tree are not used during autodiscovery.

[1] Autodiscovery is the process of obtaining configuration information from NE and persisting in Configuration Manager.

Once autodiscovery is done, configuration manager can obtain any specific meta information from meta model. For example, while displaying equipment and ports in configuration manager GUI, configuration manager needs to find out various ports supported by a particular equipment. This information is obtained by configuration manager from meta model on need basis. Another example is that when user wants to change some provisioning attribute on a facility or equipment, configuration manager GUI presents list of valid values for that attribute. This list of valid values is obtained from meta model on need basis.

Meta Model can be divided into two parts on broad basis:
Meta Model Data
Meta Model Engine Meta Model data contains all the static modeling information about the network element. It models all the Meta Objects, relationships between them, various applicable attributes on Meta Objects, valid values for these attributes etc. This data is captured in oracle database tables as per the data model. Initially, this data is recorded in .db files, one corresponding to each table in data model. These .db files are loaded into oracle database using some awk scripts during NETSMART installation. Once this data is loaded into oracle database, during Application server startup this information is read by Meta Model engine and cached in memory in form of relationship tree. Once loaded into memory, Meta Model engine uses this cache for future reference. It is possible to delay loading of this information into memory Meta Model engine is the executable part in meta model which implements all the interfaces exposed. It also implements semantic interpretation of Meta Model data, loading of meta model data from database to memory.

Feature Dependencies

In order to be able to support autodiscovery, Meta Model is dependent on support from COMMS for that NE type.

Process Overview

This section addresses process of adding support for a new network element assembly. Following are main steps involved in supporting new network element in netsmart from meta-model point of view:

Understanding the network element : This involves reading the documentation (e.g. Architecture and design documents, TL1 document etc.) available on network element to be supported.

This helps build the general understanding of the network element. This also involves trying TL1 commands on the NE and/or interacting with NE people to clarify some behavioral doubts.

Modeling meta objects and relations : This involves abstracting the containment and other relationships between various objects to be modeled. Various relationships and objects to be supported depends on the NETSMART requirements. NETSMART RSA dictates the type and level of support required in NETSMART for a network element. Please refer to Appendix A for list of various objects and relationships commonly modeled for network assemblies. It may be required to modeled additional relationships or objects depending on the requirements defined by RSA. This object-relation-ship model is captured in meta_assembly.db file.

Modeling other characteristics of meta objects: This includes filling up other.db files for support of network element in question. This includes meta_instance.db, meta_component.db, meta_property.db, meta_attribute.db, meta_attr_map, meta_collapsed_naming_key and meta_eqpt_type_map.

Implementing a data cache java class for fetching configuration information from network element during the process of Autodiscovery.

Testing autodiscovery for the network element.
Code review for the model.
Assumptions Modeling of a new NE assembly assumes that the documentation for the network element is available (e.g. NMIS, PDS etc). Also, it is assumed for modeling of new assemblies that access to network element is also available.

Data Model

This section defines the data model which is used to instantiate the meta model. The assemblies for all net-work element types supported by NETSMART will be stored in the database (Oracle). A specific NE meta model can be loaded into memory on demand or preloaded during the Application Server initialization. SQL queries are used to retrieve the assembly data and instantiate the meta model. The data model has been updated for the 2.i release. Changes for 2.i included (a) adding newer columns to existing tables (b) dropping columns which existed prior to 2.i and (c) introducing new tables. Table and column definitions which existed prior to 2.i are mentioned in italics. This is expected to serve as a reference for developers.

The following sections describe the data model and how the meta model uses it to instantiate a network element assembly:
Schema definition
Query model.

Schema definition

The following tables are used to define all network element assemblies which are managed by NETSMART. The meta model is built by querying the following tables:
meta_component
meta_instance
meta_assembly
meta_class
meta_property
meta_attribute
meta_assembly_map
meta_collapsed naming keys
meta_attr_map
meta_eqpt_type_map The following tables have been eliminated in 2.i:
meta_revision
   meta_component The Component table is the catalogue of all available part types for a network element. Each part for a given base network element (e.g. FACTR) is assigned an component identifier that is a unique primary key to the Component table. Following table lists the different columns in the table and their descriptions:

| Table Column | Datatype | Description |
| --- | --- | --- |
| NE_BASE | varchar2(32) | The base network element identifier (e.g. FACTR). |

-continued

| Table Column | Datatype | Description |
| --- | --- | --- |
| META_COMP_ID | varchar2(32) | A unique component identifier. |
| APPL_CLASS | varchar2(75) | The name of the java class used to create application object during autodiscovery. |
| META_CLASS_ID | varchar2(32) | An enumerated meta class identifier. This field references the meta_class table. |
| APPLICATION_TYPE | varchar2(15) | The type value used by the application for this component. (e.g. EQPT, TP, etc.). |
| COMM_TYPE | varchar2(15) | The type value used by the communications layer for this component. (e.g. EQPT, TP, etc.) There is not a one to one mapping with the APPLICATION_TYPE. |
| NAMING_KEY | varchar2(15) | Some components have a naming key. It is analogous to the applications ComponentType in the Relative-ComponentID. (e.g. Shelf, Slot, Group, etc.). Any given instance of this component may provide a NAMING_VALUE which is used in combination with this naming key. |

Constraints:
Primary key: NE_BASE, META_COMP_ID
Foreign key: META_CLASS_ID references meta_class (meta_class_id)

meta_instance

The Instance table is the inventory of all available parts. An instance refers to the particular existence of a component (MetaObject) in relationship tree identified uniquely by META_INST_ID for a particular NE type.

| Table Column | Datatype | Description |
| --- | --- | --- |
| NE_BASE | varchar2(32) | The base network element identifier (e.g. FACTR). |
| META_INST_ID | varchar2(32) | A unique instance identifier for a specific component. |
| META_COMP_ID | varchar2(32) | This instance's component identifier. |
| NAMING_VALUE | varchar2(32) | Specifies complete Component ID for the meta object. |
| INSTANCE TYPE | varchar2(15) | Indicates if instance is a standard MetaObject, a collapsed MetaObject or an expandable collapsed MetaObject. |
| AUTO_CREATE a | varchar2(16) | Indicates when an instance gets created. case-1: when the configuration permits it case-2: always created automatically case-3: created by default if no data object exists | a This information is used by Autodiscovery service. Refer to Appendix I: for details.

Constraints:
Primary key: NE_BASE, META_INST_ID
NE_BASE,META_COMP_ID references meta_component (NE_BASE, META_COMP_ID
instance_type can be in ('single', 'expand', 'collapse')
auto_create can be in ('normal', 'auto_create', 'default_create')

met a_assembly

The assembly table describes the complete hierarchical composition of a network element assembly. The composition is based on instance identifiers. The composition of an assembly uses named relationships (or edges) with possible conditional expressions.

| Table Column | Datatype | Description |
| --- | --- | --- |
| NE_BASE | varchar2(32) | The base network element identifier (e.g. FACTR). |
| PARENT | varchar2(32) | A instance identifier for a specific assembly component. This instance of a component is the direct predecessor to the corresponding NODE identifier in the assembly hierarchy. NODE varchar2(32) A instance identifier for a specific assembly component. This NODE identifier is the successor to the PARENT identifier. |
| EDGE | varchar2(32) | The EDGE defines a named relationship between the PARENT and the NODE. The reasons and usage of relationships is dependent upon application usage. For instance the Autodiscovery application is primarily concerned with CONTAINMENT type relationships. Refer to appendix A for various relationships modeled in meta model. |
| PRIORITY | integer | This determines the order in which rows are returned from database at the time of loading meta model into application memory. |
| CONDITION | varchar2(1024) | The condition is an optional expression which can be attached to an edge. The dynamic evaluation of the conditional expression must be evaluated to true in order for the relationship between the PARENT and the NODE to hold. |

Constraints:
Primary key: NE_BASE, PARENT, NODE, EDGE
Foreign key: (NE_BASE, PARENT) references meta_instance(NE_BASE, META_INST_ID)
Foreign key: (NE_BASE, NODE) references meta_instance (NE_BASE, META_INST_ID)
EDGE must be one of ('IS_A', 'IS_A_DEFAULT', 'CONTAINS', 'CONTAINS_ONE_OF', 'CONTAINS_ONE_OF_DEFAULT', 'CONTAINS_FOR_NAMING', 'CONTAINS_AS_WORKING', 'CONTAINS_AS_WORKING_DEFAULT', 'CONTAINS_FOR_PROTECTING', 'IS_NAMED_BY', 'SUPPPPORTS_PORT', 'SectionToEquipment', 'SectionEquipmentDefault', 'SectionToType', 'HAS_PROT_PARTICIPANT', 'HAS_PRO- TECTING_PARTICIPANT', 'HAS_WORKING_PARTICIPANT', 'IS_SUPPORTED_BY', 'IS_XCONNECTABLE_TO', 'IS_DEFAULT_XCONNECTABLE_TO', 'IS_DEFAULT_IWAY_XCONNECTABLE_TO' meta_class

The meta_class table provides the information needed to instantiate MetaObject(s). MetaObject(s) are the instantiated representation of a component instance. The MetaObject models static information about a component. The MetaObject(s) are sub-classed (e.g. MetaShelf, MetaFunctionalGroup, MetaEquipment, etc.) and provide a typed hierarchical representation of an assembly.

| Table Column | Datatype | Description |
| --- | --- | --- |
| META_CLASS_ID | varchar2(32) | An enumerated meta class identifier. |
| META_CLASS | varchar2(75) | The actual JAVA class name, including package information. These classes are implemented in the meta_model package and are instantiated using JAVA reflection. |

The meta_assembly_map defines the assemblies managed by FENICS. It also provides for the mapping of assembly id. That is, a particular assembly can be managed as another. In addition, this table provides the weight assigned to a particular assembly, the managed level and auto load flag.

| Table Column | Datatype | Description. |
| --- | --- | --- |
| TYPE | varchar2(32) | The network element type as retrieved from the NE (e.g. FACTR). The complete assembly id consists of the TYPE, CONF, MAJOR, and MINOR fields (e.g. FACTR UPSR 05 02). |
| TO_TYPE | varchar2(32) | Mapped network element type. |
| MINMAJOR | varchar2(5) | The major and minor network element revision number |
| AUTO_LOAD | varchar2(5) | Flag indicating whether the mapped assembly should be auto loaded during initialization. |
| The following are not available in 2.i: | | |
| CONF | | The network element configuration as retrieved from the NE (e.g. UPSR). |
| MAJOR | | The network element major revision as retrieved from the NE (e.g. 05). |
| MINOR | | The network element minor revision as retrieved from the NE (e.g. 02). |
| TO_BASE | | Map the above assembly to this base network element id. (e.g. FACTR). The mapped assembly id consists of the TO_BASE, TO_MAJOR and TO_MINOR fields (e.g. FACTR 05 02). |
| TO_MAJOR | | Map the above assembly to this major network element revision. (e.g. 05) |
| TO_MINOR | | Map the above assembly to this minor network element revision. (e.g. 02) |
| WEIGHT | | The weight assigned to the complete assembly id. |
| MANAGE_LEVEL | | The managed level of the mapped assembly id (e.g. 5S) |

Constraints:

Primary key:

AUTO_LOAD must be either 'true' or 'false' meta_property

The meta_property table captures the properties[2] for a specific component. A property is a generic way of grouping attributes of a component. The grouping of attributes into properties is application dependent. For example, the attributes which are used to describe a components current state and configuration are grouped into the ATTR_LIST property.

[2] Properties can be visualized as category of attributes. There are various categories of attributes modeled in meta model e.g. TL1 related attributes, attributes required to control behavior of other components etc.

| Table Column | Datatype | Description |
| --- | --- | --- |
| NE_BASE | varchar2(32) | The base network element identifier (e.g. FACTR). |
| META_PROPERTY_ID | varchar2(32) | Unique identifier for the property. |
| PROPERTY_NAME | varchar2(32) | The name assigned to this property. (e.g. ATTR_LIST) |
| The following are not available in 2.i | | |
| META_COMP_ID | | The component identifier which is associated with this property. This may also be a META_CLASS_ID. If it is a META_CLASS_ID, all instances of the particular META_CLASS receive this property. |
| PROPERTY_KEY | | A unique identifier for a property name. Used to distinguish identical property names with conditions. |
| CONDITION | | A condition expression which can optionally be attached to the property. The dynamic evaluation of the conditional expression must be evaluated to true in order for the component to access this property. |

Constraints:

Primary key: NE_BASE, META_PROPERTY_ID meta_attribute

The meta_attribute table captures the attributes for a specific property. The meta_attribute table provides the capability of describing the characteristics of any given attribute. This table serves as inventory of different attributes applicable to NE types.

| Table Column | Datatype | Description |
| --- | --- | --- |
| NE_BASE | varchar2(32) | The base network element identifier (e.g. FACTR). |
| META_ATTRIBUTE_ID | varchar2(32) | Unique identifier for the attribute. |
| PROPERTY_ID | varchar2(32) | Prior to release 2.i, this column was called PROPERTY_NAME.Together with NE_BASE, references meta_property(ne_base, meta_property_id) |
| ATTR_NAME | varchar2(32) | The name assigned to this attribute. |
| TYPE | varchar2(10) | The application type of the attribute. For example, String, Integer, Boolean, Float, Enum. |
| VALUE | varchar2(256) | Although the data model, and meta model do not know the current state of any components attributes. Some attribute have a static value. This value is not expected to change. |
| DEFLT | varchar2(20) | The default attribute value. |
| VALID_VALUES | varray called | A list of valid values for this attribute. This is str_list_t currently limited to 15 elements of maximum length 15. |
| MIN | varchar2(20) | A minimum value for this attribute. Used for Integer and Float only. |
| MAX | varchar2(20) | A maximum value for this attribute. Used for Integer and Float only. |
| INCR | varchar2(20) | A increment value for this attribute. Used for Integer and Float only. |
| READ_ONLY | varchar2(5) | A boolean flag indicating whether this attribute may be changed or not. |
| REQUIRED | varchar2(5) | A boolean flag indicating that this attribute is required. |
| The following are not available in 2.i: | | |
| PROPERTYKEY | | A unique identifier for a property name. Used to distinguish identical property names with conditions. |
| ATTRKEY | | A unique identifier for an attribute name. Used to distinguish identical attribute name with conditions. |
| META_COMP_ID | | The component identifier which is associated with this property. This may also be a META_CLASS_ID. If it is a META_CLASS_ID, all instances of the particular META_CLASS receive this property. |
| CONDITION | | A condition expression which can optionally be attached to the attribute. The dynamic evaluation of the conditional expression must be evaluated to true in order for the component to access this attribute. |

Constraints:
Primary key: NE_BASE, META_ATTRIBUTE_ID
Foreign key: (NE_BASE, META_PROPERTY_ID) references meta_property(NE_BASE, META_PROPERTY_ID)
ATTRNAME is NOT NULL
TYPE must be in ('String', 'Integer', 'Boolean', 'Float', 'Enum', 'Class')
READ_ONLY must be either in 'true' or 'false'
Valid values for REQUIRED must be either 'true' or 'false'
meta_attr_map This table is new for the 2.i release. It links meta_attribute with either meta_component or meta_instance.

| Table Column | Datatype | Description |
| --- | --- | --- |
| NE_BASE | varchar2(32) | The base network element identifier (e.g. FACTR). |
| META_ID | varchar2(32) | Identifies the meta_component or meta_instance to which the attribute is assigned, |
| META_ATTRIBUTE_ID | varchar2(32) | Unique identifier for the attribute. |
| CONDITION | | An optional condition expression. The dynamic evaluation of the conditional expression must be evaluated to true for the component instance to access this attribute. |

Constraints:
Primary key: NE_BASE, META_ID, META_ATTRIBUTE_ID
Foreign key: (NE_BASE, META_ATTRIBUTE_ID) references meta_attribute(NE_BASE, META_ATTRIBUTE_ID)
Foreign key: (NE_BASE, META_ID) may reference either meta_instance(NE_BASE, META_INST_ID) or meta_instance(NE_BASE, META_COMP_ID)
meta_eqpt_type_map This table is new for release 2.i. contains a vendor ID/CLEI to equipment type mapping.

| Table Column | Datatype | Description |
| --- | --- | --- |
| NE_BASE | varchar2(32) | The base network element identifier (e.g. FACTR). |
| VENDOR_ID | varchar2(32) | Vendor Id (or CLEI) that uniquely identifies an equipment type. |
| NE_EQPT_TYPE | varchar2(32) | Equipment type. This doesn't have to be unique since different vendor IDs/CLEI codes can map to the same equipment type. |

Constraints:
Primary key: NE_BASE, VENDOR_ID
  meta_collapsed_naming_keys

This table is new for release 2.i. Specifies for a collapsed meta instance what are its naming keys that must be resolved. E.g. the collapsed object representing an ATM VC on the SONET ring, the unresolved naming key would be vci.

| Table Column | Datatype | Description |
| --- | --- | --- |
| NE_BASE | varchar2(32) | The base network element identifier (e.g. FACTR). |
| META_INST_ID | varchar2(32) | Specifies a given instance. Together with NE_BASE, references meta_instance(ne_base, meta_inst_id) |
| NAMING_KEY | varchar2(15) | This is similar to the application ComponentType in the RelativeComponentID (e.g. Shelf, Slot, Group etc.). |
| MIN | integer | The minimum valid value for the RelativeComponen-tID. |
| MAX | integer | The maximum value for the RelativeComponentID. |
| INC | integer | Incremental value for the RelativeComponentID |
| PREFIX | varchar2(32) | String that may have to be prepended to the Relative-ComponentID. |
| POSTFIX | varchar2(32) | String that may have to be appended to the Relative-ComponentID. |
| PRIORITY | integer | A collapsed meta object may have multiple naming keys. This specifies the relative priority. |
| INHERITED | varchar2(5) | Specifies whether value for RelativeComponentID is inherited from ancestor. |

Constraints
Foreign key: (NE_BASE, META_INST_ID) references
  meta_instance(NE_NBASE, META_INST_ID)
INC should not be <0 or> MAX
INHERITED must be either 'true' or 'false'
MAX should not be less than MIN
  meta_tmp This is a temporary table. It is used by Meta Model awhile populating its tables with data

| Table Column | Datatype | Description |
| --- | --- | --- |
| NAME | varchar2(256) | Used as a temporary work space during data load pro-cess. | meta_strings

| Table Column | Datatype | Description |
| --- | --- | --- |
| NAME | varchar2(700) | Temporary |
| ID | integer | Used to identify NAME |

Constraints:
Primary key: NAME
  meta_revision

This table has been eliminated in release 2.i.
The meta_revision table captures the possible revisions of components. Since network elements have revisions this table allows for the definition of the components which comprise a particular network element revision. Each network element revision must define a list of valid components which are used to define the assembly.

| Table Column | Description |
| --- | --- |
| NE_BASE | The base network element identifier (e.g. FACTR). |
| META_COMP_ID | The component identifier. |
| MJ_REV | The network element major revision which requires this component. (e.g. FACTR 05). This field is used in con-junction with the MN_REV. |
| MN_REV | The network element minor revision which requires this component. (e.g. FACTR 05 02). This field is used in conjunction with the MJ_REV. |

Query Model

This section describes database queries performed by Meta Model to instantiate a network element assembly. The following sections describe how the meta model is built:
Retrieving the Assembly Data
Retrieving an Assembly Base
Retrieving the Assembly Root Node
Retrieving the Assembly Hierarchy Each SQL statement and its corresponding result set are discussed below.
Retrieving the Assembly Data

SQL:

SELECT*from meta_assembly_map;

Results:

The result is a collection of MetaAssemblyData objects. This collection of MetaAssemblyData define the net-work element assemblies which are managed by FENICS. This collection also provides a way to map a par-ticular assembly to another. That is, to manage a particular assembly as if it was another. For example, FACTR 05 02 may be managed as a FACTR 05 01. Each MetaAssemblyData assigns a weight to a particu-lar assembly. In addition, the managed level and auto load flag is provided in the Meta Assembly Data.
Retrieving an Assembly Base SQL:
SELECT   mi.meta_inst_id,   mi.meta_comp_id,
  mi.naming_value, mc. appl_class,mc. meta_class_id, mc. application_type,mc.   comm_type,   mc.naming_key, mc.auto_create, ml.meta_class
FROM meta_instance mi, meta_component mc, meta_class ml
WHERE mi.ne_base=:1 AND
mc.ne_base=mi.ne_base                              AND
  mc.meta_comp_id=mi.meta—comp_id AND
ml.meta_class_id=mc.meta_class_id;

Results:

The result of this query is all of the components for a specified base assembly. This becomes a cache of Met-aNode(s) which is used by the individual assemblies under the base.
Retrieving the Assembly Root Node SQL:
SELECT   mi.meta_inst_id,   mi.meta_comp_id,
  mi.naming_value, mc.appl_class,mc.meta_class id,mc. application_type, mc.   comm_type,   mc.naming_key, mc.inherited_nk, mc.auto_create, ml.meta_class FROM meta_instance mi, meta_component mc, meta_revision mr, meta_class ml
WHERE mi.meta_inst_id=:1
AND mc.meta_comp_id=mi.meta_comp_id
AND mc.ne base=mi.meta_inst_id
AND mr.meta_comp_id=mi.meta_comp_id
AND mr.ne_base=mi.meta_inst_id
AND mr.mj_jev=:2
AND mr.mn_rev=:3
AND ml.meta_class_id=mc.meta_class_id;

Results:

The result of this query is a particular revision of a network element assembly. This is expected to return the single result set associated with a particular base, major and minor revision of an assembly. This result set is used to create the MetaNe root node in the assembly hierarchy.

Retrieving the Assembly Hierarchy

SQL:
SELECT ma.ne_base, ma.parent, ma.node, ma.edge, ma.condition
FROM meta_assembly ma, meta_instance mi, meta_revision mr
WHERE ma.ne_base=:1 AND
ma.parent=:2 AND
mi.ne_base=ma.ne_base AND
mi.meta_inst_id=ma.node AND
mr.nebase=ma.ne_base AND
mr.meta_comp_id=mi.meta_comp_id AND
mr.mj_rev=:3 AND
mr.mn_rev=:4;

Results:

The result of this query are the successors to the specified parent and ne_base parameters. This SQL is recursively called in order to build the assembly hierarchy. It is started at the root MetaNe node and traverses depth first until it reaches leaf nodes and the entire tree is instantiated. NOTE: This is the most expensive, time consuming, part of building the meta model.

Retrieving Object-attribute Assignment

SQL:

Please refer to LOAD_ALL_OBJECTS_ATTR_MAP inside MetaObjectLoader.java
SELECT mi.meta_inst_id, mam.meta_attribute_id, mam.condition,
ma. meta_property_id
FROM meta_instance mi, meta_attr_map mam, meta_attribute ma
WHERE mi.ne_base=:1 AND
((mi.meta_inst_id=mam.meta_id) OR (mi.meta_comp_id=mam.meta_id)) AND
mam.ne_base=mi.ne base AND
mam.meta_attribute_id=ma.meta_attribute_id AND
ma.ne_base=mi.ne_base Results:

Loads all attribute_id values for every component inside an assembly.

Retrieve a Specific Object in an Assembly

SQL:

Please refer to LOAD_INSTANCE in MetaObjectLoader.java

SELECT mi.meta_inst_id, mc.meta_comp_id, mi.naming_value,
mc. appl_class,mc. meta_class_id, mc. application_type,mc. comm_type,
mc.naming_key, mi.auto_create, mcl.meta_class, mi.instance_type
FROM meta instance mi, meta_component mc, meta_class mcl
WHERE mi.ne_base=:1 AND
mi.meta_inst_id=:2 AND
mi.meta_comp_id=mc.meta_comp_id AND
mc.ne_base=mi.ne_base AND
mc.meta_class id=mcl.meta_class_id Results:

Loads a specific object in an assembly.

Loading an Attribute for an Assembly Component

SQL:

Please refer to LOAD_OBJECT_ATTRIBUTES in MetaObjectLoader .java
SELECT ma.ne_base, ma.meta_attribute_id, ma.meta_property_id, ma.attrName, ma.type, ma.value, ma.deflt, ma.valid_values, ma.min, ma.max, ma.inc, ma.read_only, ma.required, mam.condition
FROM meta_instance mi, meta_attr_map mam, meta_attribute ma WHERE mi.ne_base=:1 AND mi.meta_inst_id=:2 AND ((mi.meta_inst_id=mam.meta_id) OR (mi.meta_comp_id=mam.meta_id)) AND mam.ne_base=mi.ne_base AND mam.meta_attribute_id=ma.meta_attribute_id AND ma.ne_base=mi.ne_base Results:

Loads all meta_attributes of a specified object in a given assembly for a particular network element.

Loading Specific Object in an Assembly

SQL:

Please refer to LOAD_INSTANCE inside MetaObjectLoader.java
SELECT mi.meta_inst_id, mc.meta_comp_id, mi.naming_value, mc.appl_class,mc. meta_class_id, mc.application_type, mc.comm_type,
mc.naming_key, mi.auto_create, mcl.meta_class, mi.instance_type
FROM meta_instance mi, meta_component mc, meta_class mcl
WHERE mi.ne_base=:1 AND.
mi.meta_inst_id=:2 AND
mi.meta_comp_id=mc.meta_comp_id AND
mc.ne_base=mi.ne_base AND
mc.meta_class_id=mcl.meta_class_id Results:

Loads a specific meta_instance object by relating the meta_instance with meta_class and meta_component.

Retrieve Assembly for a Network Element

SQL:

Please refer to LOAD_ASSEMBLY in MetaObjectLoader.java
SELECT parent, node, edge, condition, priority from meta_assembly
WHERE ne_base=:1 ORDER BY parent, priority, node Results:

Loads the ordered assembly data for a specific network element.

Retrieving meta_collapsed_naming_keys

SQL:

Please refer to LOAD_ALL_COLLAPSED_NAMING_KEYS in MetaObjectLoader .java.

SELECT*from meta_collapsed_naming_keys where ne_base=:1

ORDER by priority;

Results:

Loads information that will help to resolve naming_keys for a collapsed meta instance.

Meta Model

The MetaModelFactory is a singleton object which requires initialization in each process space that requires meta model access. The MetaModelFactory creates a MetaBaseAssembly for each base network element supported by the system (e.g. FACTR, FLM150, etc.). In addition, the MetaModelFactory assigns MetaAssembly(s) to each MetaBaseAssembly reflecting the network element revisons that are supported by NETSMART (e.g. FACTR 05 01, FACTR 05 02, FLM150 11 02, FLM150 12 02, etc.). Each MetaAssembly evaluates its auto load flag. If it is True, the MetaAssembly will initiate the instantiation of the assembly. The instantiation of the assembly starts at the MetaNe root node and instantiates a tree of MetaNode(s). The tree of MetaNode(s) include named relationships between nodes called MetaEdge(s).

Each MetaEdge may have a condition expression which must be evaluated to true in order for the relationship to be valid. The instantiated assembly provides an application information base for a network element. It is static network element data that is used for autodiscovery, configuration management and various other application components. The assembly tree may be traversed generically or via a typed interface.

Figure 38:
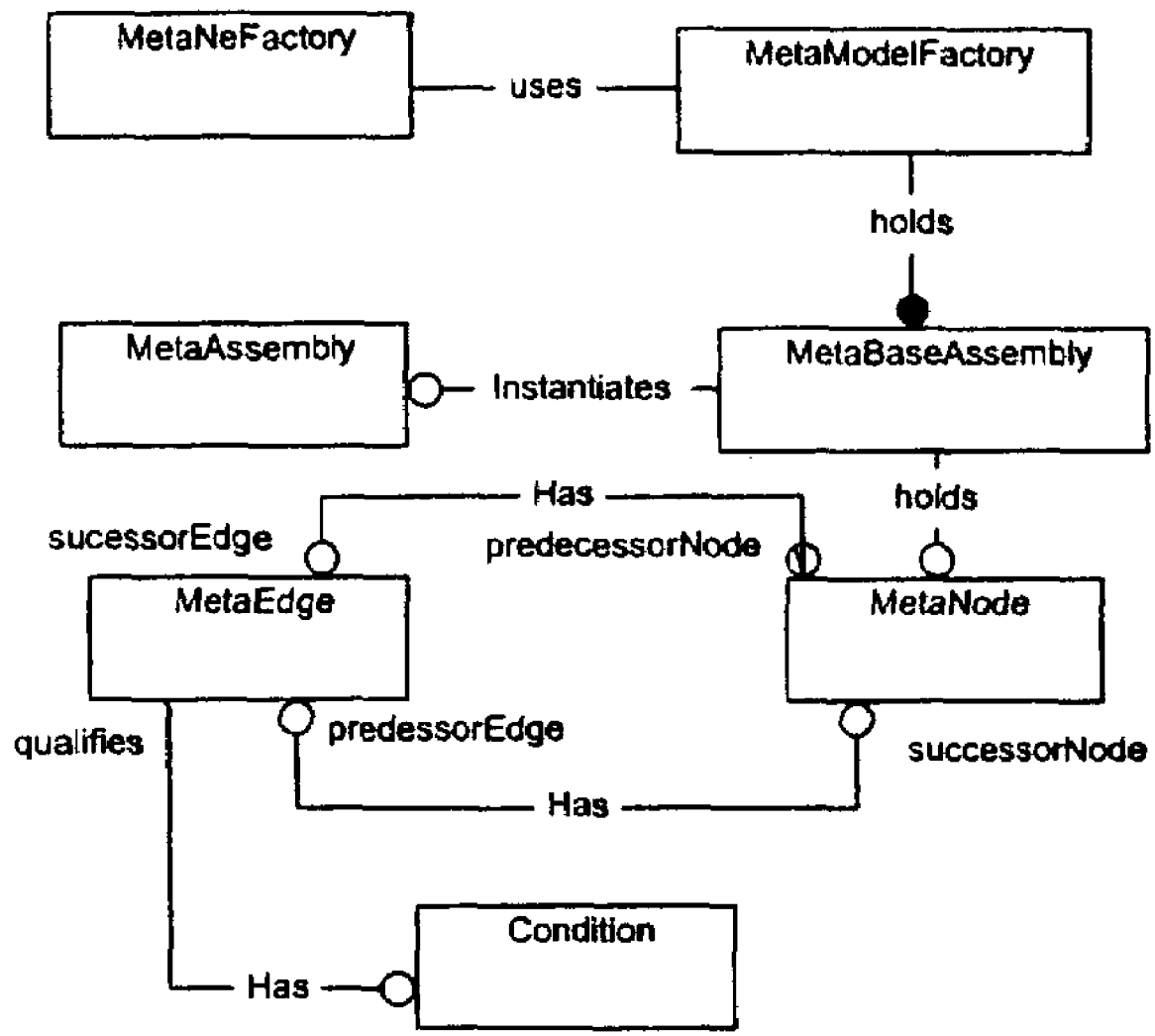
FIG. 38 shows a meta model class diagram.

If the auto load flag is False, the MetaNe root node is the only node that is instantiated. The rest of the assembly tree is instantiated on demand by the Application. The Application which requires access to an assembly obtains it via a MetaNeFactory. The Application provides the necessary data to identify an assembly and acquires a MetaNe reference. If the assembly was not auto loaded it is loaded at this time. FIG. 38 shows the MetaModel class diagram for this process.Meta Base Assembly The MetaBaseAssembly represents a base network element (e.g. FACTR).The MetaBaseAssembly is multi-threaded and synchronized and is created during process initialization. MetaBaseAssembly has state which is represented by MBA_State. At the time of initialization, the state is set to MBA_Inactive. If Meta-BaseAssembly is auto load, a MetaBaseAssemblyLoader is created and the state gets transitioned to MBA_Loading. If it is not a case of auto load, then it is loaded on demand. The MetaBaseAssembly is only loaded once in the process space. If there is a second request to load a MetaBaseAssembly in MBA_Loading state, the invoker is blocked until loading is complete. MBA_Not-Found represents absence of MetaBaseAssembly in database. When the load is successful, the state is transitioned to MBA_Loaded.

Figure 39:
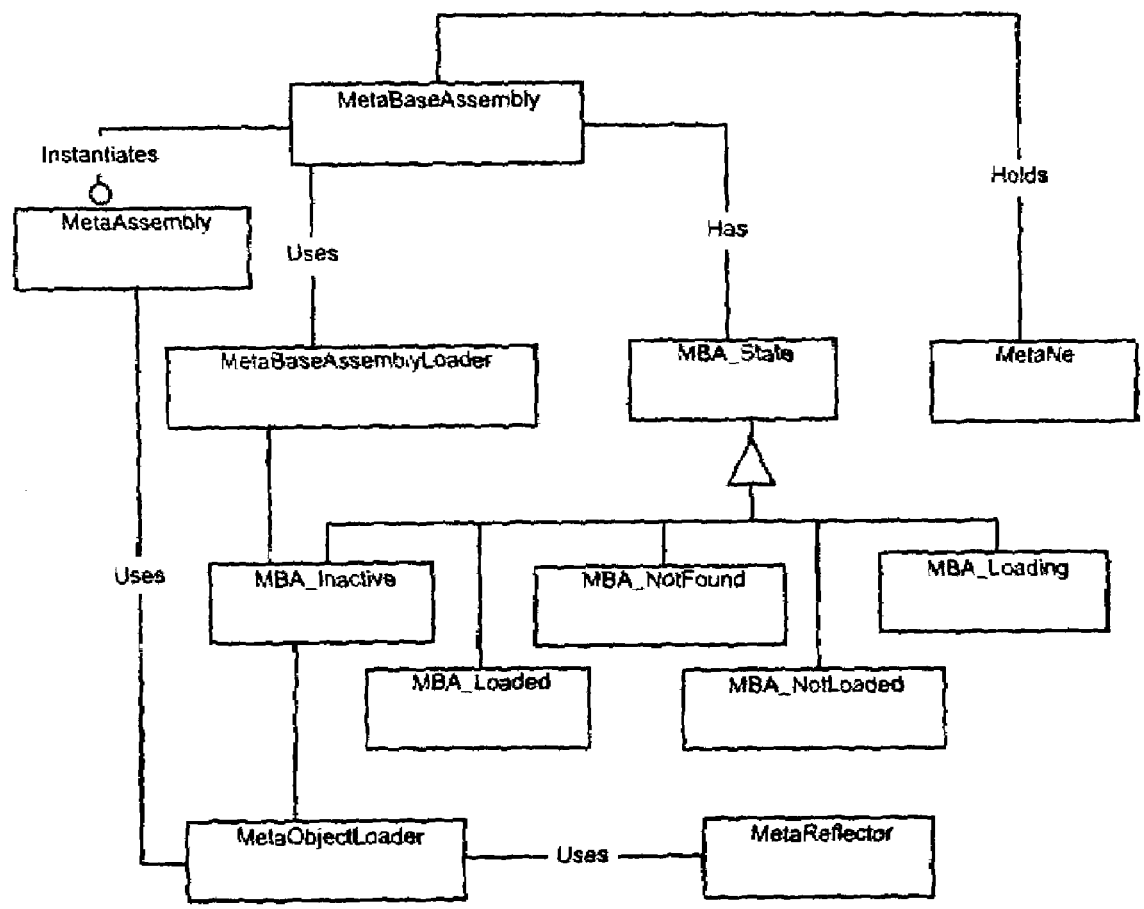
FIG. 39 shows a meta base assembly class diagram.
Figure 40:
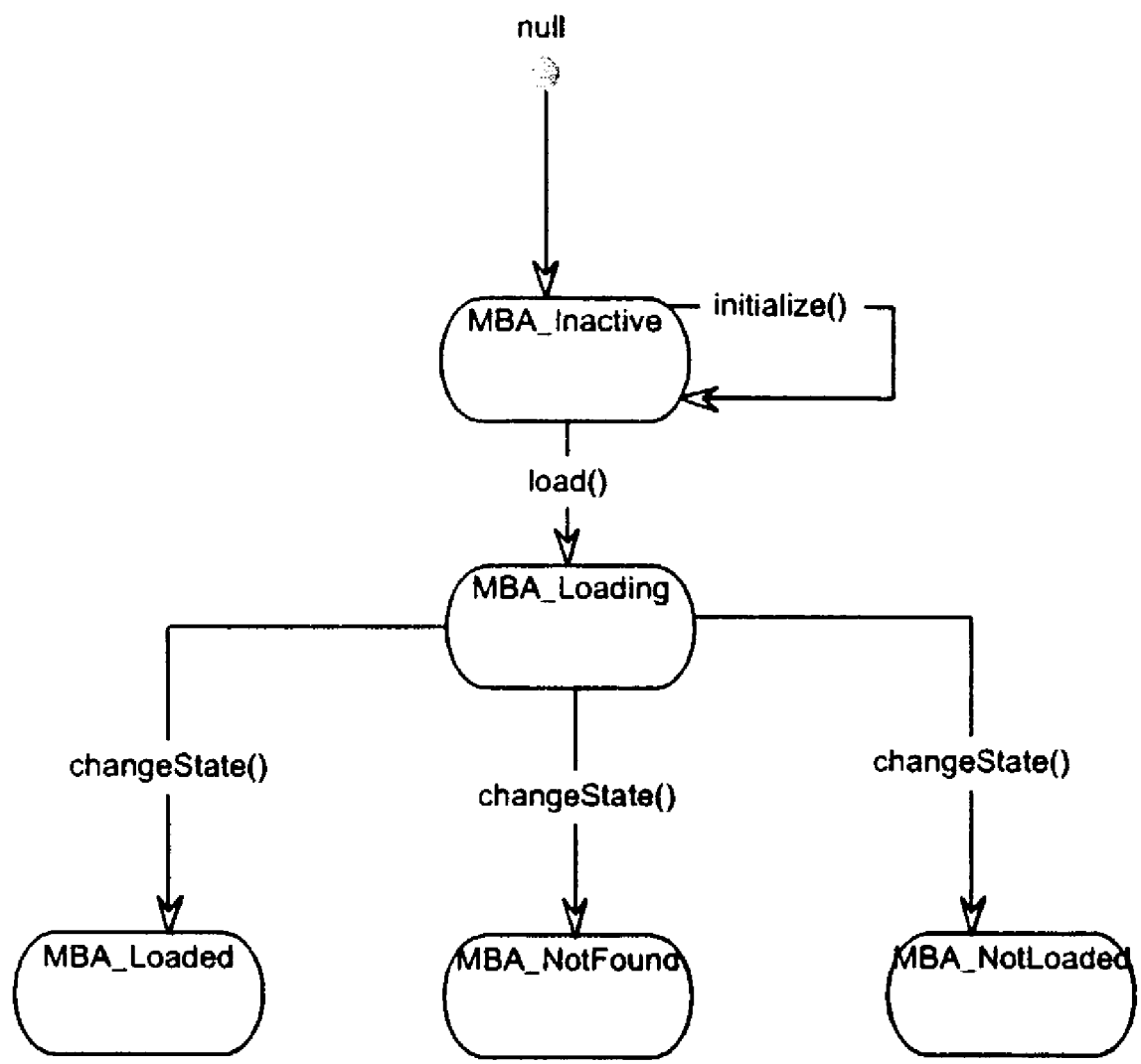
FIG. 40 shows a meta base assembly state transition diagram.

If load fails due to some reason, the state is transitioned to MBA_Not_Loaded. FIG. 39 shows the MetaBase Assembly class diagram. FIG. 40 shows the Meta Base Asembly state transition diagram.

Meta Object

Figure 41:
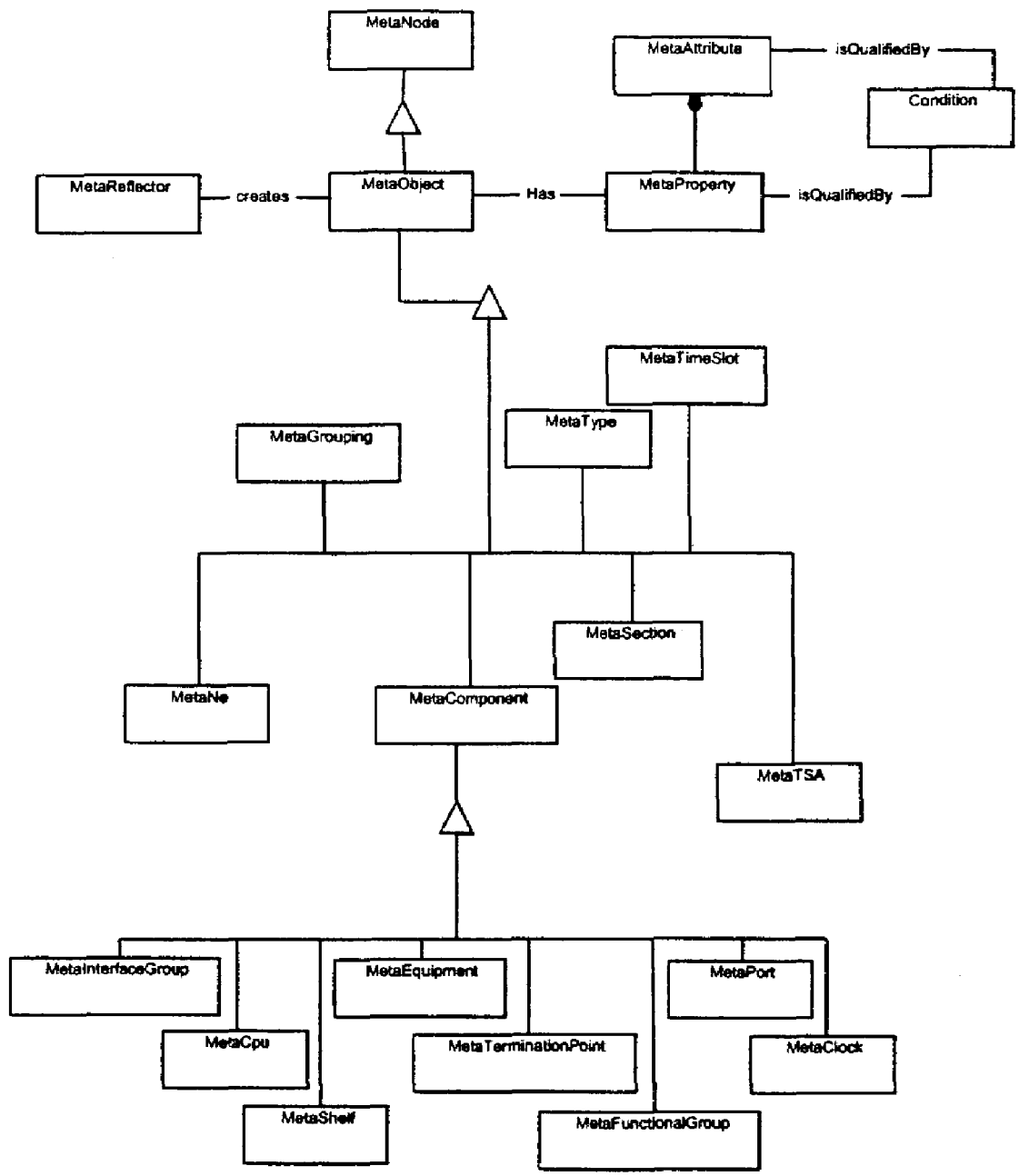
FIG. 41 shows a meta node class diagram.

The MetaNode is an abstraction which allows for generic/ hierarchical traversal of a network element assembly. The MetaNe is the root MetaNode. The typed specific behavior is defined by the MetaObject subclasses. A MetaObject is a generalization of the things that comprise a network element. The MetaObject may contain properties, or lists of attributes, called MetaProperty(s). The MetaProperty contains MetaAttribute(s). The MetaProperty and MetaAttribute may contain a Condition. The Condition must be evaluated at run time with context. Only if the Condition is true does the MetaObject recognize that MetaProperty or MetaAttribute. A MetaObject is created by the MetaReflector using Java reflection. The MetaObject is a abstract class used to define generic behavior for typed network element objects. The network element assembly is a generic tree pattern implemented by the MetaNode and MetaEdge relationships. The network element assembly is also typed. Each MetaNode is implemented as a MetaObject and subclass. FIG. 41 shows the MetaNode class diagram.

Loading a Meta Assembly

The network element assembly is a generic tree pattern implemented by the MetaNode and MetaEdge relationships. The network element assembly is also typed. Each MetaNode is implemented as a MetaObject and subclass. At the time of meta assembly loading, objects and relationships are retrieved from the meta_assembly database table and a relationship tree is constructed in application address space.

Figure 42:
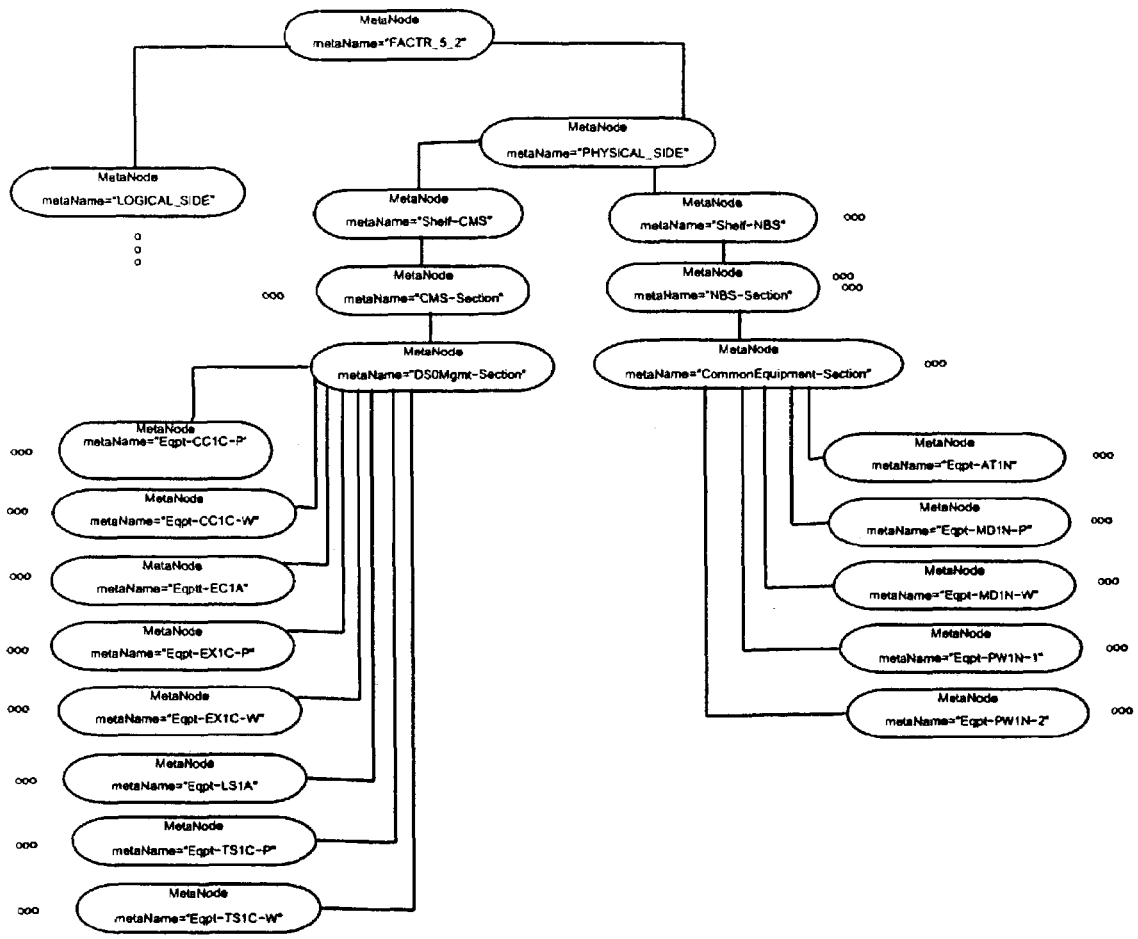
FIG. 42 shows a meta assembly loading diagram.

FIG. 42 depicts a small portion of a FACTR assembly. Starting at the root MetaNode (e.g. FACTR_5_2), the meta model is hierarchically built depth first. The root node contains a PHYSICAL_SIDE and a LOGICAL_SIDE. From the PHYSICAL_SIDE, the hierarchy continues by working its way down through the shelves, sections and equipments, etc.

The hierarchy of the assembly is totally driven by the data model. The loading of the meta model is strictly a reflection of what has been modelled in the meta_assembly table.

Note the relationships between any predecessor and its successors are named and may optionally have a conditional expression on them. The condition expression is evaluated dynamically at run time. The condition must be evaluated to true in order for the relationship to exist.

Objects & Relationships Modelled in Meta Model

This section provides list of various objects and relationships modelled in meta model. The list of objects and relationships provided here covers most of the common scenarios which apply to most of network assemblies. It is important to understand that need for modelling new objects and relationships may arise in future depending on the assembly and the kind of support required in NETSMART for that assembly. Depending on the kind of support provided for an assembly, every relationships object may not be applicable. Following is the list of commonly modelled objects in meta model:

Shelves

Equipment

Facilities[3]

Equipment Protection Groups

Facility Fibre Protection Groups

Functional Groups
Clocks
[3] This includes all different types of facilities (e.g. ports, termination points etc) which are required to be supported for the particular network element assembly.
CPU In addition to that, there are some pseudo objects which can be modelled to organize the hierarchy better. These objects are Sections and Groups. Sections are primarily used to group related equipment together and Group is a more general notion to group set of related meta objects together in meta_assembly. Following is list of relationships modelled in meta model:

CONTAINS Used to model containment between two objects.

CONTAINS_ONE_OF If a parent object in the containment hierarchy can have only one of possible children (in dynamic view) then this relationship is used between parent object and individual children objects.

CONTAINS_ONE_OF_DEFAULT Used to relate a parent object to the child object which will be default child in case when multiple children objects are related to the parent by CONTAINS_ONE_OF relationship.

IS_SUPPORTED_BY Used to capture relationship between functional groups and slots supporting those groups.

HAS_WORKING_PARTICIPANT Used to capture relationship between a protection group (equipment or facility) and working object in that group.

HAS_PROTECTING_PARTICIPANT Used to capture relationship between a protection group (equipment or facility) and protecting object in that group.

SUPPORTS_PORT Used to capture relationship between port and equipment supporting that port.

IS_XCONNECTABLE_TO Used to model the relationship between two time slot groups which can have cross con-nects between them. Used in case of FLASH192 only at present.

IS_DEFAULT_XCONNECTABLE—TO Used to model the relationship between two time slot groups which can have cross connects between them by default. Used in case of FLASH192 only at present.

IS_DEFAULT_1WAY_XCONNECTABLE—TO Used to model the relationship between two time slot groups which can have one way cross connects between them by default. Used in case of FLASH192 only at present.

CONTAINS_AS_WORKING Used to model relationship between line termination point and working time slot groups contained in it. CONTAINS_AS WORKING_DEFAULT Used to model relationship between line termination point and default working time slot groups (if any) contained in it.

CONTAINS_FOR_PROTECTING Used to model relationship between line termination point and protecting time slot groups contained in it.

Modelling Tips

Following are some tips and guidelines for modelling of network elements:

MetaObjects to represent CPUs have to be named as <string1>-<string 2>While <string1> can be anything (usually "Cpu" or "CPU"), <string2> has to be the AID of the CPU. Because this is the logic used to get the CPU aid during a SWDL/RMBU!
The existing metamodels follow this rule.
There are MetaObjects for which we will not create any application object in the dynamic tree. Exam-ples are PHYSICAL_SIDE, LOGICAL_SIDE, CPUs etc. You can give 'none' as their naming_value in meta_instance.db Also make sure that you leave the naming_key of the corresponding meta_component entry as empty.

Any MetaObject contained by another MetaObject that has been marked as 'expand' (ie, instance_type is 'expand' in meta_instance.db) should itself be given the instance_type 'expand'.

Any MetaObject contained by another MetaObject that has been marked as 'collapse' (ie, instance_type is 'collapse' in meta_instance.db) should itself be given the instance_type 'collapse'.

Make sure that CID+Type will be a unique key to identify a MetaObject. CID is the naming_value col-umn in meta_instance. And Type is the comm_type column in meta component. In other words, there should not be more than one MetaObject with the same CID and the same Type.

While assigning the meta attribute LINKABLE to MetaObjects, do NOT use any conditions. This is because when Topology queries CM for all linkable facilities, CM does a direct DB query by joining pnecomponent table with metamodel tables. Conditions cannot be evaluated during this. Again, existing metamodel does not use conditions for LINKABLE attr; so we can keep it that way.

Now we can assign meta attributes to meta_component_id's or meta_instance_id's. So it is better to keep these two ids distinct.

Use comments generously in the db files. It would be useful later on, if we can put the schema of the corresponding table at the beginning of each db file.

Try to organize the db files into different logical blocks. Use blank comment lines to visually separate diff blocks. Give useful comments for each block. For examples, pl see FLM600/*.db files.

Conditions and Their Evaluation

While modelling a network element assembly, conditions can be used where ever some concept is applicable based on condition. In current design following things can be qualified with conditions:

Relationship between two meta objects could be conditional. While meta model relationship tree tra-versal, relationships qualified with conditions are only traversed if the condition is met. Traversal logic does not reach a node, if there was a condition on its predecessor edge (i.e. relationship to parent) which is evaluated to 'false'. Similar logic applies to traversal from a child to parent object as well. This kind of conditional relationships are covered in meta_assembly.

Applicability of an attribute to a Meta Component or Meta Instance could be conditional. An attribute and all its characteristics (e.g. vaild values, read only etc) will apply to a Meta Component or Meta Instance only if the associated condition (if any) evaluates to true. The conditions in meta model look like DataObject.getAttributeValueString("CONF5")="D1" This implies that if the value of attribute 'CONF5' is equal to 'D1' in an object of class DataObject then this will evaluate to 'true'. In order to evaluate conditions, meta model needs 'context'. A component which invokes an interface on meta model, needs to provide context as well so that meta model can evaluate any related conditions. 'Context' is a generic concept and is a vector of objects. In the example of condition above, the 'context' is expected to be a vector of DataObject[4] objects. The framework component responsi-ble for evaluation of conditions, will invoke 'getAttributeValueString("CONF5")' method on each object in con-text and compare the return value with 'D1'. If there was any object in the context for which this comparison succeeds the condition will be evaluated to true.

4 DataObject is a java class in NETSMART.

Autodiscovery Overview

This section presents overview of the autodiscovery process and involvement of meta model in this process. When user adds a network element and performs 'login' from NETSMART GUI, ACT-USER TL1 command is sent by NETSMART to log into the network element. Autodiscovery process is triggered, once successful login and some basic initialization is achieved. Autodiscovery process can be divided into three major phases as described below:

1. Retrieving configuration information from the NE being autodiscovered—During this phase all con-figuration information is retrieved from network element by sending appropriate TL1 commands for retrieval (e.g. RTRV-EQPT etc.). Communication Server provides interfaces to the application server for these TL1 commands. As a result of invocation of these interfaces on COMMS, Application Server gets collection of dataobjects. COMMS returns one dataobject for each aid fetched from the network element. These dataobjects are created by COMMS after parsing the TL1 responses. Each KEYWORD-DOMAIN pair in TL1 response is translated to a Attribute-Value pair. Each dataobject contains collection of such Attribute-Value pairs. In addition to collection of Attribute-Value pairs, dataobject also contains aid and ComponentID[5]. During this phase information about all entities (i.e. equipment, facilities, EPGs etc) is retrieved from network element. This information retrieval is driven by DataCache. Their are subclasses of DataCache for each NE type supported by NETSMART. For example, there is FACTRDataCache which drives this information retrieval for FACTR NEs during Autodiscovery. It is responsibility of the meta model person who is modelling a new NE type to implement a subclass of DataCache for that NE type. From the dataobjects received from COMMS, the DataCache build a hashmap of these dataobjects with CompinentID being the key.

DataCache also supports interface to obtain a dataobject based on its ComponentID, which is used by Autodiscovery in second phase.

[5] ComponentID is internal to NETSMART and can be treated as a unique identifier for a dataobject for a given TID. AddressTranslator in COMMS translates the aid in TL1 response to corresponding COmponentID by following some predefined rules.

2. Traversing the meta model relationship tree and creating application objects 2—Once the DataCache has retrieved all the information and built a hashmap of dataobjects, Autodiscovery traverses the meta model relationship tree and creates application objects. These application objects are passed to Configuration Manager, which holds and manages them. The traversal starts from the root node and for every node following steps are taken to create application objects:

If the meta object is marked as auto_create (i.e. auto_create column in meta_instance is set to 'auto_create' for the meta object) then a default application 3 object is created for that meta object.

If the meta object is marked as normal (i.e. auto_create column in meta_instance is set to 'normal' for the meta object) then ComponentID for that meta object is obtained. If there is a dataobject for this ComponentID in the DataCache then an application object is created for the meta object using 1. ComponentID is internal to NETSMART and can be treated as a unique identifier for a dataobject for a given TID. AddressTranslator in COMMS translates the aid in TL1 response to corresponding COmponen-tID by following some predefined rules.

2. Application objects are held by Configuration Manager. Each application object hold reference to corresponding meta object and data object.

3. In default creation a dummy data object is created in order the dataobject otherwise no application object is created corresponding to the meta object.

If the meta object is marked default_create (i.e. auto_create column in meta_instance is set to 'default_create' for the meta object) then ComponentID for that meta object is obtained. If there is a dataobject for this ComponentID in the DataCache then an application object is created for the meta object using the dataobject otherwise a default application object is created.

3. Configuration Manager builds a containment tree of application objects created by Autodiscovery. The containment relations in this tree of application objects (also called as dynamic tree or dynamic view of the NE) are same as modelled in meta model. When autodiscovery passes an application object to configuration manager, it also passes reference of parent application object.

Collapsed Meta Objects

Collapsed Meta Objects are specialized Meta Objects which represent multiple objects of the same type. The behavior of a collapsed MetaObject similar to a standard MetaObject with one major difference. A standard MetaObject has a fully qualified ComponentID, invoking getCIDO will return a complete ComponentID (e.g shelf=NBS-1: slot=CH-1:port=3). However, a collapsed MetaObject can not return a fully qualified ComponentID because it represents multiple objects. For those RelativeComponentIDs that cannot be resolved, a wildcard value ('*'), is returned (e.g. group=1:sts=1:vtg=*:vt=*, group=4:sts=1:vpi=0: vci=*).

However, any ComponentID will always resolve to a MetaObject. For example, ComponentID group=1:sts=1: vtg=2:vt=4 will resolve to the MetaObject with ComponentID group=1:sts=1:vtg=*:vt=*. Note that ComponentID group=1:sts=1:vtg=3:vt=2 would also resolve to the same MetaObject.

To determine if a MetaObject is a collapsed object, a new interface has been provided on MetaObject: isCollapsedObject( ).

A collapsed MetaObject can be designated as "expandable". Unlike the previous version of the MetaModel, expansion in this case does not mean replicating the MetaObject ntimes. Instead, the collapsed MetaObject will fully expand all possible ComponentIDs and that list of expanded CIDs can be retrieved via a new MetaObject interface getAllInstances( ). For collapsed MetaObjects not designated as "expandable", an attempt to retrieve all possible ComponentIDs will return an empty list. To determine if a collapsed MetaObject is expandable an application can invoke the MetaObject interface: isExpandedObject( ).

Summary of the interfaces changed or added on MetaObject.java to support collapsed objects:

ComponentID getCID( )

In the case of a normal MetaObject getCID( )will return the fully resolved ComponentID. If it is a col-lapsed MetaObject, whether that MetaObject is expandable or not, the ComponentID returned will not be fully resolved. Wild card values will appear for those RelativeComponentIDs that could not be resolved.

boolean isCollapsedObject( )

Return true if the MetaObject is a collapsed object; false otherwise.

boolean isExpandedObject( )

Returns true if the MetaObject is a collapsed object and its ComponentID can be fully expanded to all possible ComponentIDs.

Vector getAllInstances( )

If the MetaObject is a collapsed object and it can be expanded, then a list containing the fully expanded list of ComponentIDs is returned. Otherwise an empty list is returned. In most cases applications will not care about whether the MetaObject is collapsed or not since all other interfaces remain unchanged. Applications that are most likely to be affected are those that create and main-tain the NE configuration (e.g. autodiscovery, configuration or provisioning changes).

Figure 34:
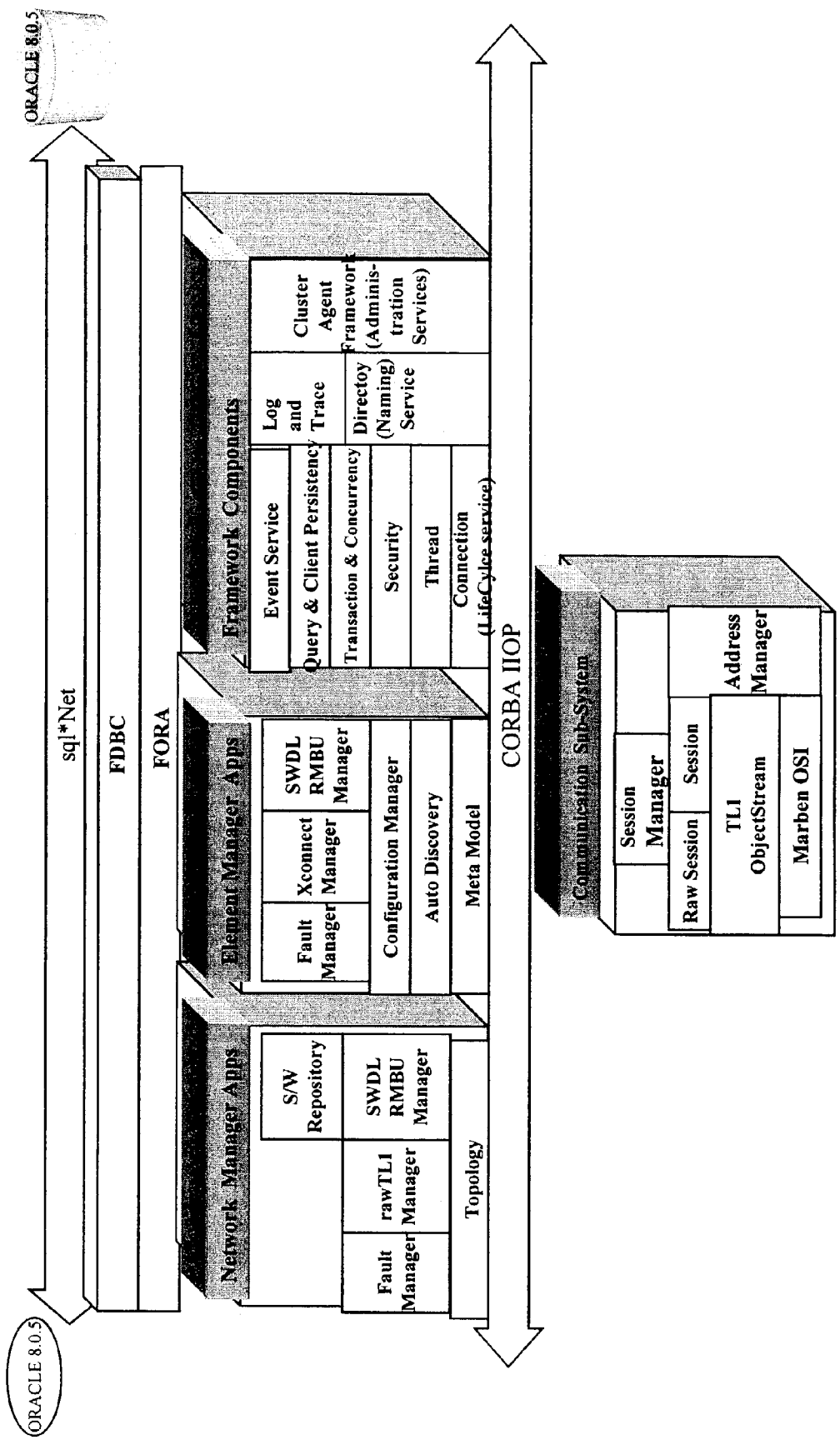
FIG. 34 shows the architecture components of NETSMART.

FIG. 34 shows architecture components for an embodiment of the disclosed innovations. Oracle databases are used for persistent storage, accessed via SQL (Structured Query Language). Lower applications interface to the databases through FDBC (Fujitsu DataBase Connectivity) and use FORA (Fujitsu Object Relational Adaptor) for mapping objects to the database.

The network manager applications include topology (used to manage groups, NEs, and links), a software repository, a fault manager that manages fault for the network, raw TL1 and TL1 batch that provide raw TL1 interfaces and batch capability, and software download and remote backup manager.

The element manager applications include a meta model that describes an NE for a given release, autodiscovery that identifies and discovers NEs, configuration manager for the NEs, crossconnect manager that manages the NE crossconnects, a fault manager, and software download and remote backup manager for the NEs.

The framework components include event service, query and client persistency which provides object query service and column query service to the client, transaction and concurrency which provides transaction services, security, thread which provides threading policy and CORBA request dispatching, connection (Life Cycle Service) which provides services for server activation, log and trace, directory naming service (used to locate server object), and cluster agent framework which provides HA services and process management.

Figure 35:
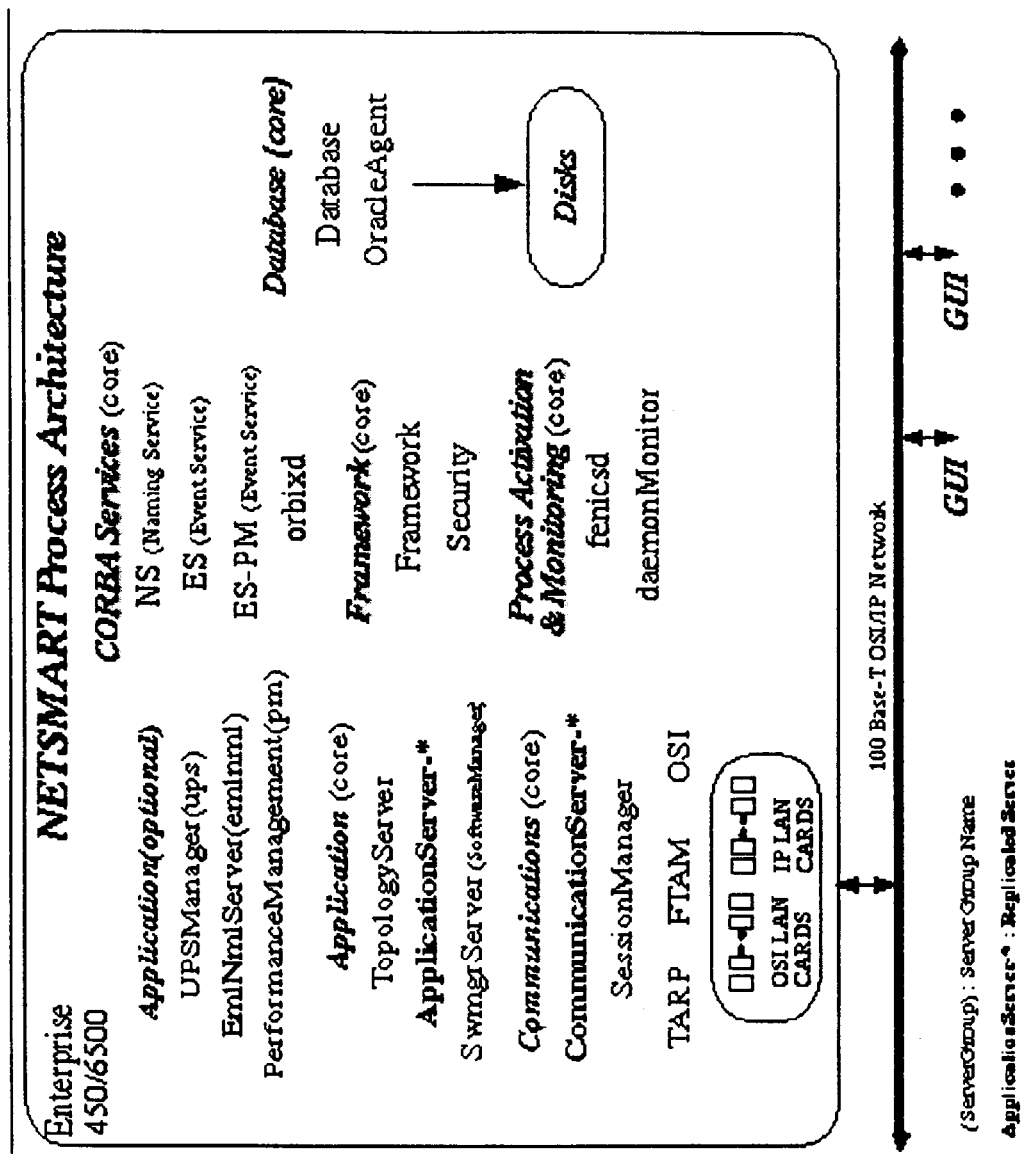
FIG. 35 shows the NETSMART process architecture.

The communication subsystem includes a session manager that manages the TL1 sessions to NEs, a session which provide TL1 sessions to NEs and performs CORBA IDL to TL1 command/response and autonomous message mediation, a raw session, an address manager that provides TID to network address mapping (source can be TARP or NETSMART database), and an OSI. Process Architecture FIG. 35 shows an overview of the process architecture for NETSMART. NETSMART process architecture is divided into CORBA services, Framework, Process Activation and Monitoring, Application, and Communications.

The CORBA services include Naming Service (provides name resolution service for NETSMART CORBA objects), Event Service (provides COS event channels for autonomous communication in NETSMART), and orbixd (orbix demon provides CORBA client/server connection management for the object request broker).

The Framework core includes Framework and Security. Framework consists of a LogManager (provides high speed logging service to NETSMART application components), Broker (provides CORBA object location and activation services to application components), Client Persistency (provides remote persistency services to GUI client) and Client Query (provides remote Query service to GUI Clients). Security consists of a User Manager (provides management of NETSMART users), Access Control Manager (provides management of user security profiles to control access to NETSMART functionality), and User Session Manager (manages all active NETSMART sessions).

Process Activation and Monitoring consists of the fenicsd and daemon monitor. NETSMART daemon processes monitor the health of all NETSMART processes, and identify process failure and restart them. The fenicsd an daemon monitor also monitor each other and relaunch of one of them dies.

Optional application services include UPS manager (listens to trap notifications from the UPS for power down events, and manages the shutdown of NETSMART under power failure conditions), emlnml server (provides an interface to NETSMART for NML systems), and performance management (collects performance data from the NES and persists them into Oracle database for later analysis.

Core application services include the topology server (provides interfaces to manage NEs, groups, and links; provides services to establish raw TL1 sessions to the NEs, and provides integrated network level fault query, management, and count service), the application server (various components of which perform the following: model the physical NE; manage NE configuration in databases; maintain the metadata for each type of NE managed by NETSMART; use static metamodel definition to instantiate NE specific objects by fetching information from the physical NE; identify discrepancies and reconcile the differences between the physical NE and the NETSMART view of the NE; manage crossconnects in database and the physical NE; and store the NEs faults in databases), and the software manager server (which provides services to manage software generics, provides NE level services to download and activate software generic, and back-up/restore of NE database; these interfaces are provided at the network level).

Core communication services include the communication server (provides command/response/event and raw TL1 sessions to the NEs, and provides IDL to TL1 and vice-versa mediation), the session manager (manages communication sessions to NEs and provides a lookup service from TID to NSAP/IP). Communication may be provided via TARP (Target Address Resolution Protocol), FTAM (File Transfer and Access Management), and OSI standards.

Figure 36:
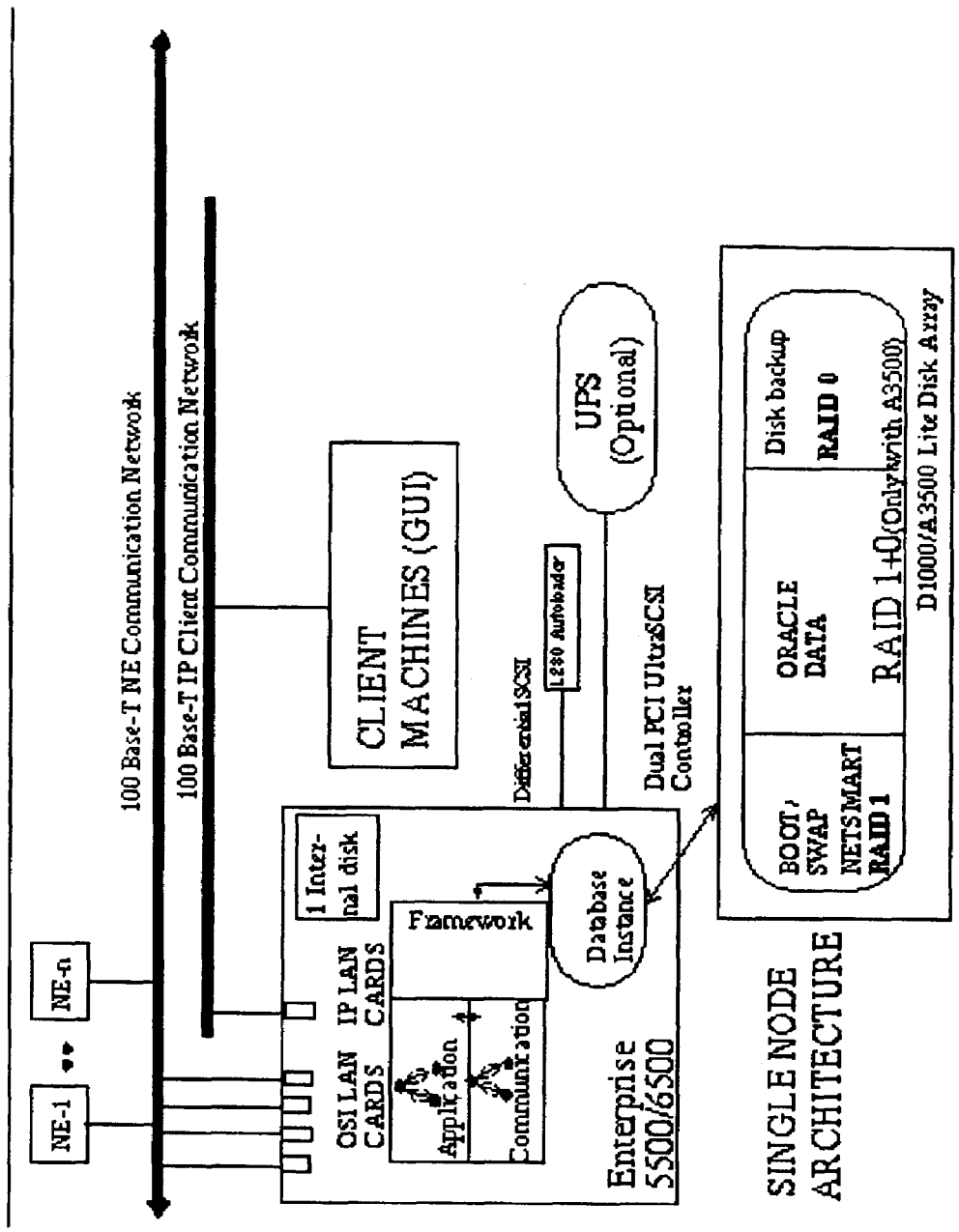
FIG. 36 shows the a hardware architecture for one embodiment of the present application.

FIG. 36 shows a hardware architecture for an embodiment of the presently disclosed innovations. The Enterprise-5500/6500 configuration shows one example of hardware implementation for the server. The server networks with individual NEs by a 100 base-T NE communication network, and with client machines via a client communication network, using OSI and IP LAN cards respectively. The server also has an uninterruptable power supply (UPS) and an L280 Autoloader backup system connected by a small computer system interface (SCSI). This figure shows the framework, applications, and communications blocks of the server. Oracle database using redundant array of inexpensive disks (RAID) serves as persistent backup.

Figure 37:
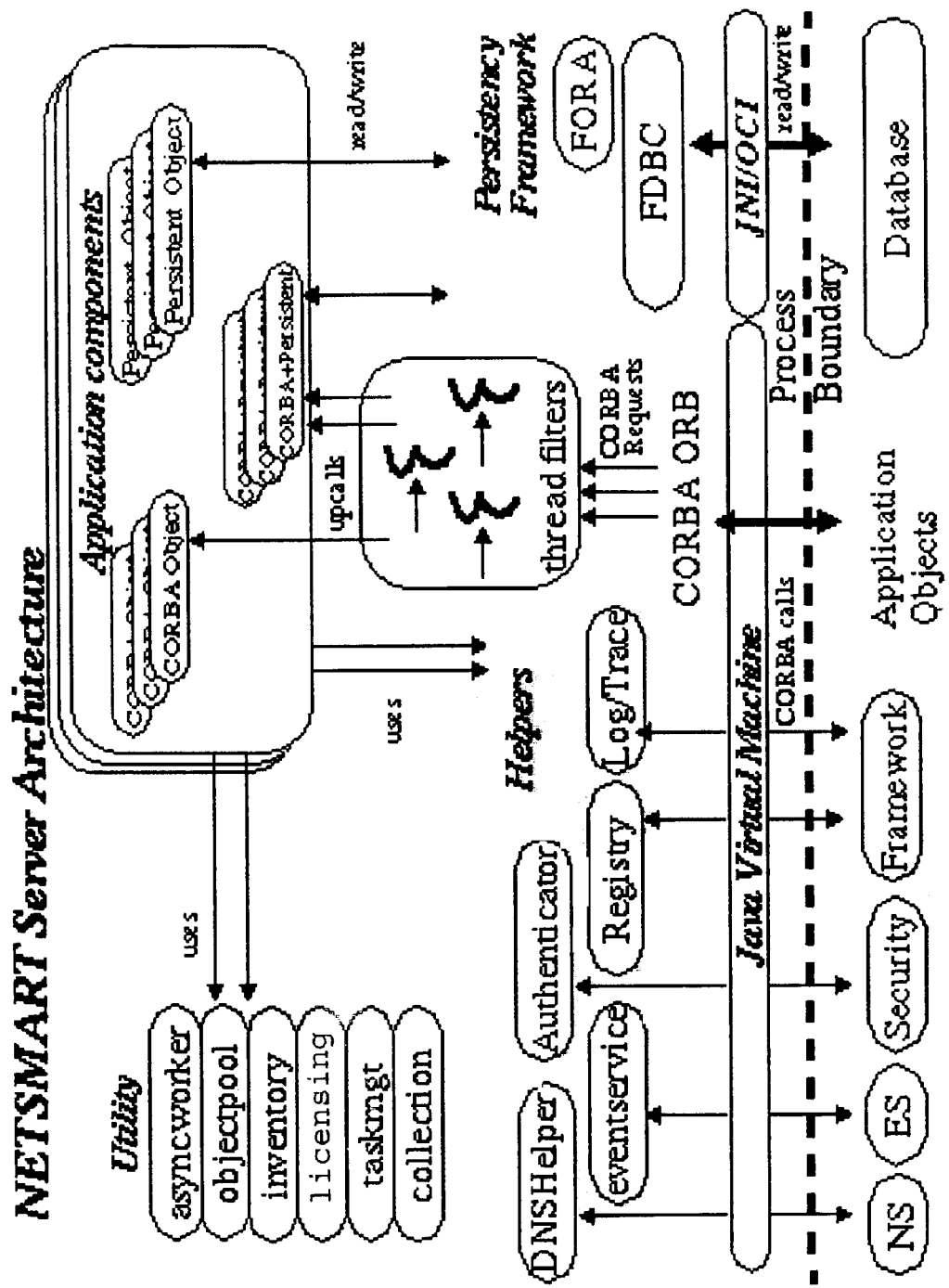
FIG. 37 shows the NETSMART server architecture.

FIG. 37 depicts the server architecture for a given NETSMART application component. An application component (for example, topology server, communication server, etc.)

interfaces with the Oracle database through FDBC and uses FORA for mapping objects to the database. FDBC uses JNI (Java Native Interface) to call OCI (Oracle Call Interface) functions. OCI functions are written in C and allow database manipulation and management.

The thread filters define the threading semantics for a given application. Thread filters are used to deliver CORBA requests to CORBA objects.

The utilities are available for various tasks. They include asyncworker (the worker thread pattern that executes user commands entered through the GUI), object pool (a pattern for optimal performance containing a pool of objects which can be reused), inventory (lists of related objects), licensing service (restricts usage of installation based on the NETSMART licensing purchased by the user), task management (pattern for multi-thread programming), and collection (extension and Java collection, generates collection objects to transmit over CORBA).

The helpers include DNSHelper (Directory Naming Service, used to look up CORBA objects in NETSMART), authenticator (provides authentication services when users request restricted privileges), eventservice (asynchronous communication between various components in NETSMART), registry (lookup service for CORBA for objects in NETSMART), and log/trace (logging and tracing to NETSMART application components).

Definitions:

Following are short definitions of the usual meanings of some of the technical terms which are used in the present application. (However, those of ordinary skill will recognize whether the context requires a different meaning.) Additional definitions can be found in the standard technical dictionaries and journals.

The NETSMART terminology may have meanings that are slightly different from standard telephony terms. The terms used are defined below.

Access identifier (AID)—AIDs are address information identifying a specific equipment slot or facility (traffic or overhead channel).

Bidirectional line-switched ring (BLSR)—A BLSR is a ring that provides working and protection fibers between nodes. If the working fiber between nodes is cut, traffic is automatically routed onto the protection fiber.

Common Language Equipment Identifier (CLEI®)—CLEI is a standard code used by suppliers to identify equipment parts and system configurations.

Correlation tag (CTAG)—CTAGs are required by TL1 and are used to correlate the input TL1 and response messages.

Equipment protection group (EPG)—The EPG is used to establish the working/protection relationship between two cards.

Equipment—Equipment consists of the NEs and related hardware within the telecommunications network.

Facility—The facility is the fiber or copper transmission media used between NEs to transport telecommunications signals.

Fiber facility protection (FFP)—FFP is used to establish a working/protection relationship between two or more facilities.

Fujitsu minimum support NE—A Fujitsu NE that is not on the officially supported list but conforms to a basic set of TL1 commands will be managed as a minimally supported Fujitsu NE. Support consists of logging on, adding links, displaying as an icon on the topology map, and displaying alarms.

Group—Groups are logical associations of NEs to facilitate NE management. For example, NEs can be placed in a group based on location or type of NE.

Tool Action/Function Previous Select Previous to return to the previous displayed topic. Next Select Next to reverse direction and return to the topic where you first used Previous, one topic at a time. Print Displays the Print dialog and allows you to print the on-line help.

Link—A link is a communications channel or circuit that carries a telecommunications signal between two NEs.

Logical link—The line displayed on the Topology window that depicts one or more physical connections between NEs and/or groups of NEs is referred to as a logical link. The line only represents the actual network and can be removed without affecting the network. Logical link names can be edited to conform to the customer's particular naming convention.

NE—The term NE refers to hardware only or a combination hardware and software system that is primarily designed to directly perform a telecommunications service function. For example, an NE is the part of the network equipment where a transport entity (such as a line, path, or section) is terminated and monitored.

Path—A path at a given rate is a logical connection between the points at which a standard frame format for the signal at the given rate is assembled and disassembled.

Physical link—The line displayed on the Display Link window that depicts a physical connection between the ports of two different NEs is referred to as a physical link. The line only represents the actual network and can be removed without affecting the network. Physical link names, which are in the format <TID>:<port>::<TID>:<port>, are not editable.

Port—In transmission control/Internet protocol (TCP/IP) and user data protocol (UDP) networks, this is an end point to a logical connection. The port number identifies what type of port it is.

For example, port 80 is used for HTTP traffic.

Synchronous Transport Signal Level 1 (STS-1)—The STS-1 signal is the basic logical building block of the SONET signal structure. It consists of lower-order signals, payload, and transport overhead for a combined signal rate of 51.84 Mb/s.

Target identifier (TID)—TIDs uniquely identify NEs. Fujitsu NEs require from 7 to 20 alphanumeric characters. NETSMART allows from 1 to 20 alphanumeric characters to address non-Fujitsu NEs.

Time-slot assignment (TSA)—TSA allows STS-1 level traffic to be added, dropped, or passed through a selected SONET NE. Time slots are assigned on a dedicated basis. Service (i.e., DS1s and/orDS3s) is mapped into these dedicated time slots in the high-speed multiplexed signal.

Unidirectional path-switched ring (UPSR)—A UPSR consists of a 2-fiber ring. The input signal is bridged in both directions to provide redundant bandwidth. If a fiber is cut or a disruption affects one direction, the signal is available from the other direction.

Virtual tributaries (VTs)—VTs are structures designed to transport and switch sub—STS-1 payloads. There are currently four VT sizes: VT1.5 (VT container for a DS1 in SONET), VT2, VT3, and VT6.

The preferred embodiment described above (Netsmart™) does not delimit the claimed inventions, but does provide a good indication of their advantages, and of the capabilities which can be included in a system implementing the claimed inventions. Netsmart™ combines features of both network management and element management layers of TMN model to provide comprehensive management capabilities. Netsmart™ can manage very large deployments (thousands of network elements, including both Fujitsu and non— Fujitsu elements) while supporting many active users. Netsmart™ provides a hierarchical view of the network from large scale configuration down to the shelf and card level, all with a GUI that displays the different scales. Several different views make it easier for managers to monitor and control what is going on in the system. Netsmart™ also provides graphical control over surveillance, provisioning, software download (SWDL), remote memory backup (RMBU), and remote memory restore (RMR). Netsmart™ also features a rich graphical user interface which allows user to perform operational tasks without entering data or TL1 Commands.

Modifications and Variations

As will be recognized by those skilled in the art, the innovative concepts described in the present application can be modified and varied over a tremendous range of applications, and accordingly the scope of patented subject matter is not limited by any of the specific exemplary teachings given.

Although the presently preferred embodiment has been implemented as an EMS which is designed to interface to an NMS, the disclosed innovations can be implemented with other choices as to the software hierarchy. For example, it is quite possible to combine an NMS with EMS functionality, and the dividing line between EMS and NMS is not a sharp divide. Similarly numerous other functions (such as fault, configuration, account, performance, and/or security management) can be combined if desired with the primary functions of element management functions, and the disclosed inventions can be applied to such expanded architectures in various ways.

The TMN standard describes an overall software architecture concept which interrelates the various components of telecommunications system management in addition to element management and network management layers, layers are also reserved for business management and service management. Other functions can also be combined into this hierarchy. The disclosed innovations are not limited to a system which is solely an Element Manager System, but can also be applied to other systems which include element management functionality, even though such systems may not be EMS systems strictly speaking.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS. Moreover, none of these claims are intended to invoke paragraph six of 35 USC section 112 unless the exact words "means for" are followed by a participle.

What is claimed is:

1. A computer-implemented method for managing telecommunication network elements, comprising:

receiving configuration information identifying an element type of a first network element and a version of the first network element;

selecting, from a list of one or more fully-qualified versions for the element type of the first network element, a managed version by:

determining whether any of the fully-qualified versions are earlier than the version of the first network element;

in response to determining that one or more of the fully-qualified versions are earlier than the version of the first network element, selecting a latest fully-qualified version that is earlier than the version of the first network element; and in response to determining that none of the fully-qualified versions are earlier than the version of the first network element, selecting a default version associated with a manufacturer of the first network element;

storing information identifying the managed version in a memory; and communicating, in a manner determined based on the managed version, information to the first network element through an interface associated with the first network element.

2. A computer-implemented method for managing telecommunication network elements, comprising:

receiving configuration information identifying an element type of a first network element and a version of the first network element;

selecting, from a list of one or more fully-qualified versions for the element type of the first network element, a managed version by:

determining whether any of the fully-qualified versions are earlier than the version of the first network element;

in response to determining that one or more of the fully-qualified versions are earlier than the version of the first network element, selecting a latest fully-qualified version that is earlier than the version of the first network element; and in response to determining that none of the fully-qualified versions are earlier than the version of the first network element, selecting a default version associated with the element type of the first network element;

storing information identifying the managed version in a memory; and communicating, in a manner determined based on the managed version, information to the first network element through an interface associated with the first network element.

3. A system for managing a plurality of network elements, comprising:

a plurality of network elements, each network element configured to communicate with a network element manager and each network element associated with a version; and the network element manager, wherein the network element manager comprises a plurality of interfaces, each interface associated with at least one network element and configured to communicate with the associated network element, and wherein the network element manager:

receives configuration information from at least a first network element of the plurality of network elements, the configuration information identifying an element type of the first network element and a version of the first network element;

selects, from a list of one or more fully-qualified versions for the element type of the first network element, a managed version by:

determining whether any of the fully-qualified versions are earlier than the version of the first network element;

in response to determining that one or more of the fully-qualified versions are earlier than the version of the first network element, selecting a latest fully-qualified version that is earlier than the version of the first network element; and in response to determining that none of the fully-qualified versions are earlier than the version of the first network element, selecting a default version associated with a manufacturer of the first network element; and communicates, in a manner determined based on the managed version, information to the first network element through an interface associated with the first network element.

4. A system for managing a plurality of network elements, comprising:

a plurality of network elements, each network element configured to communicate with a network element manager and each network element associated with a version; and the network element manager, wherein the network element manager comprises a plurality of interfaces, each interface associated with at least one network element and configured to communicate with the associated network element, and wherein the network element manager:

receives configuration information from at least a first network element of the plurality of network elements, the configuration information identifying an element type of the first network element and a version of the first network element;

selects, from a list of one or more fully-qualified versions for the element type of the first network element, a managed version by:

determining whether any of the fully-qualified versions are earlier than the version of the first network element;

in response to determining that one or more of the fully-qualified versions are earlier than the version of the first network element, selecting a latest fully-qualified version that is earlier than the version of the first network element; and in response to determining that none of the fully-qualified versions are earlier than the version of the first network element, selecting identifying a default version associated with the element type of the first network element; and communicates, in a manner determined based on the managed version, information to the first network element through an interface associated with the first network element.

* * * * *

UNITED STATES PATENT AND TRADEMARK OFFICE
CERTIFICATE OF CORRECTION

| | |
|---|---|
| PATENT NO. | : 7,113,934 B2 |
| APPLICATION NO. | : 10/383461 |
| DATED | : September 26, 2006 |
| INVENTOR(S) | : Gilbert Lévesque et al. |

It is certified that error appears in the above-identified patent and that said Letters Patent is hereby corrected as shown below:

On the title page, item [54], Title: After "PREVIOUS" delete "FULL" insert --FULLY--;

Column 1, L. 1: After "PREVIOUS" delete "FULL" insert --FULLY--;

Column 3, L. 58: After "Network," delete "Services" insert --Service--;

Column 7, L. 30: After "down to" delete "DSO" insert --DS0--;

Column 8, L. 50: Delete "(FLASH192" insert --(FLASH-192--;

Column 12, L. 6: After "such as" delete "FLM105J" insert --FLM150J--;

Column 28, L. 38: After "by the time the" delete "userfinished" insert --user finished--;

Column 29, L. 2: After "regular" delete "DSO" insert --DS0--;

Column 29, L. 14: After "shows the" delete "DS0" insert --DSO--;

Column 29, L. 24: After "Mode" delete "H" insert --II--;

Column 30, L. 61: After "on the" delete "AE" insert --NE--;

Column 33, L. 48: After "tab or" delete "DSO" insert --DS0--;

Column 33, L. 50: After "shows the" delete "DSO" insert --DS0--;

Column 33, L. 67: After "XC" delete "DSO" insert --DS0--;

Column 34, L. 6: After "Update" delete "AE" insert --NE--;

Column 38, L. 39: After "TR-303" delete "DSOs" insert --DS0s--;

Column 41, L. 49: After "View" delete "(rom" insert --(from--;

UNITED STATES PATENT AND TRADEMARK OFFICE
CERTIFICATE OF CORRECTION

PATENT NO. : 7,113,934 B2
APPLICATION NO. : 10/383461
DATED : September 26, 2006
INVENTOR(S) : Gilbert Lévesque et al.

It is certified that error appears in the above-identified patent and that said Letters Patent is hereby corrected as shown below:

Column 44, L. 45: After "choices are" delete "NEAD" insert --NEND--;

Column 44, L. 45: After "or" delete "FEAD" insert --FEND--;

Column 51, L. 31: After "Use the" delete "DeIXC" insert --DelXC--;

Column 51, L. 59: After "labeled" delete "DeIXC" insert --DelXC--;

Column 51, L. 67: Before "crossconnects" delete "underlined" insert --unredlined--;

Column 55, L. 20: After "2 The" delete "sert" insert --sort--;

Column 56, L. 62: After "seconds to" delete "I" insert --1--;

Column 60, L. 49: After "meta_" delete "collapsed naming key" insert --collapsed_naming_keys--;

Column 62, L. 8: Delete "met a_assembly" insert --meta_assembly--;

Column 63, L. 4: After "DEFAULT_" delete "IWAY" insert --1WAY--;

Column 67, L. 54: Below "meta_strings" and above "Table Column" insert --Another temporary table.--;

Column 68, L. 65: After "mc.meta_class" insert --_--;

Column 69, L. 5: After "AND mc.ne" insert --_--;

Column 69, L. 8: After "AND mr.mj_" delete "jev" insert --rev--;

Column 69, L. 29: Delete "mr.nebase" insert --mr.ne_base--;

Column 69, L. 56: After "base=" delete "mi.ne base" insert --mi.ne_base--;

Column 70, L. 7: After "FROM meta" insert --_--;

UNITED STATES PATENT AND TRADEMARK OFFICE
CERTIFICATE OF CORRECTION

PATENT NO. : 7,113,934 B2
APPLICATION NO. : 10/383461
DATED : September 26, 2006
INVENTOR(S) : Gilbert Lévesque et al.

It is certified that error appears in the above-identified patent and that said Letters Patent is hereby corrected as shown below:

Column 70, L. 14: After "mc.meta_class" insert --_--;

Column 71, L. 50: After "process." delete "Meta";

Column 71, L. 51: Before "Base" insert --Meta--;

Column 73, L. 42: After "DEFAULT" delete "..." insert --_--;

Column 76, L. 32: After "invoking" delete "getCIDO" insert --getCID()--.

Signed and Sealed this

Eighth Day of September, 2009

David J. Kappos
*Director of the United States Patent and Trademark Office*